United States Patent
Yamanouchi et al.

(10) Patent No.: US 7,219,769 B2
(45) Date of Patent: May 22, 2007

(54) INDUSTRIAL VEHICLE EQUIPPED WITH LOAD HANDLING OPERATION CONTROL APPARATUS

(75) Inventors: Torahiko Yamanouchi, Kariya (JP); Hisashi Ichijo, Kariya (JP); Kenichi Katae, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 359 days.

(21) Appl. No.: 10/470,491

(22) PCT Filed: Feb. 18, 2002

(86) PCT No.: PCT/JP02/01353

§ 371 (c)(1),
(2), (4) Date: Jul. 25, 2003

(87) PCT Pub. No.: WO03/008325

PCT Pub. Date: Jan. 30, 2003

(65) Prior Publication Data

US 2004/0083025 A1    Apr. 29, 2004

(30) Foreign Application Priority Data

| Jul. 17, 2001 | (JP) | ............................. 2001-216622 |
| Jul. 18, 2001 | (JP) | ............................. 2001-217901 |
| Oct. 18, 2001 | (JP) | ............................. 2001-320156 |
| Nov. 16, 2001 | (JP) | ............................. 2001-352369 |
| Nov. 19, 2001 | (JP) | ............................. 2001-353582 |
| Jan. 23, 2002 | (JP) | ............................. 2002-014734 |

(51) Int. Cl.
*B66F 9/06* (2006.01)

(52) U.S. Cl. ................... 187/227; 187/222; 187/234; 414/641; 701/50; 701/207

(58) Field of Classification Search ................. 187/224, 187/397, 414; 701/50, 207
See application file for complete search history.

(56) References Cited

U.S. PATENT DOCUMENTS 3,589,535 A * 6/1971 Reading ...................... 414/592

(Continued)

FOREIGN PATENT DOCUMENTS

EP    0 477 101 A1    3/1992

(Continued)

OTHER PUBLICATIONS

Office Action from Japanese Patent Office, dated Aug. 22, 2006, concerning Japanese Patent Application No. 2001-320156.

(Continued)

*Primary Examiner*—Gene O. Crawford
*Assistant Examiner*—Terrell Matthews
(74) *Attorney, Agent, or Firm*—Morgan & Finnegan, L.L.P.

(57) ABSTRACT

A load handling operation control apparatus for an industrial vehicle, which has a load carrying apparatus provided movably on a vehicle body, is provided. A load carrying apparatus 2 is positioned with a load handling target 41, 42 according to its movement. A load handling control section 47 has a display device 28 and a detection device for detecting the position of the load handling target. A image control section 46 displays positioning information for supporting positioning of the load carrying apparatus 2 with respect to the load handling target 41, 42 on the display device 28 based on a positional detection result detected by the detection device.

28 Claims, 41 Drawing Sheets

U.S. PATENT DOCUMENTS

| | | | | |
|---|---|---|---|---|
| 3,749,830 A | * | 7/1973 | Blitchington, Jr. | 348/95 |
| 4,279,328 A | * | 7/1981 | Ahlbom | 187/224 |
| 4,520,443 A | * | 5/1985 | Yuki et al. | 701/50 |
| 4,869,635 A | * | 9/1989 | Krahn | 414/274 |
| 5,208,753 A | * | 5/1993 | Acuff | 701/50 |
| 5,586,620 A | * | 12/1996 | Dammeyer et al. | 187/227 |
| 5,738,187 A | | 4/1998 | Dammeyer et al. | |
| 5,749,696 A | * | 5/1998 | Johnson | 414/635 |
| 5,938,710 A | * | 8/1999 | Lanza et al. | 701/50 |
| 6,076,041 A | * | 6/2000 | Watanabe | 701/211 |
| 6,246,476 B1 | * | 6/2001 | Frohn et al. | 356/614 |
| 7,010,404 B2 | * | 3/2006 | Ichijo et al. | 701/50 |

FOREIGN PATENT DOCUMENTS

| | | | |
|---|---|---|---|
| JP | 54-144658 | | 11/1979 |
| JP | 2-95605 | | 4/1990 |
| JP | 2-142798 U | | 12/1990 |
| JP | 4-303213 | | 10/1992 |
| JP | 4-130299 U | | 11/1992 |
| JP | 5-4797 | | 1/1993 |
| JP | 5-162976 | | 6/1993 |
| JP | 5-54496 | | 7/1993 |
| JP | 5-286700 | | 11/1993 |
| JP | 6-135698 | | 5/1994 |
| JP | 6-239410 | | 8/1994 |
| JP | 7-2496 | | 1/1995 |
| JP | 8-322121 | | 12/1996 |
| JP | 08322121 A | * | 12/1996 |
| JP | 10-120393 | | 5/1998 |
| JP | 11-21098 | | 1/1999 |
| JP | 11-49497 | | 2/1999 |
| JP | 11-139795 | | 5/1999 |
| JP | 11-278799 | | 10/1999 |
| JP | 11278799 A | * | 10/1999 |
| JP | 11-322294 | | 11/1999 |
| JP | 2001-2395 | | 1/2001 |
| JP | 2001-97684 | | 4/2001 |
| JP | 2001-206696 | | 7/2001 |

OTHER PUBLICATIONS

Office Action from Japanese Patent Office, dated Aug. 22, concerning Japanese Patent Application No. 2001-352369.

* cited by examiner

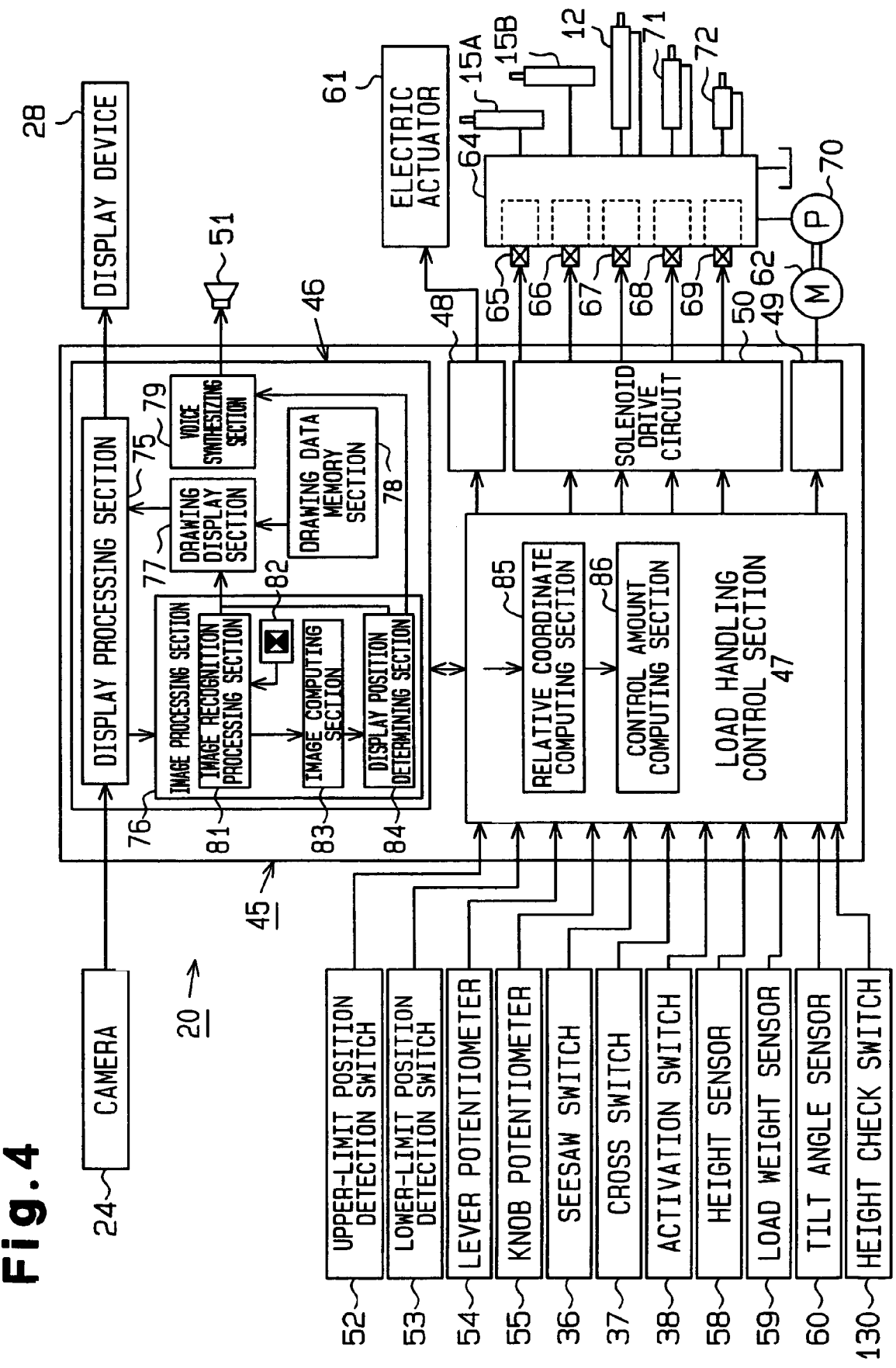

MARK M1
PATTERN P1  PATTERN P1

TEMPLATE

MARK M2
PATTERN P2  PATTERN P2

TEMPLATE

DOUBLE LOCATION MATCHING $$\vec{FP} = \vec{OP} - \vec{OC} - \vec{CF}$$

MARK M1
PATTERN P1 | PATTERN P1

TEMPLATE

MARK M2
PATTERN P2 | PATTERN P2

TEMPLATE

DOUBLE LOCATION MATCHING

SCREEN COORDINATE SYSTEM

REAL COORDINATE SYSTEM

Fig.35
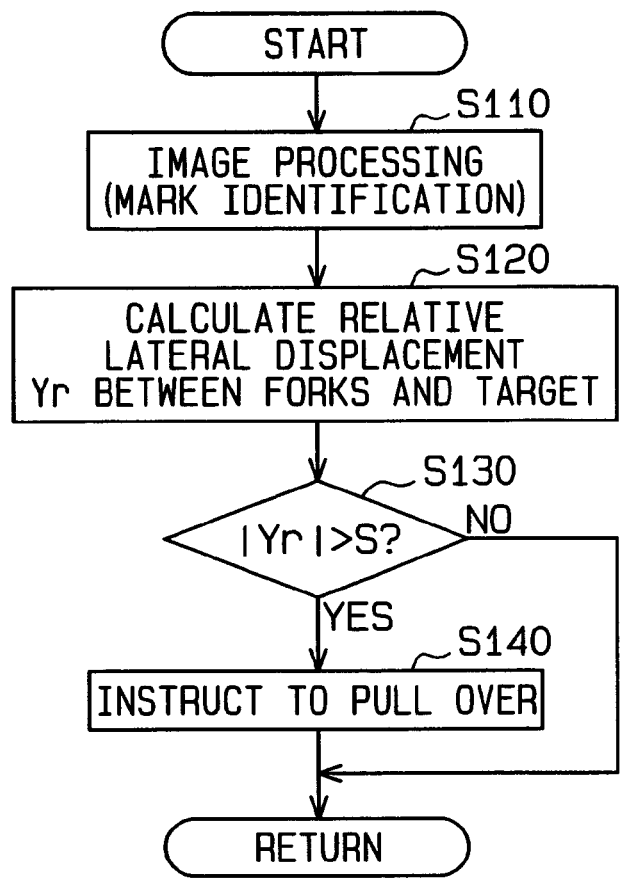
Fig.36(a)    Fig.36(b)
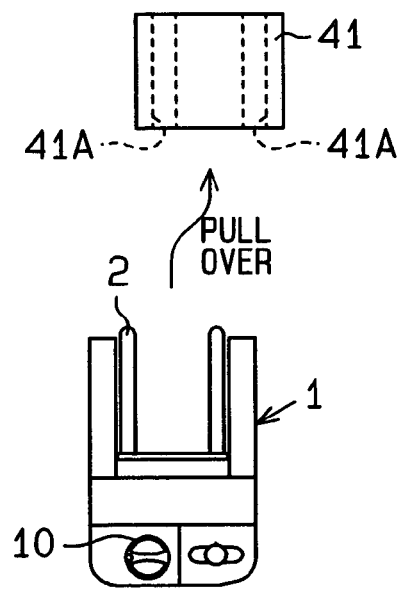    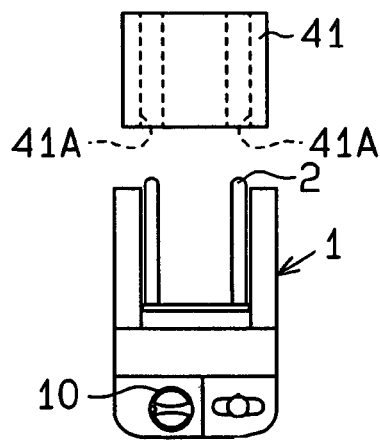

QUICK TURN OF THE WHEEL (MOVE BACKWARD)

PULL OVER

INDUSTRIAL VEHICLE EQUIPPED WITH LOAD HANDLING OPERATION CONTROL APPARATUS

TITLE OF THE INVENTION

Background of the Invention

The present invention relates to an industrial vehicle equipped with a load handling operation control apparatus. Particularly, the invention relates to an industrial vehicle equipped with a load handling operation control apparatus which assists a positioning work to position a load carrying apparatus, such as a pallet, for example, by allowing a picked-up image of a work area of the load carrying apparatus, provided on an industrial vehicle, to be seen through the screen of display means provided in a driver's seat or the like.

Conventionally, this type of industrial vehicle, for example, a forklift, has a multi-level mast provided on its vehicle body, and a carriage having a load carrying apparatus (attachment), such as forks, is so provided as to be liftable along a mast. At the time of performing a load pickup work or load deposition work at a high place in a rack, for example, a driver operates a load handling lever (lift lever) to protract or retract the multi-level mast by hydraulic driving to move the forks upward along the mast to position the load carrying apparatus to a pallet in the rack or a shelf surface.

At this time, the driver must manipulate the load handling lever while checking with the eyes if the forks are positioned to holes in the pallet or a position above the shelf surface by looking up at a high place (e.g., 3 to 6 meters) from below. It is however difficult to determine if the forks and a pallet or the like are positioned with the eyes by looking up at a high place, and even a skilled person needs time for this positioning, disadvantageously.

For example, U.S. Pat. No. 5,586,620 discloses an apparatus that assists a positioning work of the forks at a high place by attaching a camera to the carriage, picking up the state of a rack, a pallet or the like positioned in front of the forks and allowing the driver in the driver's seat to see the picked-up image via the screen of a display device. This apparatus can allow an image picked up by the camera to be seen via the screen of the display device.

However, it was necessary to finely position the forks with respect to a load on the screen after roughly positioning the forks with respect to the load while looking up at a high place. Because a mark to be a target for positioning was not displayed on the screen, it took time to finely position the forks.

Further, there is an idea of calculating the position of a pallet or a shelf portion through image processing and automatically position the forks with respect to a load handling target, such as a pallet or shelf portion as a target based on the image data of the work area picked up by the camera. This case, however, raises the problem that it is not easy to see through the screen that the positioning of the forks has been completed.

The present invention has been devised to overcome the problems and aims at providing an industrial vehicle equipped with a load handling operation control apparatus which can reliably assist the positioning of a load carrying apparatus through a screen by displaying or drawing positioning information for positioning the load carrying apparatus on the screen that shows a work area (load handling target) of the load carrying apparatus.

BRIEF SUMMARY OF THE INVENTION

To achieve the object, according to a first mode of the present invention, there is provided a load handling operation control apparatus in an industrial vehicle, which is provided with a load carrying apparatus in a movable manner. The load carrying apparatus is positioned to a load handling target according to its movement. The load handling operation control apparatus has display means and detection means for detecting a position of the load handling target. Display control means displays positioning information for supporting positioning of the load carrying apparatus with respect to the load handling target on the display means based on a position detection result detected by the detection means.

According to a second mode of the present invention, there is provided a load handling control apparatus in an industrial vehicle. The load carrying apparatus control apparatus has a load carrying apparatus which is provided in a displaceable manner on a vehicle body of the industrial vehicle for doing a load carrying operation; load detection means for detecting whether or not there is a load placed on or held by the load carrying apparatus and outputting a detection signal; decision means for determining whether it is a load pickup work or a load deposition work based on the detection signal from the load detection means; and control means for causing the load carrying apparatus to do a load pickup work or a load deposition work based on decision by the decision means.

According to a third mode of the present invention, there is provided a work mode switching apparatus for an industrial vehicle, which can do a predetermined work under automatic control and selectively set a plurality of work modes for that predetermined work. The apparatus has detection means for detecting a state of the predetermined work at the time of doing that work under automatic control; work mode setting means for selectively setting one work mode from the plurality of work modes according to contents of the predetermined work based on a detected value from the detection means; and switching means for manually switching the work mode set by the work mode setting means to another work mode.

According to a fourth mode of the present invention, there is provided a load handling aiding notification apparatus in an industrial vehicle. The apparatus has a load carrying apparatus movably provided on a vehicle body for doing a load carrying work; detection means for detecting a position of a load handling target beforehand before a vehicle approaches the load handling target; calculation means for calculating a positional relationship between the load handling target and vehicle based on a result of detection by the detection means; and notification means for notifying steering information for guiding the vehicle in such a way that the load handling target is caught by the load carrying apparatus based on a result of calculation by the calculation means.

According to a fifth mode of the present invention, there is provided a voice notification apparatus for an industrial vehicle. The apparatus has a load carrying apparatus movably provided on a vehicle body for doing a load carrying work; image pickup means for picking up an image of a load handling target at the time of a load handling operation by the load carrying apparatus; identification means for identifying a sign to be a mark at the time of positioning the load carrying apparatus based on image data picked up by the image pickup means; detection means for detecting a position of the load carrying apparatus with respect to the sign based on a result of identification by the identification means; display means for visually displaying the position of the load carrying apparatus based on a result of detection by the detection means; output means capable of outputting voices to a driver; and voice synthesizing means for, when a display state by the display means is changed according to a change in the position of the load carrying apparatus with respect to the sign, causing the output means to output sounds according to that change.

According to a sixth mode of the present invention, there is provided a work view field aiding apparatus for an industrial vehicle capable of doing a plurality of different works. The apparatus picks up a work image that supports a work view field of a driver at the time of doing each work and shows the driver that work image according to each work.

BRIEF DESCRIPTION OF DRAWINGS

FIG. 4 is a block diagram showing the electrical structure of a load handling operation aiding apparatus.

FIG. 13(a) is a diagram showing a screen with a moving target point mark displayed while FIG. 13(b) is a diagram showing a screen after position ends.

FIG. 35 is a flowchart of an instruction displaying process routine.

FIGS. 36(a) and (b) are explanatory diagrams showing a circumstance in which the position of a vehicle is corrected.

DETAILED DESCRIPTION OF THE PREFERRED EMBODIMENTS

First Embodiment

The first embodiment of the present invention as embodied into a position detecting apparatus for a forklift will be described below with reference to the drawings.

Figure 1:
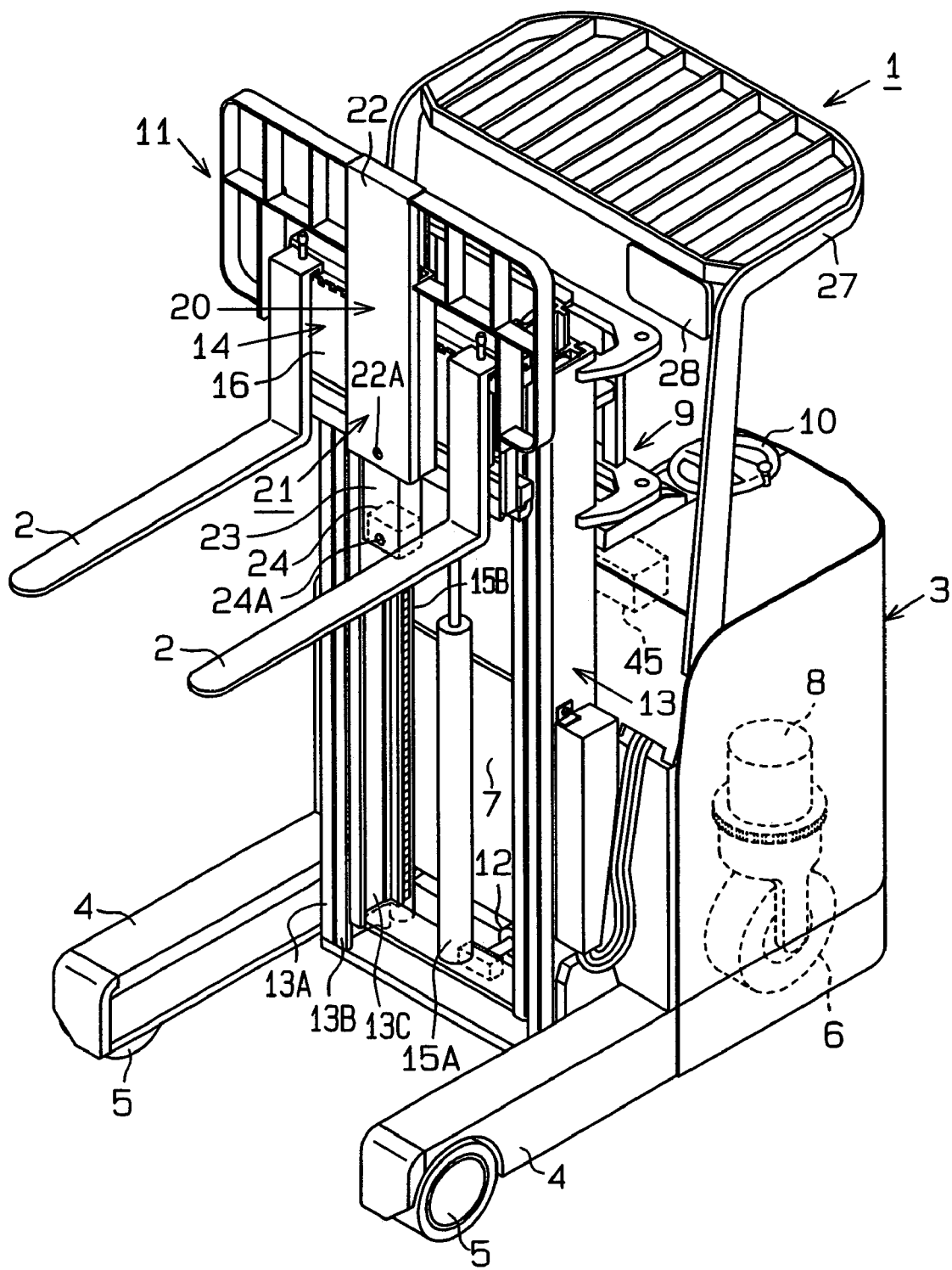
FIG. 1 is a perspective view of a forklift according to a first embodiment.

As shown in FIG. 1, a reach type forklift truck (hereinafter called forklift) 1 as an industrial vehicle does a load carrying work using forks 2 as a load carrying apparatus. Left and right front wheels (driven wheels) are respectively attached to the distal end portions of a pair of left and right reach legs 4 extending frontward from the front portion of a vehicle body 3. A drive and steering wheel 6 as a rear wheel is driven by a drive motor 8 which is driven with a battery 7, as a power source, installed in the vehicle body 3. A driver operates the forklift 1 by steering the drive and steering wheel 6 by manipulating a steering wheel 10 while standing on a stand type driver's seat 9 provided on the right-hand side of the rear portion of the vehicle body 3.

A load handling apparatus 11 located on the front side of the vehicle body 3 is provided movable in a forward and backward direction along the left and right reach legs 4 by a reach cylinder 12. The load handling apparatus 11 has a multi-level (three-level type in the embodiment) mast 13, a carriage 14 for load handling, a center lift cylinder 15A and a pair of left and right side lift cylinders 15B (only one shown). The mast 13 is a three-level mast comprising an outer mast 13A, a middle mast 13B, and an inner mast 13C. The load handling apparatus 11 according to this embodiment is of a telescopic type (full free type) whose mast 13 does not start protracting or retracting until the carriage 14 has reached the topmost position of the inner mast 13C.

The center lift cylinder 15A is provided upright on the bottom plate of the inner mast 13C, and the carriage 14 lifts up and down along the inner mast 13C by the driving of the center lift cylinder 15A. The side lift cylinders 15B is provided upright at the back of the outer mast 13A, and is driven with the carriage 14 placed at the topmost end of the inner mast 13C, and the driving causes the three-level masts 13A, 13B and 13C to protract or retract. The forks 2 are lifted up to, for example, a maximum height of about 6 meters.

The forklift 1 is provided with an aiding apparatus 20, which supports an operation of positioning the forks 2 at a high place (high lifting height range). The aiding apparatus 20 has a camera lifting apparatus 21, which is installed at the front center portion of the carriage 14 in a state extending longitudinally. The camera lifting apparatus 21 has a lift type camera unit 23, which is retained in a housing 22 attached to the front center portion of the carriage 14 in such a way as to appear from below there.

The camera unit 23 is lifted up and down between a storage position where it is stored in the housing 22 and a lift-down position where it projects from the lower end of the housing 22. The camera unit 23 incorporates a camera (e.g., CCD camera) 24 as image pickup means at its lower end portion, and an image pickup section 24A (lens section) 24A picks up the image of a load carrying work area in front of the forks. An image pickup window 22A is formed in the front lower portion of the housing 22 so that the image of the load carrying work area can be picked up by the camera 24 even at the storage position through the image pickup window 22A. Therefore, the camera 24 can pick up the image in front of the forks 2 at the two positions, the storage position and the lift-down position. A side shifter 16 is attached to a lift bracket (not shown), liftably attached to the mast 13, in such a way as to be movable in a left and right direction and the camera lifting apparatus 21 is shifted leftward and rightward together with the forks 2 at the time of side shifting.

A display device (liquid crystal display device (LCD)) 28 is attached to a roof 27 in such a way that a driver standing on the driver's seat 9 sees it well. An image in front of the forks 2, picked up by the camera 24 at the time of a load carrying work, is shown on the screen of the display device 28.

Figure 2:
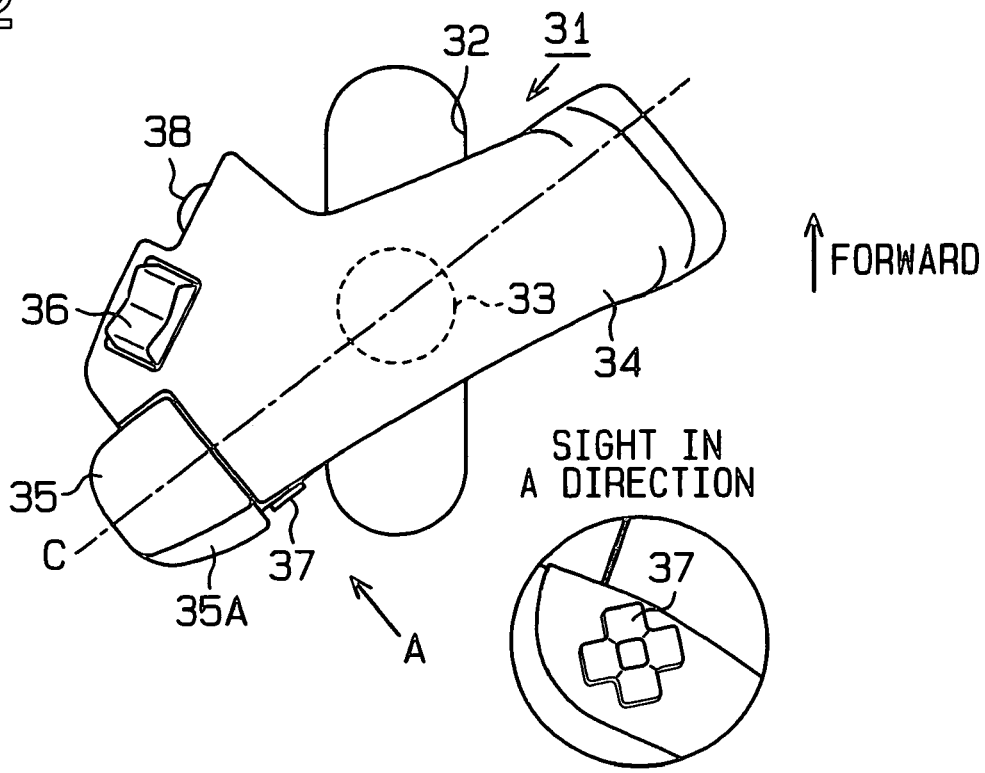
FIG. 2 is a plan view of an operation lever.

An operation lever (multi lever) 31 shown in FIG. 2 is provided on an instrumental panel. The operation lever 31 singularly can ensure all the operations for the driving operation and load handling operation, and has a plurality of operation sections.

The operation lever 31 has a lever body 33 which tilts forward and backward along a slot 32 formed on the instrumental panel. The lever body 33 is held in the neutral position upright approximately perpendicular to the panel surface by the urging force of a spring (not shown) at a non-operational time. A grip 34 is attached to the upper end portion of the lever body 33 in such a way that it is tilted by an angle of about 30 degrees to 60 degrees to the vehicle's widthwise direction.

A knob 35 approximately cylindrical in shape is provided at the left end portion of the grip 34 in such a way as to be rotatable about an axial line C. A seesaw switch 36 is provided on the left-hand side portion of the grip 34, and a cross switch 37 is provided on the front side of the grip 34 on the left-hand side portion, and an activation switch 38 is provided at the back of the grip 34 on the left-hand side portion. The grip 34 is used in a state in which it is gripped with the right hand of the driver putting the right elbow on the instrument panel. With the grip 34 gripped, the knob 35 and the cross switch 37 are manipulated with a thumb, the seesaw switch 36 is manipulated with an index finger and the activation switch 38 is manipulated with a middle finger. The cross switch 37 as seen from an A direction is shown in a circle in the diagram.

Pushing and tilting the lever body 33 forward with the right hand holding the grip 34 moves the forklift 1 forward and pulling and tilting the lever body 33 backward moves the forklift 1 backward. When the knob 35 is turned upward by depressing a projection 35A formed on the knob 35 upward with the thumb, the forks 2 are lifted upward, and when the knob 35 is turned downward by pushing the projection 35A downward with the thumb, the forks 2 are lifted downward. Pushing the front end of the seesaw switch 36 with the index finger moves the load handling apparatus 11 forward, and pushing the rear end of the seesaw switch 36 with the index finger moves the load handling apparatus 11 backward. The cross switch 37 is operable in four directions, up and down and left and right. The tilt of the mast 13 is operated in accordance with the manipulation of the cross switch 37 in the up and down direction and the side shift is operated in accordance with the manipulation in the left and right direction. Pushing the upper end portion of the cross switch 37 with the thumb tilts the mast 13 forward and pushing the lower end portion of the cross switch 37 with the thumb tilts the mast 13 backward. Pushing the right end portion of the cross switch 37 with the thumb moves the forks 2 rightward and pushing the left end portion of the cross switch 37 moves the forks 2 leftward.

Figure 3:
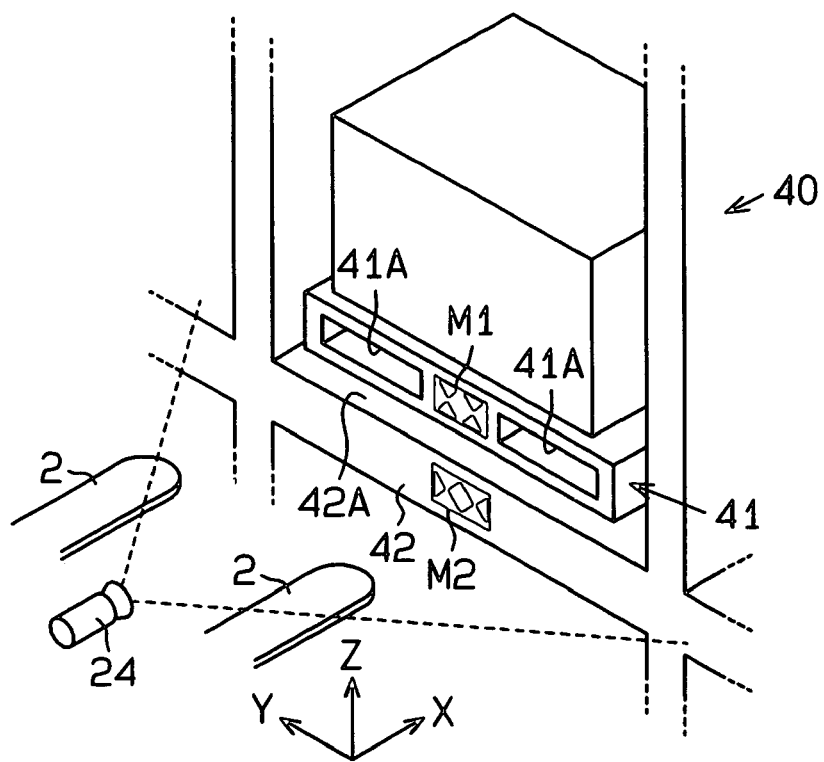
FIG. 3 is a perspective view showing a state of a load carrying work with respect to a rack.
Figure 5A:
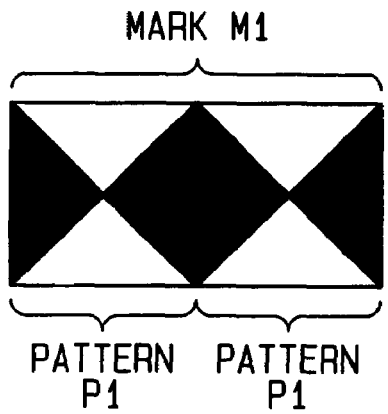
FIGS. 5(a) through 5(d) are front views showing marks and templates.
Figure 5B:
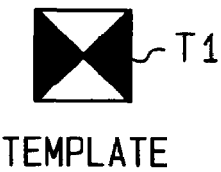
Figure 5C:
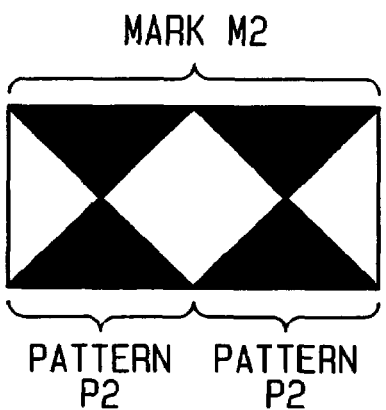
Figure 5D:
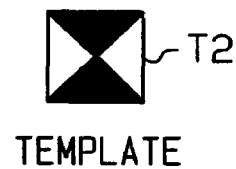

As shown in FIG. 3, in the present embodiment, a rack 40 and a pallet 41 which are load handling targets are affixed with marks M1 and M2 that are targets at the time of positioning the forks 2 with respect to the rack 40 or the pallet 41. That is, the mark M1 for pallet position detection is affixed to the front and back sides of the pallet 41 at the center portion between two insertion holes 41A. The mark M2 for rack position detection is affixed to the center portion of the front side of a shelf plate (beam) 42 of the rack 40. The mark M1 affixed to the pallet 41 and the mark M2 affixed to the shelf plate 42 are formed of figures with white and black patterns inverted to each other. At the time of performing automatic fork positioning control to automatically position the forks 2 to a load handling target, the amounts of sideway (Y direction) and vertical (Z direction) deviations between the forks 2 and the load handling target (pallet 41 or the shelf plate 42) are computed from the position of the mark M1 (or M2) picked up by the camera 24 on the screen, and the forks 2 are automatically controlled to position in such a way as to cancel out the deviation amounts.

The electrical structure of a load handling operation aiding apparatus 20 will be described based on FIG. 4.

The load handling operation aiding apparatus 20 has a controller 45. The controller 45 has an image control section 46, a load handling control section 47, drive circuits 48 and 49 and a solenoid drive circuit 50.

The camera 24 is electrically connected to the input side of the image control section 46 to which a video signal (image signal) is input, and the display device 28 and a speaker 51 are connected to the output side. The image control section 46 displays a picked-up image on the screen of the display device 28 based on the video signal (image signal) from the camera 24. The image control section 46 performs an image recognition process (template matching process) to recognize a mark from the picked-up image and grasps the position of a load handling target from the position of the mark on the screen (screen coordinate system) which is grasped by this image recognition. Then, a display process for displaying a target moving point (target mark) to be a target at the time of positioning the forks 2 in a position to catch the load handling target on the screen is performed.

In this display process, a method of displaying a target mark on the screen of the display device 28 is used as a method for guiding a target moving point. The display process will be described in detail later. An aiding state for a load carrying work or the content of an instruction or the like to a worker is announced in sounds from the speaker 51.

Meanwhile, the load handling control section 47 is connected with an upper-limit position detection switch 52, a lower-limit position detection switch 53, individual potentiometers 54 and 55 and switches 36 to 38 of the multi lever 31, a height sensor 58 as height detecting means, a load weight sensor 59, a tilt angle sensor 60, etc. The load handling control section 47 is connected with an electric actuator 61 and load handling motor (electric motor) 62 as lifting drive means via the drive circuits 48, 49 and with the solenoids of various electromagnetic proportional valves 65 to 69 attached to an oil control valve 64 via the solenoid drive circuit 50. The load handling control section 47 and the load weight sensor 59 constitute discrimination means.

Based on signals from the individual potentiometers 54 and 55 and switches 36 and 37, the load handling control section 47 performs current value control of the electromagnetic proportional valves 65 to 69 and drive control of the load handling motor 62. When a load handling pump (hydraulic pump) 70 is driven by the activation of the load handling motor 62, the hydraulic fluid is supplied to the oil control valve 65. Based on an operation signal from the multi lever 31, each electromagnetic proportional valve 65 to 69 corresponding to the operation is subjected to proportional control by the load handling control section 47 and the lift cylinders 15A, 15B, the reach cylinder 12, the side shift cylinder 71 and the tilt cylinder 72 are hydraulically controlled, so that the elevation operation, reach operation, side shift operation and tilt operation of the forks 2 can be performed. The cylinders 15A, 15B and 71 constitute drive means.

The load handling control section 47 performs lifting control of the camera unit 23 and automatic fork positioning control in addition to the load carrying control at the time of operating the multi lever. The automatic fork positioning control, which is for supporting a load carrying work at a high place which is carried out with the forks 2 lifted up to or higher than a given height, is executed only when the height of the forks 2 detected by the height sensor 58 is equal to or higher than a set height (e.g., about 2 meters). The load handling control section 47 discriminates a load handling mode by determining whether or not there is a load on the forks 2 based on the detected value from the load weight sensor 59. In the "load pickup mode" where there is no load on the forks 2 and a load-weight detected value becomes equal to or smaller than a threshold value, the load handling control section 47 places the camera unit 23 in the storage position, while in the "load deposition mode" where there is a load on the forks 2 and a load-weight detected value exceeds the threshold value, it places the camera unit 23 in the lift-down position. The electric actuator 61 is driven to lift the camera unit 23 up and down. The electric actuator 61 is stopped when the camera unit 23 reaches the upper-limit position and the upper-limit position detection switch 52 is switched on and when the camera unit 23 reaches the lower-limit position and the lower-limit position detection switch 53 is switched on.

The image control section 46 has a display processing section 75, an image processing section 76, a drawing display section 77, a drawing data memory section 78 and a voice synthesizing section 79. The display processing section 75 sends out a video signal input from the camera 24 to the display device 28 in such a way that the image picked up by the camera 24 is displayed on the screen. The voice synthesizing section 79 performs voice synthesizing process for voice guidance or the like and outputs a voice signal to the speaker 51. Image data from the display processing section 75 is input to the image processing section 76. The drawing display section 77 and drawing data memory section 78 constitute drawing control means.

The image processing section 76 performs an image recognition process to compute the position of the mark M1, M2 on the screen and computes the positional relationship between the vehicle and forks 2 and the load handling target based on the computed position of the mark M1, M2. The image processing section 76 has an image recognition processing section 81, a template memory section 82, an image computing section 83 and a display position determining section 84 as calculation means.

The image recognition processing section 81 performs an image recognition process by a pattern matching method. When the amount of deviation between the vehicle and the load handling target in the vehicle's widthwise direction exceeds an allowable range, the image computing section 83 computes the pull-over direction and pull-over distance needed to eliminate the deviation amount. The display position determining section 84 determines a display position on the screen where a display indicating the pull-over direction and pull-over distance is to be displayed. The image processing section 76 is constituted by a microcomputer and program data stored in a memory (ROM) or the like. The drawing display section 77 and the drawing data memory section 78 are constituted by a drawing control gate array and drawing VRAM. The image recognition processing section 81, the template memory section 82 and the image computing section 83 constitute detection means and image recognition means.

FIG. 5 shows marks and templates. FIG. 5(a) shows the mark M1 for pallet position detection and FIG. 5(c) shows the mark M2 for rack position detection. FIG. 5(b) shows the template T1 for the mark M1, and FIG. 5(d) shows the template T2 for the mark M2.

The mark M1 is constructed by arranging two patterns P1, P1, and the mark M2 is constructed by arranging two patterns P2, P2. A mark indicates the entire design, and a pattern indicates a repeating unit, which constitutes a mark. The templates T1 and T2 used in a pattern matching process have the same designs as the patterns P1 and P2. The patterns P1 and P2 have designs with the black and white inverted to each other.

Each pattern P1, P2 has a design separated into white and black colors by a plurality of boundary lines extending radially around one point. Each pattern P1, P2 in the present embodiment has a design separated into white and black colors by four areas defined by the two diagonal lines of a square. Note that the contour line equivalent to the sides of the rectangular shape of the template is not a part of the design. The size of the mark M1, M2 to be displayed on the screen 28A changes in accordance with the distance between the mark and the camera. Even in that case, however, a pattern of the same size as the template T1, T2 always exists in the center portion of the picked-up patterns P1, P2, so that the mark M1, M2 can be recognized through pattern matching using only a single template T1, T2. The templates T1, T1 are set to a predetermined size such that all the marks M1, M2 picked up within a predetermined distance from the camera 24 can be identified. The predetermined size of the templates is the same size as or smaller than the size of the mark when an image is picked up at a predetermined distance away.

Stored in the template memory section 82 shown in FIG. 4 is data of the two templates T1 and T2. The image recognition processing section 81 uses the template T1 when the load handling mode notified by the load handling control section 47 is the "load pickup mode" and uses the template T2 when it is the "load deposition mode". That is, when it is the load pickup mode, a pattern matching process to identify the mark M1 for pallet position detection is performed and when it is the load deposition mode, a pattern matching process to identify the mark M2 for rack position detection is performed.

Figure 6A:
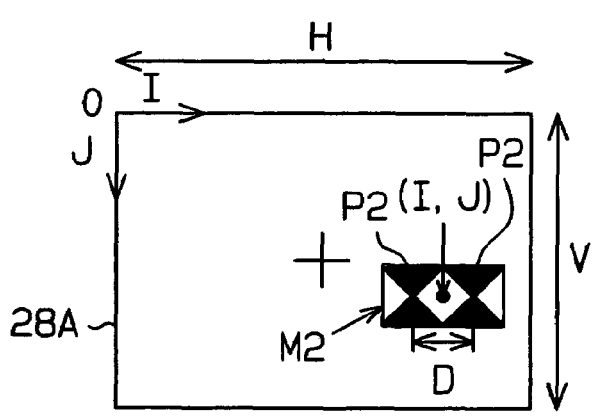
FIG. 6(a) is a screen diagram for explaining a screen coordinate system and FIG. 6(b) is an explanatory diagram of a matching method.
Figure 6B:
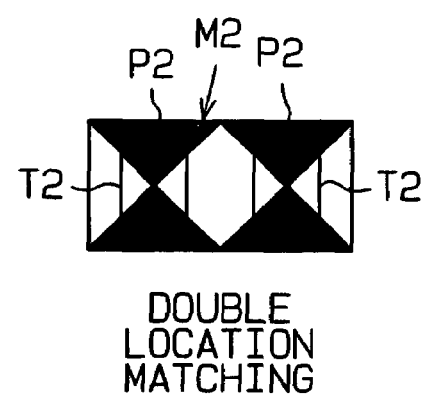

FIG. 6(a) shows the screen coordinate system set on the screen. In the screen coordinate system, the coordinates are treated pixel by pixel, and the number of horizontal pixels H and the number of vertical pixels V are set on the screen 28A in FIG. 6(a). A description will be given of the mark M2 as an example. The image recognition processing section 81 performs matching with respect to the two patterns P2, P2 constituting the mark M2 on image data at two locations using the template T2 and recognizes each pattern P2, P2, as shown in FIG. 6(b). The image computing section 83 computes coordinates (I1, J1), (I2, J2) of the individual center points of the two patterns P2, P2 recognized by the image recognition processing section 81 and acquires a barycenter (I, J) of the mark M2 and a center distance D between the patterns P2, P2 based on those two coordinate values. The same method of acquiring the I, J and D values is applied for the mark M1.

Figure 7:
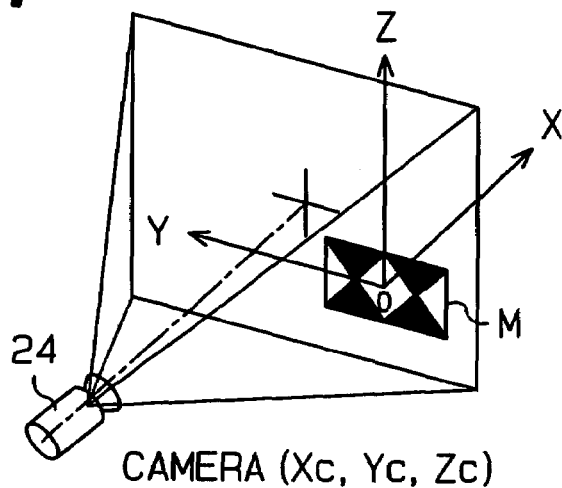
FIG. 7 is an exemplary perspective view for explaining a real coordinate system.

FIG. 7 shows a real coordinate system. The real coordinate system is assumed to be three-dimensional coordinates with the barycenter of the mark M as the origin O, the X axis taken in a direction perpendicular to the mark M and opposite to the camera 24, the Y axis taken in a direction rotated counterclockwise by 90 degrees within the horizontal plane and the Z axis taken in the vertical direction, as in the diagram. Then, the relative coordinates (Xc, Yc, Zc) of the camera 24 are acquired in the real coordinate system and the positional deviation amount of the forks 2 is computed based on the relative coordinates. The relative coordinates (Xc, Yc, Zc) in the real coordinate system are computed by performing geometric conversion using the data I, J and D computed in the screen coordinate system shown in FIG. 6.

The following will discuss a method of obtaining the relative coordinates (Xc, Yc, Zc) of the camera 24 in the real coordinate system from the I, J and D values.

Figure 8:
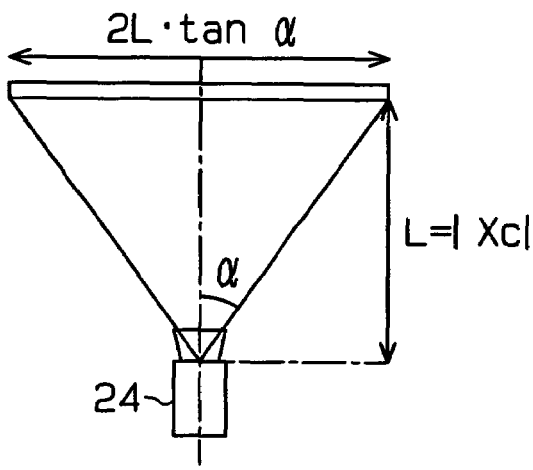
FIG. 8 is a plan view for explaining a coordinate system.
Figure 9:
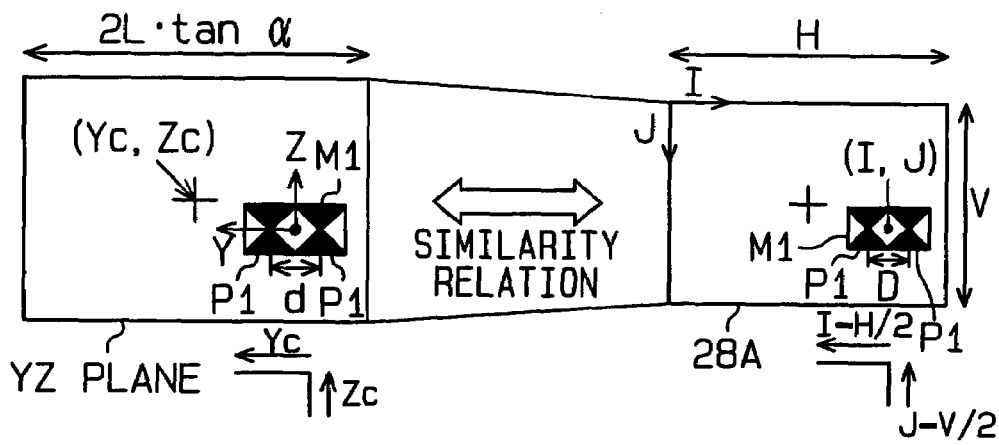
FIG. 9 is a correlation diagram showing the relationship between the real coordinate system and the screen coordinate system.

FIG. 8 shows the state in which the camera and the mark are seen from above in the real coordinate system. FIG. 9 shows the similar relationship between the real coordinate system and the screen coordinate system. The left-hand side in the diagram shows the YZ plane of the real coordinate system picked up by the camera 24 and the right-hand side in the diagram shows the IJ plane of the screen coordinate system of the image picked up by the camera 24. Those two images are similar to each other if the distortion of the images is not considered.

As shown in FIGS. 8 and 9, the horizontal width of the image pickup range in the real coordinate system is indicated by $2L \cdot \tan \alpha$, which becomes equal to the number of horizontal pixels H of the screen 28A in the screen coordinate system. The angle "$\alpha$" is a half the horizontal angle of view of the camera 24, as shown in FIG. 8. L is the distance between the camera 24 and the YZ plane and is equal to |Xc| (L=|Xc|). A center distance d of the two patterns P, P in the mark M in the real coordinate system is expressed by the center distance D in the screen coordinate system. That is, the similarity ratio of the real coordinate system to the screen coordinate system becomes d:D. With regard to the horizontal coordinates from the origin O to the center of the image, Yc in the real coordinate system correspond to I−H/2 in the screen coordinate system. Further, with regard to the vertical coordinates from the origin O to the center of the image, Zc in the real coordinate system corresponds to J−V/2 in the screen coordinate system.

The relative coordinates (Xc, Yc, Zc) of the camera 24 in the real coordinate system (XYZ coordinate system) shown in FIG. 7 are computed from the following equations by performing geometric conversion based on the similar relationship in FIG. 9 by using the coordinates (I, J) in the screen coordinate system and the value of the distance D.

$$Xc = -L = -Hd/(2D \tan \alpha) \quad (1)$$

$$Yc = d/D(I - H/2) \quad (2)$$

$$Zc = d/D(J - V/2) \quad (3)$$

As H, V, $\alpha$ and d values are known values, the coordinates (Xc, Yc, Zc) are acquired if the I, J and D values are computed.

The load handling control section 47 has a relative coordinate computing section 85 and a control amount computing section 86. The relative coordinate computing section 85 calculates relative coordinates OC (Xc, Yc, Zc) of the camera 24 in the real coordinate system based on the data I, J and D sent to the load handling control section 47 from the image control section 46. The control amount computing section 86 calculates a positional deviation amount between the forks 2 and the target position at the time of positioning the forks 2 to the load handling target, based on the relative coordinates (Xc, Yc, Zc) of the camera 24 obtained in the real coordinate system. That is, the moving distances in the X, Y, and Z directions needed to position the forks 2 to the load handling target are calculated.

Figure 11:
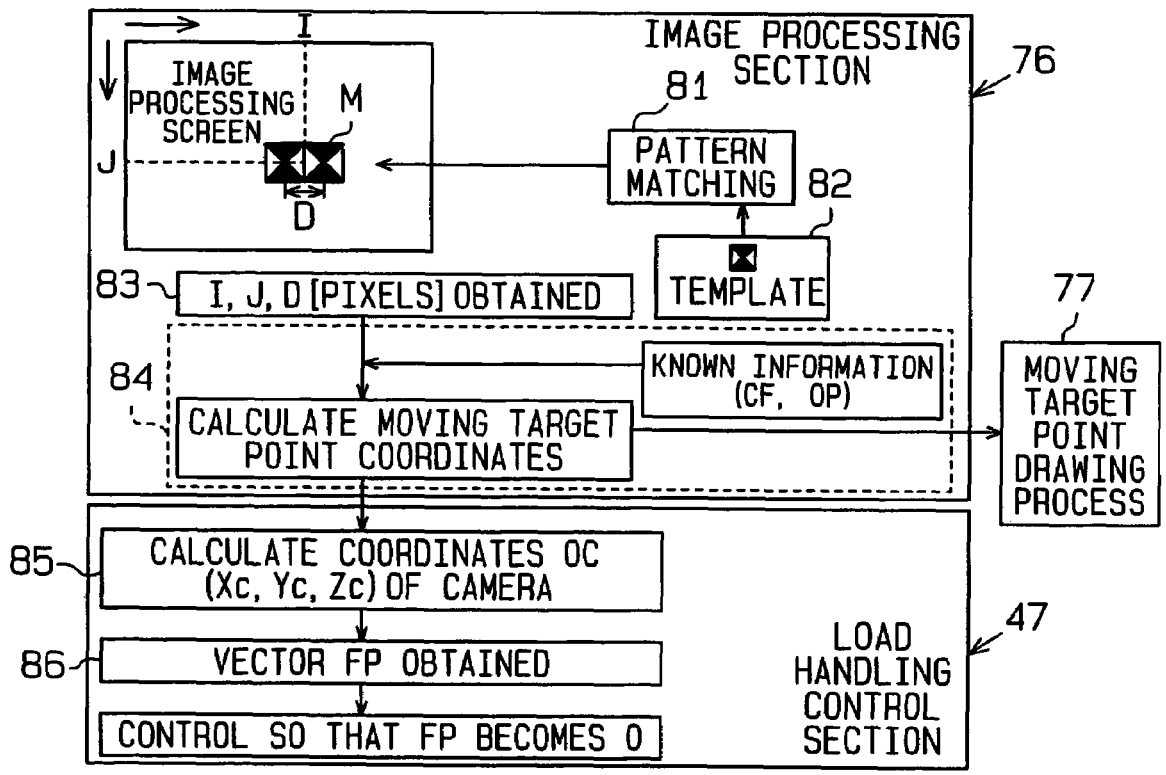
FIG. 11 is a block diagram illustrating the process of positioning control.

FIG. 11 is for explaining the flow of the control process from the image recognition process to the automatic fork positioning control.

To begin with, when image data is acquired, the image recognition processing section 81 reads the template T from the template memory section 82 and performs a pattern matching process. The image computing section 83 calculates the barycentric coordinates (I, J) of the mark M and the pattern center distance D in the screen coordinate system (pixel level) based on the position of the pattern recognized by the image recognition processing section 81.

The data I, J and D calculated here are sent to the display position determining section 84. At the time the forks 2 are positioned to the load handling target (the pallet 41 or the shelf plate 42), the display position determining section 84 calculates the coordinates of the moving target point of the mark M on the screen 28A (screen coordinate system) based on the data I, J and D.

Figure 10:
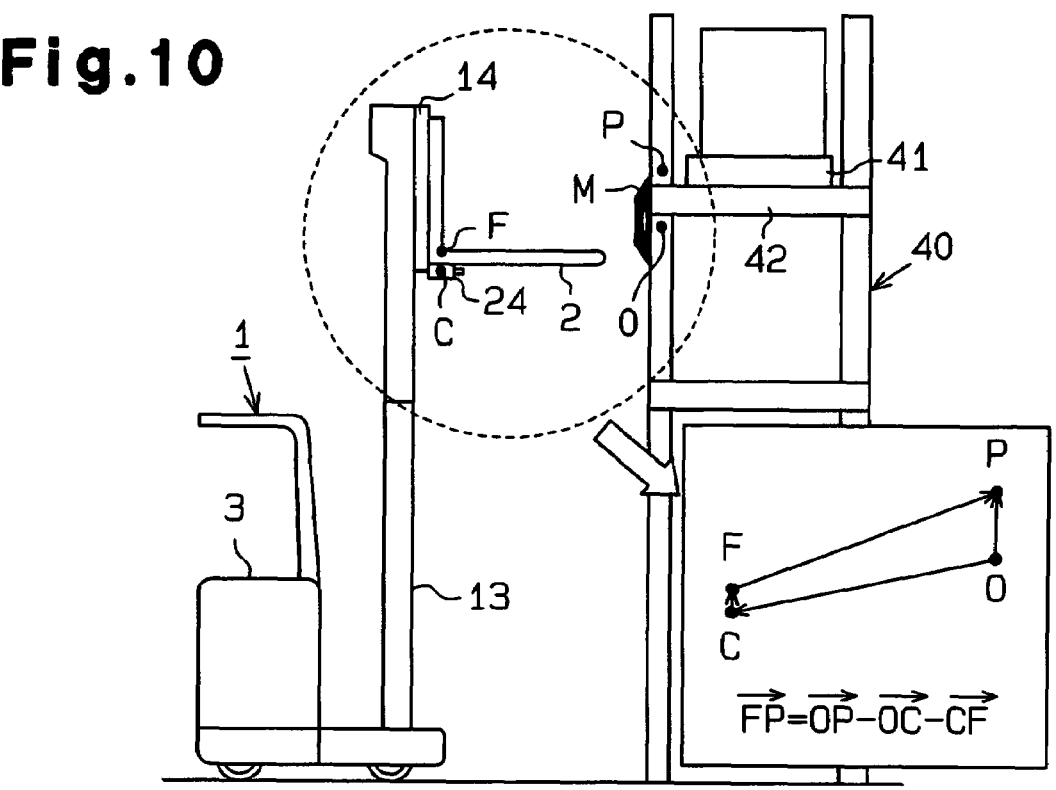
FIG. 10 is an exemplary diagram for explaining positioning control.

As shown in FIG. 10, a camera position C, a fork position F, a pallet position P and a mark barycentric position (origin) O are set. Then, in consideration of a vector FP when the fork position F is positioned to the pallet position P at the time of a load pickup work, there is a relationship of vector FP=vector OP−vector OC−vector CF. Assume that the point C and point F are on a common vertical line and the point O and point P are positioned on another common vertical line. The vector CF is equivalent to the distance between the camera position C and the fork position F, and the vector OP is equivalent to the distance between the mark barycentric position O and the pallet position P and both are known information.

Given that for those known information, the components of the vector OP are (Xp, Yp, Zp) and the components of the vector CF are (Xcf, Ycf, Zcf), the coordinates (It, Jt) of the moving target point to which the mark M1 should be moved on the screen 28A to position the forks 2 to the pallet 41 are given by the following equations.

$$It = H/2 + (Yp - Ycf)*D/d \quad (4)$$

$$Jt = V/2 + (Zp - Zcf)*D/d \quad (5)$$

where Yp, Zp, Ycf and Zcf are known values.

Similarly, let us consider the case of a load deposition work. In case where the forks 2 are positioned to the shelf plate 42, a load deposition position R is the position apart upward from a shelf surface 42A by a predetermined distance (10 to 20 cm). In this case, the vectors CF and OR are known information. The vector OR is equivalent to the distance between the mark barycentric position O and the load deposition position R. Given that for the known information, the components of the vector OR are (Xr, Yr, Zr) and the components of the vector CF are (Xcf, Ycf, Zcf), the coordinates (It, Jt) of the moving target point to which the mark M2 should be moved on the screen 28A to position the forks 2 to the load deposition position R are given by the following equations.

$$It = H/2 + (Yr - Ycf)*D/d \quad (6)$$

$$Jt = V/2 + (Zr - Zcf)*D/d \quad (7)$$

where Yr, Zr, Ycf and Zcf are known values.

How to acquire the individual equations (4) to (7) will be discussed later.

The coordinates (It, Jt) of the moving target point that has been computed by the display position determining section 84 are sent to the drawing display section 77 and a drawing process to draw a moving target point mark 87 shown in FIG. 13 in the position of the moving target point on the image on the screen 28A is performed. The moving target point mark 87 is comprised of a figure having four triangles arranged at equal angular intervals, and the portion that is surrounded by four close vertexes indicates the moving target point.

The data I, J and D are sent to the load handling control section 47. The relative coordinate computing section 85 calculates the relative coordinates OC (Xc, Yc, Zc) of the camera 24 in the real coordinate system based on the data I, J and D. The control amount computing section 86 calculates a positional deviation amount (individual components of the vector FP) between the forks 2 and the target position at the time of positioning the forks 2 to the load handling target by using the known information (vectors CF, OP) based on the relative coordinates (Xc, Yc, Zc) of the camera 24. That is, the moving distances in the X, Y and Z directions needed to position the forks 2 to the load handling target are calculated.

The vector FP is expressed by the following equation.

Vector FP=−vector CF−vector OC+vector OP

Thus, the positional deviation amount (Xfp, Yfp, Zfp) at the time of a load deposition work becomes (Xfp, Yfp, Zfp)=(Xcf−Xc+Xp, Ycf−Yc+Yp, Zcf−Zc+Zp)

and the positional deviation amount (Xfr, Yfr, Zfr) at the time of the load deposition work becomes (Xfr, Yfr, Zfr)=(Xcf−Xc+Xr, Ycf−Yc+Yr, Zcf−Zc+Zr).

Figure 13A:
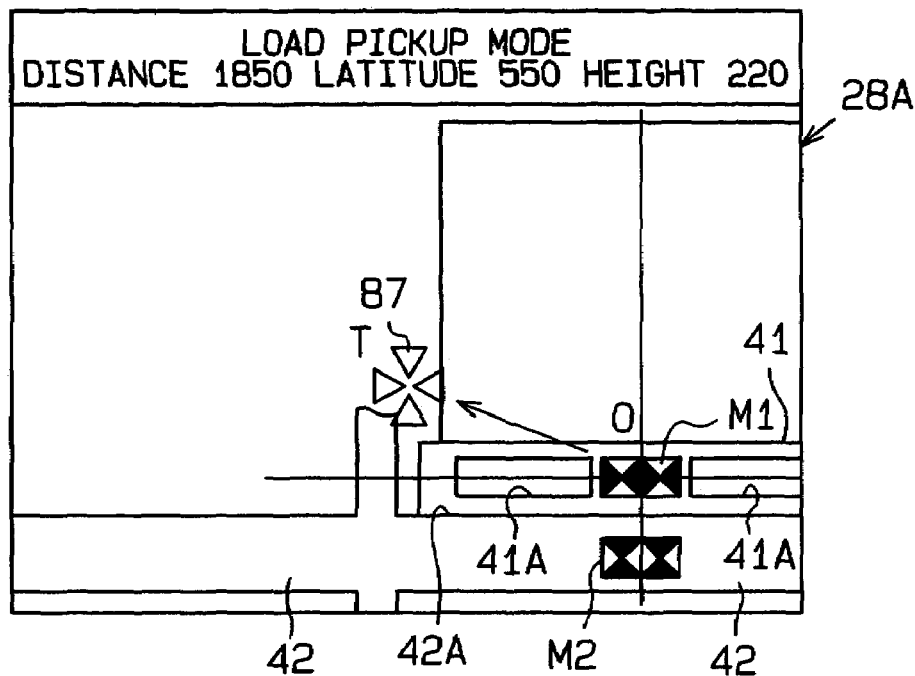
FIG. 13(a) and FIG. 13(b) show screens in positioning control, where

Data of those positional deviation amounts are sent to the image control section 46. The drawing display section 77 reads numerical data of the distances in the X, Y and Z directions equivalent to the positional deviation amount data from the drawing data memory section 78 and displays the data on a character information display area at the upper portion of the screen 28A, as shown in FIG. 13. As a result, the distances in the X, Y and Z directions of the forks 2 needed to position the forks 2 to the load handling target are displayed. On the screens in FIG. 13(a) and (b), "distance" indicates the moving distance of the forks to the load handling target, "latitude" indicates the moving distance of the forks in the left and right direction (the rightward direction is positive) and "height" indicates the moving distance of the forks in the up and down direction (upward direction is positive).

For example, positioning information of "distance Xfp", "latitude Yfp" and "height Zfp" are displayed in characters on the screen 28A at the time of a load pickup work and positioning information of "distance Xfr", "latitude Yfr" and "height Zfr" are displayed in characters on the screen 28A at the time of a load deposition work. It is therefore easy to see in which direction and how much the forks 2 should be moved.

Then, the load handling control section 47 outputs control amount instruction values to make the vector FP to "0" to the solenoid drive circuit 50. In the present embodiment, automatic positioning control is performed only in the up and down direction and left and right direction of the forks 2 and control in the forward and backward direction (reach direction) is done by the manual operation by the driver. Therefore, the load handling control section 47 outputs values corresponding to the individual shift amounts of the forks 2 in the up and down direction and left and right direction to make the Y and Z components of the vector FP to "0" as control amount instruction values. Accordingly, the forks 2 are automatically positioned in the up and down direction and left and right direction. As a result, the forks 2 are positioned to the insertion holes 41A of the pallet 41 in a load pickup mode and are positioned to the target position apart upward from the shelf plate 42 by a predetermined distance in a load deposition mode. After the positioning, a load pickup work or a load deposition work is carried out by performing a reach operation to cause the mast 13 to reach. The reach operation of the forks 2 may be automatically controlled.

Next, a method of calculating a moving target point will be discussed by using FIGS. 12(a) and (b). FIG. 12 shows the real coordinate system and (b) in the same diagram shows the screen coordinate system.

Figure 12A:
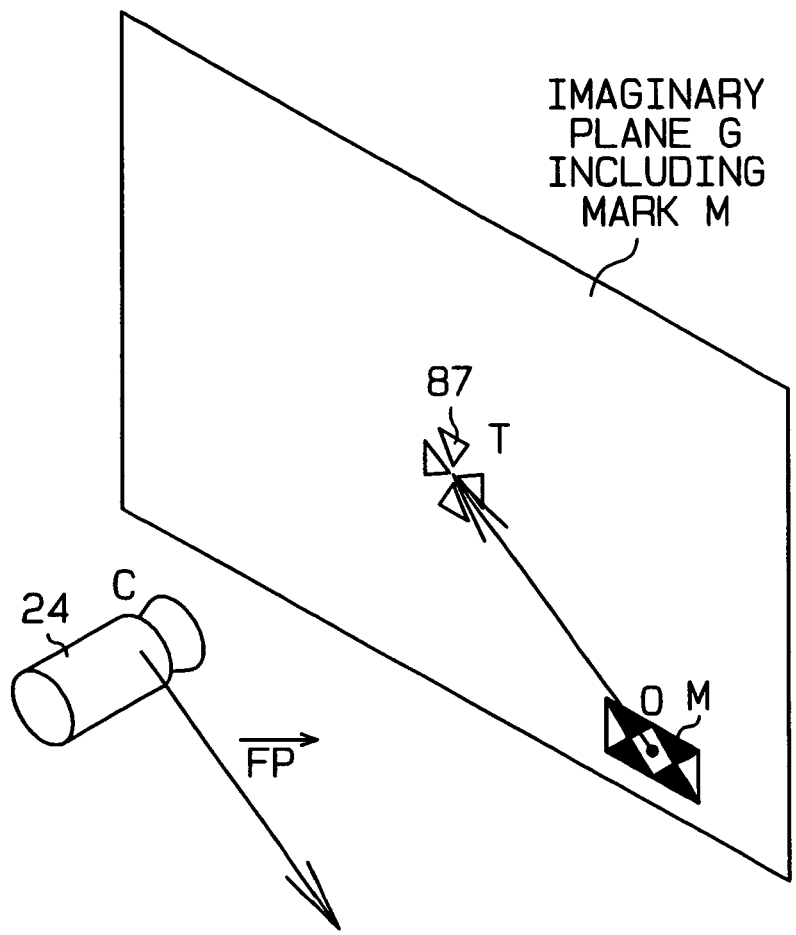
FIG. 12(a) and FIG. 12(b) are exemplary diagrams for explaining a method of calculating a drawing position, and respectively showing the real coordinate system and the screen coordinate system.

Let us consider an imaginary plane (YZ plane) G including the mark M in the real coordinate system as shown in FIG. 12(a). This imaginary plane G is equivalent to an image pickup area picked up by the camera 24 and displayed on the screen 28A, and is assumed to be moved together with the movement of the camera 24. In consideration of a load pickup work, to position the forks 2 to the pallet 41, the camera 24 is moved parallel to the imaginary plane G according to the vector FP (X component not considered) and the imaginary plane G is moved together with the camera 24, so that the mark M on the imaginary plane G is moved toward the moving target point mark 87 and the origin O coincides with the moving target point T. Thus, $$\text{vector } OT = -\text{vector } FP \tag{8}$$

is given.

Figure 12B:
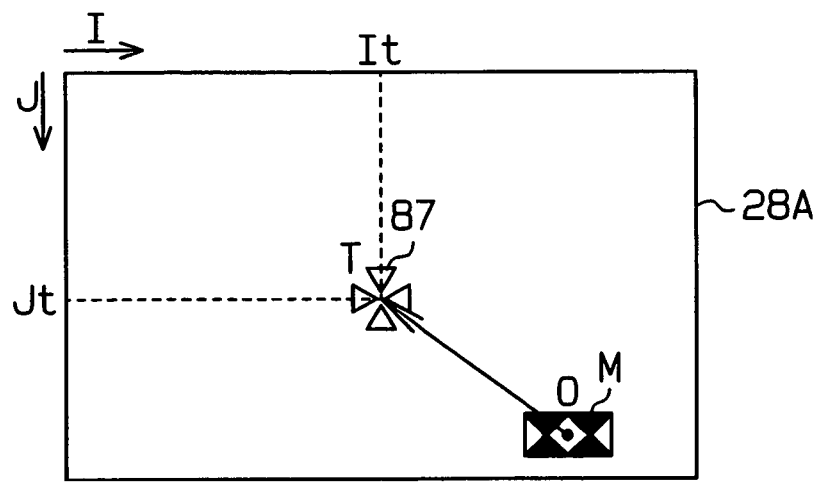

Let the screen coordinate system of the moving target point T be (It, Jt) as shown in FIG. 12(b). The components (Xc, Yc, Zc) of the vector OC directed toward the camera position C from the origin O (screen coordinates (I, J)) in the real coordinate system are expressed by the equations (2) and (3) by using the screen coordinates (I, J). With regard to the components (Xtc, Ytc, Ztc) of the vector TC directed toward the camera position C from the moving target point T (screen coordinates (I, J)), therefore, the relationships in the equations (2) and (3) are likewise met by using the screen coordinates (I, J), so that they are expressed as follows.

$$Ytc = d/D(It - H/2) \tag{9}$$

$$Ztc = d/D(Jt - V/2) \tag{10}$$

From the relationship of $$\text{vector } TC = \text{vector } OC - \text{vector } OT \tag{11},$$

substituting the relationship in the equation (8) into the equation (11) yields an equation (12).

$$\text{vector } TC = \text{vector } OC + \text{vector } FP \tag{12}$$

Substituting the relationship in the following equation (13) into the equation (12) yields an equation (14).

$$\text{vector } FP = \text{vector } OP - \text{vector } CF - \text{vector } OC \tag{13}$$

$$\text{vector } TC = \text{vector } OP - \text{vector } CF \tag{14}$$

The components of the vector OP are (Xp, Yp, Zp) and the components of the vector CF are (Xcf, Ycf, Zcf). To obtain the coordinates (It, Jt) of the moving target point, assuming that the mark M is replaced with the moving target point T, the computation has only to be carried out by replacing the components of the vector OC with the components of the vector TC and replacing I with It and J with Jt in the equations (2) and (3).

The components (Xtc, Ytc, Ztc) of the vector TC are expressed by an equation (15) by using the relationship in the equation (14).

$$(Xtc, Ytc, Ztc) = (Xp, Yp, Zp) - (Xcf, Ycf, Zcf) = (Xp\,Xcf, Yp-Ycf, Zp-Zcf) \tag{15}$$

Thus, the relationship in an equation (16) is obtained from the equations (9) and (15).

$$Yp - Ycf = d/D(It - H/2) \tag{16}$$

Further, the relationship in an equation (17) is obtained from the equations (10) and (15).

$$Zp - Zcf = d/D(Jt - V/2) \tag{17}$$

Solving the equations (16) and (17) for It and Jt respectively, the coordinates (It, Jt) of the moving target point T at the time of a load pickup work are acquired as in the equations (4) and (5).

Likewise, let us consider a load deposition work. To position the forks 2 to the load deposition position R lying above the shelf plate 42 by a predetermined distance (10 to 20 cm), the camera 24 is moved parallel to the imaginary plane G according to the vector FR (X component not considered) and the imaginary plane G is moved together with the camera 24, so that the mark M2 on the imaginary plane G is moved toward the moving target point mark 87 and the origin O coincides with the moving target point T. Thus, $$\text{vector } OT = -\text{vector } FR \tag{18}$$

is given. Substituting the equation (18) into the equation (11) yields the following equation (19).

$$\text{vector } TC = \text{vector } OC + \text{vector } FR \tag{19}$$

Substituting the relationship in the following equation (20) into the equation (19) yields an equation (21).

$$\text{vector } FR = \text{vector } OR - \text{vector } CF - \text{vector } OC \quad (20)$$

$$\text{vector } TC = \text{vector } OR - \text{vector } CF \quad (21)$$

The components of the vector OR are (Xr, Yr, Zr) and the components of the vector CF are (Xcf, Ycf, Zcf). To obtain the coordinates (It, Jt) of the moving target point, assuming that the mark M is replaced with the moving target point T, the computation has only to be carried out by replacing the components of the vector OC with the components of the vector TC and replacing I with It and J with Jt in the equations (2) and (3).

The components (Xtc, Ytc, Ztc) of the vector TC are expressed by an equation (22) by using the relationship in the equation (21).

$$(Xtc, Ytc, Ztc) = (Xr, Yr, Zr) - (Xcf, Ycf, Zcf) = (Xr-Xcf, Yr-Ycf, Zr-Zcf) \quad (22)$$

Because information to be obtained finally is the screen coordinates when the mark M is on the final reaching point, as the relationship in the equation (22) is substituted into the equations (2) and (3) and they are solved for the coordinates (It, Jt) of the moving target point, the coordinates of the moving target point in a load deposition work are obtained as the equations (6) and (7).

A description will now be given of the automatic fork positioning control and the process of drawing the moving target point mark 87.

First, when the forks 2 are lifted at a height exceeding the set height, a process for image recognition of the mark M is carried out based on image data picked up by the camera 24. That is, image processing to identify the mark M1 is carried out using the template T1 in a load pickup mode and image processing to identify the mark M2 is carried out using the template T2 in a load deposition mode. Then, positional data I, J and D values of the image-recognized mark M on the screen are obtained.

The display position determining section 84 computes the coordinates (It, Jt) of the moving target point T using the data D value among them. That is, the coordinates (It, Jt) of the moving target point are computed according to the equations (4) and (5) at the time of a load pickup work and the coordinates (It, Jt) of the moving target point are computed according to the equations (6) and (7) at the time of a load deposition work. Those coordinate data (It, Jt) are sent to the drawing display section 77. The drawing display section 77 reads figure data for a display mark from the drawing data memory section 78 according to an instruction from the display position determining section 84 and displays the moving target point mark 87 at the coordinates (It, Jt) as shown in FIG. 13(a) in such a way as to overlie the image.

On the screen 28A at the time of a load pickup work, the moving target point mark 87 indicating the moving target point T where the mark M1 should reach finally at the time the forks 2 are positioned to the pallet 41 is displayed. On the screen 28A at the time of a load deposition work, on the other hand, the moving target point mark 87 indicating the moving target point T where the mark M2 should reach finally at the time the forks 2 are positioned above the shelf plate 42 by a predetermined distance is displayed.

As the activation switch 38 of the multi lever 31 is operated, automatic fork positioning control is initiated. The load handling control section 47 computes the relative positional coordinates (Xc, Yc, Zc) of the camera 24 with the mark M as the origin O based on the positional data I, J and D values. Then, to set the vector FP to zero, control amounts for setting both Yc and Zc values to zero is obtained. Then, the load handling control section 47 performs current value control of the electromagnetic proportional valves 65 and 66 for lifting and the electromagnetic proportional valve 68 for side shifting via the solenoid drive circuit 44 based on the control amounts and performs drive control of the lift cylinders 15A and 15B and the side shift cylinder 71, thereby positioning the forks 2. As a result, the forks 2 are moved in the up and down direction by −Zc and moved in the left and right direction by −Yc.

Figure 13B:
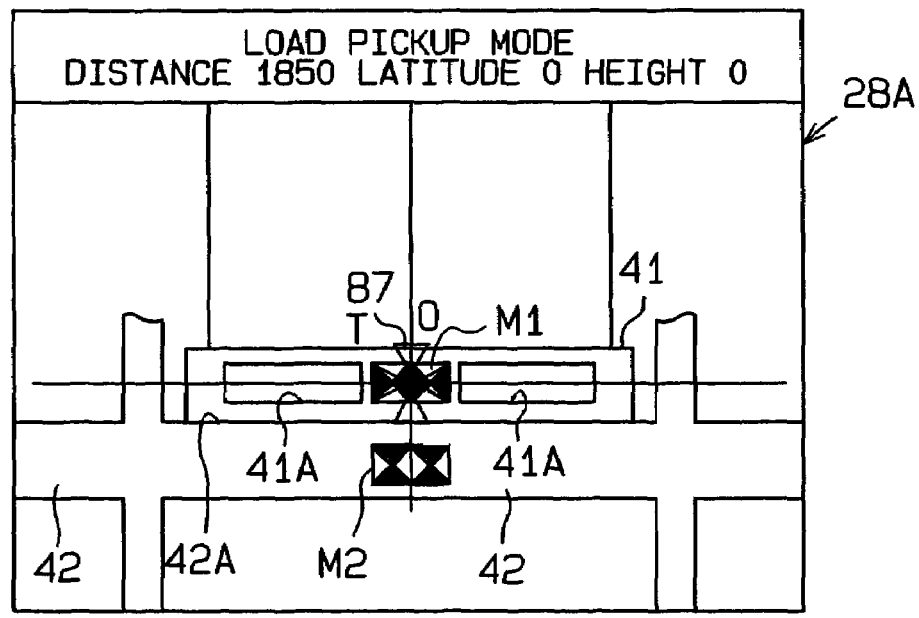

As the forks 2 are moved, at the time of a load pickup work, for example, the center point of the mark M1 matches with the moving target point T or the center point of the moving target point mark 87 and the forks 2 are positioned to the load pickup position that matches with the insertion holes 41A, as shown in FIG. 13(b). At the time of a load deposition work, on the other hand, the center point of the mark M2 matches with the moving target point T and the forks 2 are positioned to the load deposition position that lies above the shelf surface 42A by about 10 to 20 cm.

As the moving target point T to which the mark M should be moved can be seen on the screen 28A this way, it is possible to easily visually check if the forks 2 are positioned by confirming the coincidence of the center points of the mark M and the moving target point mark 87 with each other. At the time of a load carrying work, the driver can also determine whether or not the forks 2 are positioned correctly to an intended load handling target.

The embodiment has the following advantages.

(1) At the time automatic fork positioning control is executed, the moving target point mark 87 indicating the moving target point of the mark M affixed to a load handling target is drawn on an image on the screen 28A. Therefore, the moving target point to which the mark M should be moved at the time of positioning the forks 2 to the load handling target can be visually checked at a glance through the screen 28A from the drawn position of the moving target point mark 87 on the screen 28A. It is therefore possible to check how the forks 2 are positioned from the process in which the mark M affixed to the load handling target is moved on the screen 28A toward the moving target point mark 87. Then, the completion of the automatic positioning control of the forks 2 can be known through the screen 28A when both marks M and 87 coincide with each other on the screen 28A.

(2) As the method of selecting the mark M for position detection (subject to be image-recognized) affixed to a load handling target and drawing the mark 87 on the moving target point is employed, by paying attention to the two marks M and 87 displayed or drawn on the screen 28A, the state of positioning the forks 2 can easily be grasped from their positional relationship.

(3) By checking if the mark M matched with the moving target point mark 87 is on the pallet 41 or on the shelf plate 42, it is possible to easily find out through the image on the screen 28A whether the positioning of the forks 2 has been successful or failed.

(4) As the deviation amounts between the forks 2 and the load handling target 41, 42 in the three directions (X, Y and Z directions) are displayed in numerical values on the screen 28A, the driver can see in which direction and how much distance the forks 2 should be moved.

(5) In the automatic fork positioning control, the driver can see the progressing state of the control and can obtain a sense of security in the satisfactory progress of the control and a timely preparation for the next operation at the time of the control is finished.

(6) As the moving target point mark 87 is drawn distinguishably between the load pickup mode and load deposition mode, it is possible to cope with both load handling modes.

(7) As the lifting system for lifting the camera 24 up and down with respect to the carriage 14, the camera 24 is moved and placed in two positions, the storage position and the lift-down position, in accordance with the type of the load carrying work (load pickup work, load deposition work). As a result, the image of the work area can be picked up by the camera 24 placed in the storage position at approximately the same height as the forks 2 at the time of a load pickup work in which there is no load on the forks 2. At the time of a load deposition work in which there is a load on the forks 2, on the other hand, the image of the work area can be picked up by the camera 24 placed in the lift-down position without being obstructed by the load. Therefore, the image pickup angle for an image displayed on the screen 28A is convenient for the positioning of the forks 2.

(8) By using the camera 24 and display device 28 provided to assist a load carrying work at a high place, the moving target point mark 87, which becomes a mark for visual confirmation of the moving target point is drawn on the screen 28A of the display device 28. That is, the position of the mark M is calculated through an image recognition process using image data picked up by camera 24 and the coordinates of the moving target point are calculated by using the positional data (I, J, D) of the mark M, acquired for automatic fork positioning control, to thereby obtain the drawing position of the moving target point mark 87.

Therefore, fewer calculation processes, which are added only for the positional calculation of the moving target point, are required and the load of the CPU for automatic fork positioning control need not be increased much even if a drawing process of drawing the moving target point mark 87 on the screen 28A is added.

Second Embodiment

In the second embodiment, a load handling operation aiding apparatus of a type that has a camera fixed to the mast is adopted.

Figure 14:
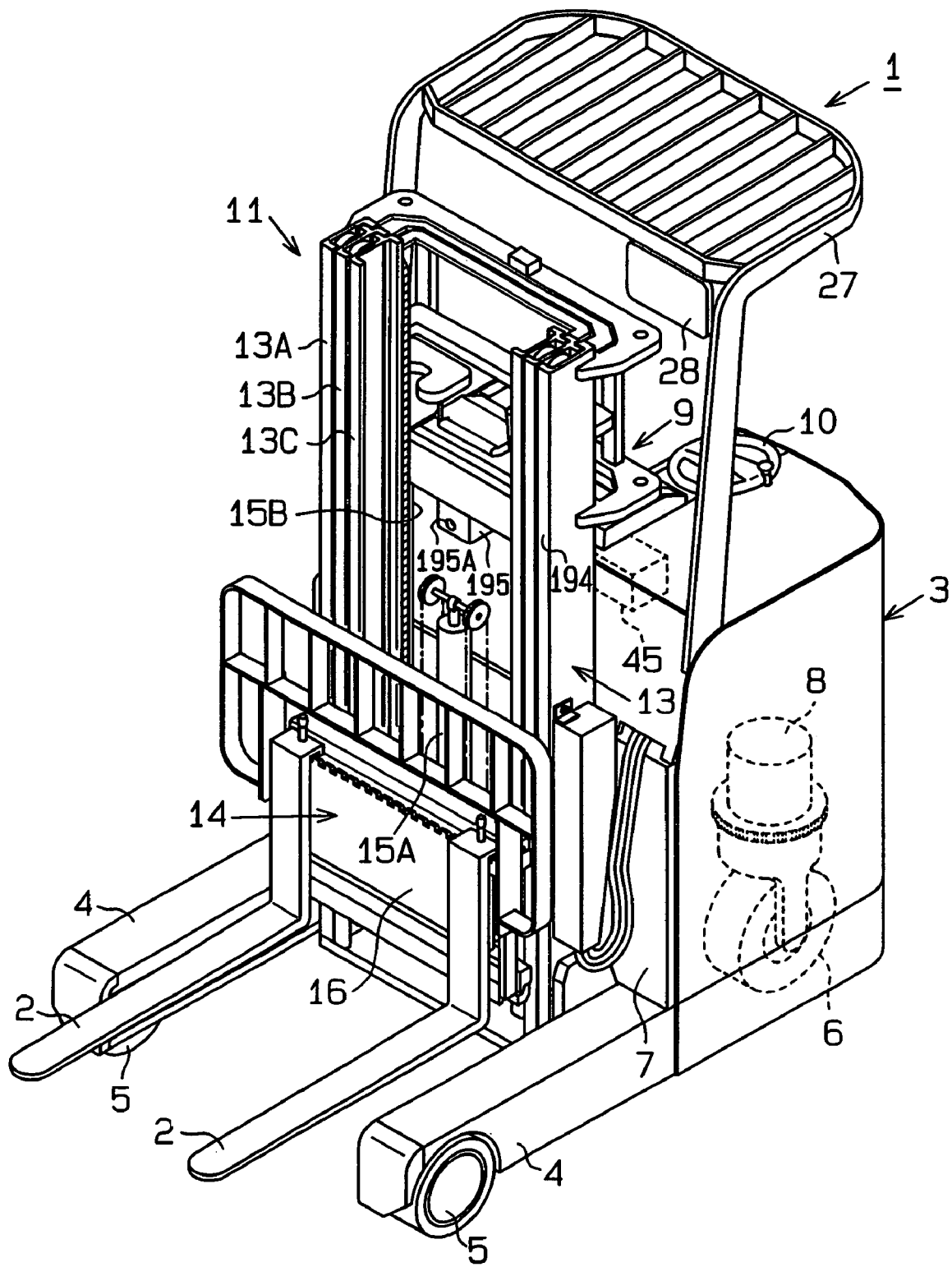
FIG. 14 is a perspective view of a forklift according to a second embodiment.

As shown in FIG. 14, the mast 13 comprises the outer mast 13A, the middle mast 13B and the inner mast 13C in order from the outer side. A beam 194 is laid horizontally in a position slightly above the height directional center of the inner mast 13C and a camera 195 is fixed to the bottom surface of the beam 194. An image pickup section 195A of the camera 195 faces forward to be able to pick up the image of a work area of the forks 2.

Figure 15:
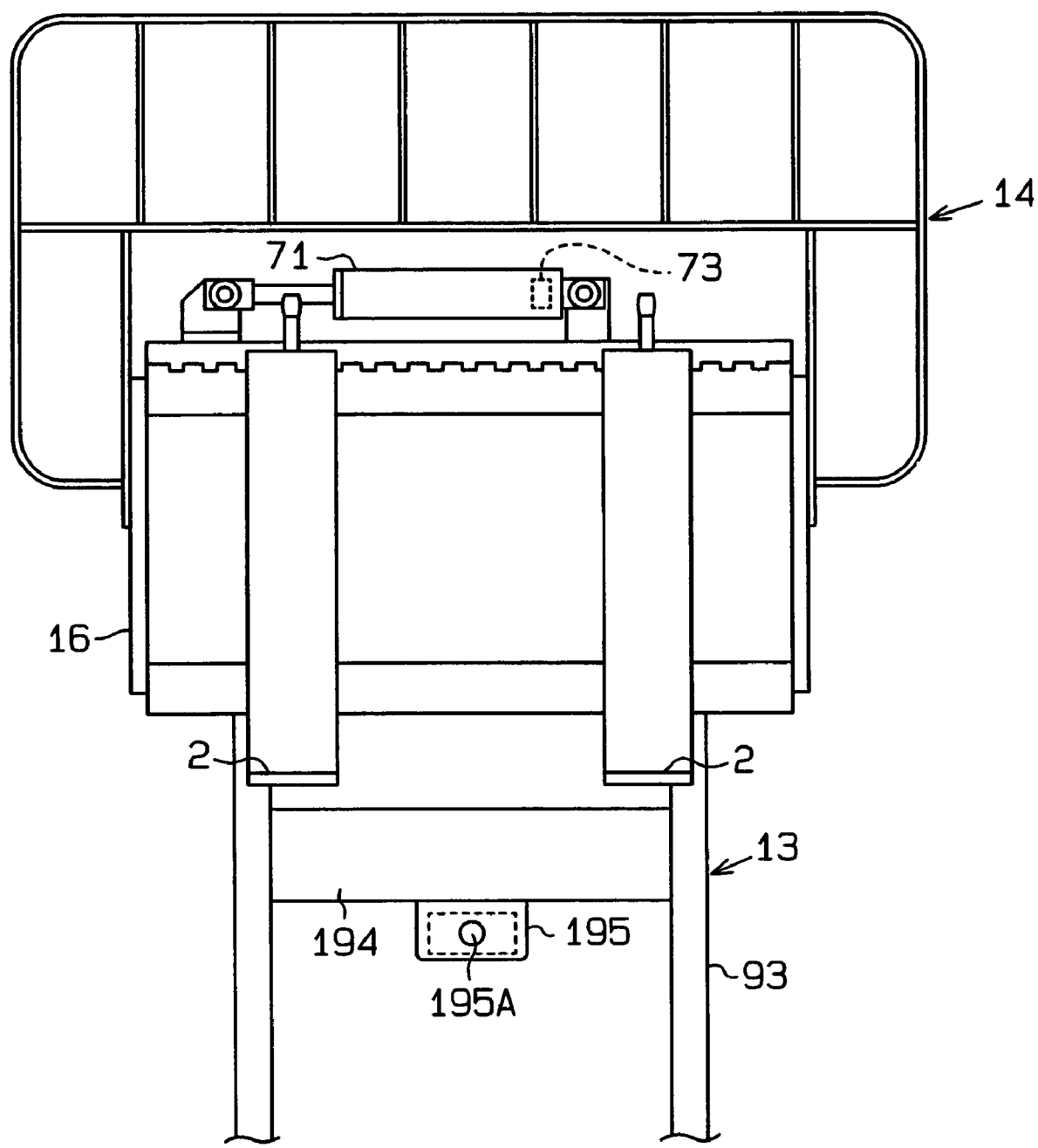
FIG. 15 is an exemplary partly front view of a load handling apparatus with a camera fixed to a mast.

FIG. 15 shows a part of a load handling apparatus (mast assembly) from the front and shows the carriage 14 placed in the topmost position of the inner mast 13C. In that state, the camera 195 is positioned below the forks 2 by a predetermined distance and is positioned in a middle of a pair of forks 2 with the carriage 14 not side-shifted with regard to the left and right direction (vehicle's widthwise direction). The mast 13 is of a telescopic type (full free type) and does not start protracting until the carriage 14 reaches the topmost position of the inner mast 13C. When the mast protracts after the carriage 14 reaches the topmost position of the inner mast 13C, i.e., at a height equal to or higher than a predetermined height after the carriage 14 reaches the topmost position of the inner mast 13C, therefore, the positional relationship between the forks 2 and the camera 195 is always kept constant in the up and down direction.

The position of the camera 195 shown in FIG. 15 is approximately equivalent to the position at which the camera is moved down with respect to the forks 2 in the first embodiment. Even at the time of a load deposition work in which a load is placed on the forks 2, the mark M2 affixed to the shelf plate 42 as a load handling target at that time can be picked up by the camera 195. Of course, at the time of a load pickup work in which no load is placed on the forks 2, the mark M1 affixed to the pallet 41 as a load handling target at that time can be picked up. As apparent from the above, the embodiment differs from the first embodiment only in that the camera 195 is secured to the inner mast 13C, and the controller 45 electrically connected to the camera 195 performs image processing and load handling control using image data picked up by the camera 195 as per the first embodiment.

A stroke sensor 73 is provided on the side shift cylinder 71 and detects the stroke amount of the side shift cylinder 71. The side shifting amount of the forks 2 is grasped from the detection result from the stroke sensor 73 and the relative positional relationship between the forks 2 and the camera 195 in the left and right direction (Y direction) or the deviation amount between the camera 195 and the forks 2 in the Y direction is grasped.

Figure 16:
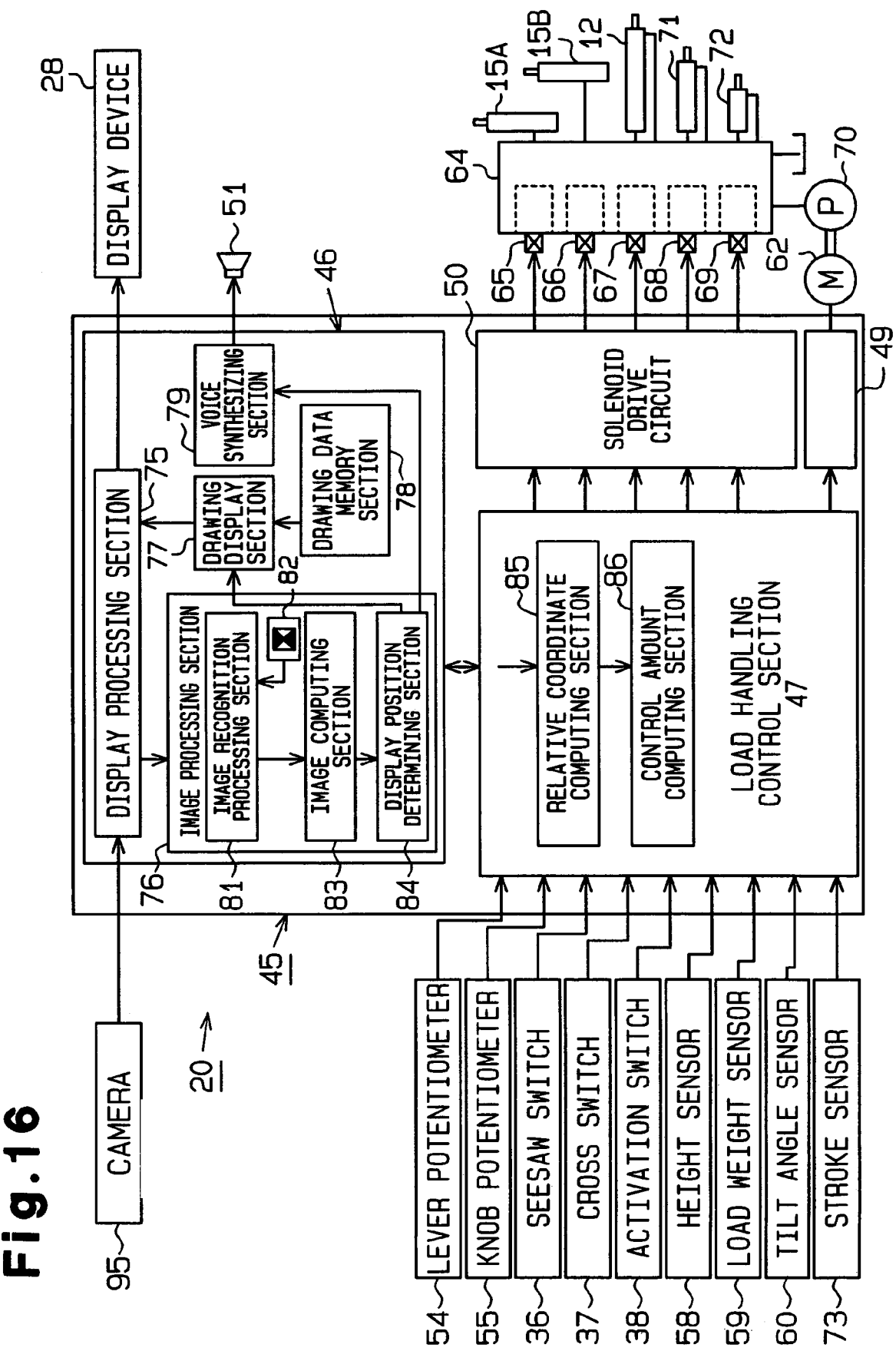
FIG. 16 is a block diagram showing the electrical structure of a load handling operation aiding apparatus.

FIG. 16 shows the control circuit of the load handling operation aiding apparatus 20. As shown in the diagram, the aiding apparatus 20 basically has the same electrical structure as that of the first embodiment. As the camera 195 is fixed to the inner mast 13C, however, sensors for the camera lifting apparatus and the actuator become unnecessary and are thus omitted. In the present embodiment, the deviation amount between the camera 195 and the forks 2 in the Y direction is acquired from the measured value from the stroke sensor 73, and using it, the moving target point and the deviation amounts between the forks 2 and the load handling target in the X, Y and Z directions are computed.

A description will now be given of a method of calculating the moving target point in the present embodiment.

To position the forks 2 to the pallet 41 at the time of a load pickup work, the coordinates (It, Jt) of the moving target point to which the mark M1 should be moved on the screen 28A are given by the following equations as per the first embodiment.

$$It = H/2 + (Yp - Ycf)*D/d \quad (4)$$

$$Jt = V/2 + (Zp - Zcf)*D/d \quad (5)$$

where It is the horizontal coordinate of the moving target point on the screen, Jt is the vertical coordinate of the moving target point on the screen, H is the number of horizontal pixels of the screen, V is the number of vertical pixels of the screen, Yp is the horizontal coordinate of the moving target point of the center position of forks as seen from the mark M1, Zp is the vertical coordinate of the moving target point of the center position of forks as seen from the mark M1, Ycf is the horizontal coordinate of the center position of the forks as seen from the camera, Zcf is the vertical coordinate of the center position of the forks as seen from the camera, d is the actual distance of the mark, and D is a mark size [pixels] acquired through image processing. Ycf is measured and calculated by using the stroke sensor 73. Yp, Zp and Zcf are known values. The center position of a pair of forks is the position at which a bisector of the layout interval of the forks intersects a line passing through the bent portions of the forks.

At the time of a load deposition work, the coordinates (It, Jt) of the moving target point to which the mark M2 should be moved on the screen 28A to position the forks 2 to the load deposition position R lying above the shelf surface 42A by a predetermined distance (10 to 20 cm) with respect to the shelf plate 42 are given by the following equations.

$$It = H/2 + (Yr - Ycf)*D/d \quad (6)$$

$$Jt = V/2 + (Zr - Zcf)*D/d \quad (7)$$

where Yr is the horizontal coordinate of the moving target point at the horizontal center of the bases of the forks as seen from the mark M2, and Zr is the vertical coordinate of the moving target point at the horizontal center of the bases of the forks as seen from the mark M2, and both are known values.

Although Ycf is a fixed value for the camera 24 is attached to the side shifter 16 and moved together with the forks 2 in the first embodiment, Ycf is a variable which varies according to the state of side shifting in this embodiment since the camera 24 does not move even when the forks 2 are moved sideways by side shifting. Therefore, Ycf used in the equations (4) and (6) is obtained by measurement with the stroke sensor 73.

As the amount of retraction $\Delta Y$ from the fully protracted state of the side shift cylinder 71 is measured by the stroke sensor 73 and let Ycf when $\Delta Y=0$ be Ycf0, the variable Ycf is expressed by the following equation.

$$Ycf = Ycf0 + \Delta Y \quad (23)$$

Substituting the equation (23) into the equations (4) and (6) yields the following equations.

$$It = H/2 + (Yp - Ycf0 - \Delta Y)*D/d \quad (24)$$

$$It = H/2 + (Yr - Ycf0 - \Delta Y)*D/d \quad (25)$$

where Ycf0 is the horizontal coordinate of the horizontal center of the bases of the forks at the time the side shift cylinder 71 is fully protracted, as seen from the camera 24, $\Delta Y$ is the retracted amount (measured by the stroke sensor 73) from the fully protracted state of the side shift cylinder 71, and Zcf is the vertical coordinate of the horizontal center of the bases of the forks as seen from the camera.

The second embodiment has the following advantages.

As the camera is fixed to the inner mast 13C, it is possible to eliminate the need for the camera lifting apparatus used in the first embodiment so that the image pickup system can be realized with a simple structure and at a low cost. What is more, as the moving target point mark 87 is drawn on the screen 28A, the driver can visually check, at a glance, the moving target point to which the forks 2 should be moved, from the mark 87 drawn on the image on the screen 28A. Therefore, the advantages (1) to (6) and (8) discussed in the first embodiment are also obtained.

Third Embodiment

Figure 17:
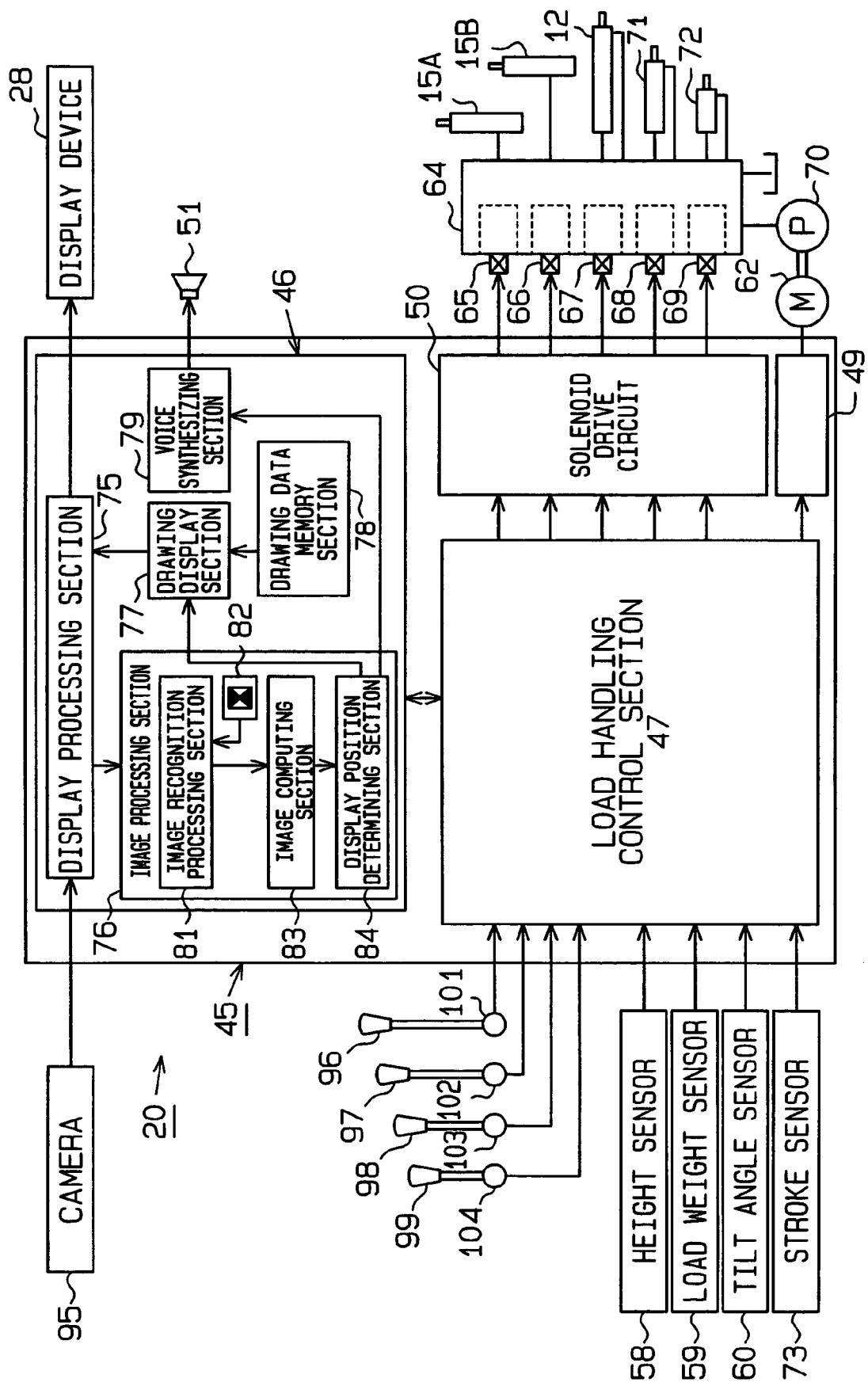
FIG. 17 is a block diagram showing the electrical structure of a load handling operation aiding apparatus according to a third embodiment.
Figure 18A:
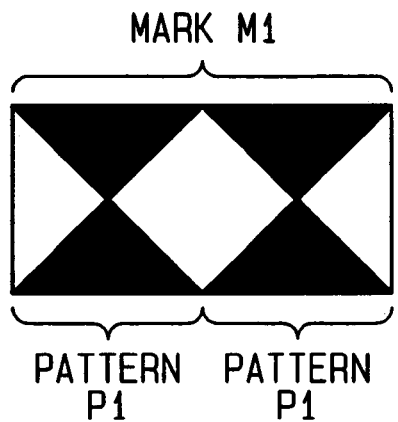
FIGS. 18(a) through 18(d) are front views showing marks and templates according to a fourth embodiment.
Figure 18B:
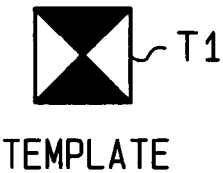
Figure 18C:
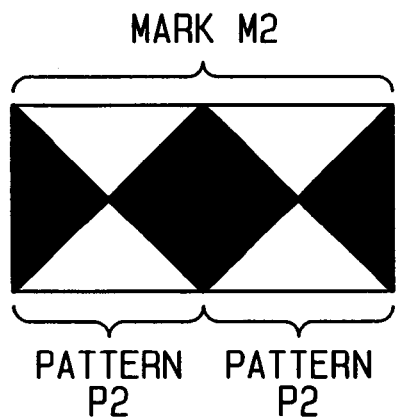
Figure 18D:
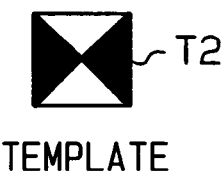

The third embodiment differs from the individual embodiments in that automatic control to automatically position the forks is not employed. FIG. 17 shows the control circuit of a load handling operation aiding apparatus. The camera 195 is fixed to the inner mast 13C as per the second embodiment.

Because automatic positioning control is not carried out, the relative coordinate computing section 85 and the control amount computing section 86 in the load handling control section 47 are omitted. The load handling control section 47 is electrically connected with individual sensors 101 to 104 for detecting the operations of load handling levers provided on the instrument panel in the driver's seat 9, namely, a lift lever 96, a reach lever 97, a side shift lever 98 and a tilt lever 99, and sensors similar to the sensors 58 to 60 and 73 of the second embodiment. The load handling control section 47 performs current value control of the solenoids of the electromagnetic proportional valves 65 to 69 via the solenoid drive circuit 50 based on signals from the individual sensors 101 to 104, and performs drive control of the cylinders 12, 15A, 15B, 71 and 72 in accordance with the operations of the individual levers 96 to 99. The lift lever 96 and the side shift lever 98 constitute manual operation means.

Although the forklift according to the present embodiment is of a manual operation type, which drives and controls the cylinders by manual operation of the levers, the image of a work area at a high place picked up by the camera 195 is displayed on the screen 28A of the display device 28. The image control section 46 has a structure similar to that of each of the above-described embodiments, and performs mark image recognition process, mark positional data calculating process, a calculating process for a moving target point and a drawing process for positioning information, such as a moving target point mark, based on image data picked up by the camera 195.

At a height equal to or higher than a predetermined height, therefore, the moving target point mark 87 indicating the moving target point of the forks 2 is drawn on the screen 28A. Therefore, the image of a work area at a high place is displayed on the screen 28A and the moving target point can be visually checked from the mark 87 when the positioning of the forks 2 is manually done while viewing the screen 28A. The deviation amounts between the forks 2 and the load handling target 41, 42 in the X, Y and Z directions are also drawn on the screen 28A. Therefore, the advantages (2) and (4) to (6) can be obtained as per each of the above-described embodiments.

According to the present embodiment, the driver can reliably position the forks 2 to the load handling target 41, 42 by performing the load handling operation in such a way that the deviation amounts between the forks 2 and the load handling target 41, 42 in the three directions, drawn on the screen 28A, become "0". This can improve the efficiency of a load carrying work in a position that is difficult to see with eyes, such as a highly lifted place.

The embodiment is not limited to what is described above but can be worked in the following modes.

In each of the above-described embodiments, whether the content of the load carrying work is a load pickup work or a load deposition work is discriminated based on the detected value from the load weight sensor, according to the type of the discriminated load carrying work, and the target mark M is determined to decide whether the load handling target is a pallet or a shelf plate. Instead, a method of providing a button to be operated to designate a load carrying work on, for example, the instrument panel in the driver's seat and designating the type of the load carrying work to the controller by a driver's operating the button can be employed.

The target for an image recognition process (to-be-subjected-to-image-recognition target) based on image data picked up by the camera is not limited to the mark M1, M2 affixed to the load handling target. For example, a scheme of performing an image recognition process with the shape or the like of the pallet 41 or the shelf plate 42 as a pattern and calculating the position of the load handling target can be employed, too.

The design of the moving target point mark 87 is not limited to those of the above-described embodiments. Any shape that can specify a moving target point is sufficient. For example, a figure whose shape has directivity, such as an arrow figure indicating a moving target point can be used. A mark with a predetermined shape, such as a circle, triangle, rectangle and polygon, may be drawn in such a way that the barycenter coincides with the moving target point. A mark to be displayed on the screen as a mark indicating a target moving point can take any design or figure. For example, it may be a "cross", "point", "line" or the like. If it is cross lines, for example, positioning has only to be done in such a way that the barycenter of the mark M coincides with two vertical and horizontal lines constituting the cross lines, so that an operation to position the forks is easy in case of the manual operation type. Further, it may be a radial figure, other line figures and illustrations. A figure which has a point symmetrical property as used in each of the above-described embodiments is however preferable because it is easy to specify a point. A mark (target point sign) is not limited to a still picture but may be a moving picture. The mark may be flickered or its color may be changed with the passage of time. Because the positional range where the forks can be inserted into the holes of a pallet can be regarded as a positioning range, the display color of the sign may be changed, when the forks are positioned within this positioning range, to visually notify a driver to that effect.

If a driver can be visually notified of the moving target point, it should not necessarily be limited to displaying a mark in the position of the moving target point. For example, a scheme of drawing two signs separately indicating the I coordinate and J coordinate of the moving target point along two vertical and horizontal sides of the screen 28A and specifying the moving target point on the screen by specifying the I coordinate and J coordinate from both signs can be employed.

Although a radial figure is used as an image recognition mark, it is not limited to such a figure. It may be a simple figure, such as a rectangle (■) or a triangle (Δ). While it is necessary to prepare multiple templates depending on the pattern matching, which takes time in an image recognition process, the position of a load handling target can be detected. An image recognition method other than pattern matching may be used to detect the position of a load handling target. It is possible to employ a method of acquiring the coordinates of a moving target point using a method other than image recognition. For example, a method of detecting the position of a load handling target by detecting a to-be-detected portion affixed to a load handling target, such as a pallet or a shelf portion (shelf plate), can be employed.

As positioning information, information is sufficient which shows the direction and the deviation amount at the time of positioning a load carrying apparatus to a load handling target. That is, unlike in the above-mentioned embodiment, it need not be the distance itself to which the forks 2 are to be shifted for positioning. For example, a gauge indicating the shift amount for positioning in the YZ directions as a relative amount with the screen scale being 100 may be drawn.

Although the moving target point mark 87 in each of the above-described embodiments is the moving target point of the mark M on the screen 28A, it should not necessarily be the moving target point of the mark M. For example, with a hole 41A in one side of the pallet 41 (e.g., the right-hand side) taken as a reference, a moving target point mark indicating the moving target point of the hole 41A may be drawn. In short, it is sufficient to set a reference point convenient at the time of positioning a load carrying apparatus to a load handling target somewhere and draw a sign indicating a moving target point to which the reference point should be moved at the time of positioning the load carrying apparatus to the load handling target. The reference point may be set anywhere outside the vehicle as long as it performs the role, and it can be a part of the load handling target, a specific location around the load handling target (e.g., a specific location of a rack), or a mark affixed to the part or the locations. In case where the reference point is a mark, a mark for image recognition should not necessarily be used as the mark but a mark for the reference point can be provided separate from the mark M1, M2.

Although the forks 2 can be positioned in the up and down direction and left and right direction with the moving target point mark in each of the above-described embodiments, a moving target point mark which can position only in one direction in up and down or left and right may be displayed on the screen.

In case of manual operation to position the forks as in the third embodiment, it is necessary to manipulate the forks in the up and down direction and left and right direction. At this time, a method of indicating positions, if matched in the moving direction in each of the up and down direction and left and right direction, in a display mode visually indicating to that effect or notifying it by sounds is employed.

In the third embodiment, the camera 24 of the first embodiment may be provided on the inner mast 13C in a liftable manner. That is, the camera 24 is attached to the beam of the inner mast 13A in a liftable manner between two positions equivalent to the storage position and lift-down position in the first embodiment in the relative positional relationship between the camera 24 and the forks 2. An image is picked up by the camera 24 placed in the storage position at the time of a load pickup work and is picked up by the camera 24 placed in the lift-down at the time of a load deposition work.

The detection means that acquires positional information of a load handling target is not limited to image processing of image data picked up by the camera. For example, a method of measuring the position of a load handling target from a detected value from an ultrasonic sensor, proximity sensor, a laser sensor or the like in use and calculating the deviation amount or the moving target point can be used. In this case, a mark as a to-be-detected target is affixed to a load handling target and the moving target point of the mark can be used as a drawing position of the moving target point mark. In case of employing a sensor-based position detection method other than image processing, the camera may be used together or may be eliminated. In case of eliminating the camera, for example, it is possible to display numerical values in the XYZ directions on the screen of the display device or draw only a mark showing the positional relationship between the load handling target and the moving target point. Even in case where there is a camera, a picked-up image may be used only in position detection, and likewise, only numerical values or only a mark may be drawn on the screen.

In each of the above-described embodiments, the mark M affixed to a load handling target is matched with the moving target point mark 87 on the screen as a method of supporting fork positioning. By way of contrast, it is possible to employ a method of drawing a mark indicating the current fork position, in place of a picked-up mark, on the screen in the proper position and drawing another mark at the moving target point corresponding to that mark to thereby support fork positioning from the positional relationship between the two drawn marks.

Although the deviation amounts (moving distances) in the three directions (XYZ directions) are displayed in each of the above-described embodiments, only the YZ directions or the Z direction may be displayed.

It is not limited to an industrial vehicle in which forks are provided movable in the vehicle's widthwise direction. For example, it may be adapted to a forklift that does not have a side shift function.

The load carrying apparatus is not limited to forks. It may be an attachment other than the forks. It may be a clamping apparatus, which firmly holds a load or a bucket for scooping a load. Further, it may be a load carrying apparatus, which holds a load with magnetic force.

The industrial vehicle is not limited to reach type forklift. It may be a counter balance type forklift. Further, the industrial vehicle is not limited to a forklift. For example, it may be a power shovel. A load to be a target for a load carrying work is not limited to a pallet or a load that is handled on a pallet, but may be a log, a roll of paper, a container, or a fluid or the like, such as sediment, which is handled in a work by industrial vehicles. The load includes a member on which a load is deposited and a load container box other than the pallet.

Fourth Embodiment

The fourth embodiment of the present invention will be described mainly on those that differ from the above-described embodiments according to FIGS. 18 to 21. In this embodiment, a load carrying apparatus performs a predetermined operation in accordance with the type of a load carrying work. To simplify the description, same reference symbols are given to those constituents that are the same as those of each of the above-described embodiments and their detailed descriptions will be omitted.

FIG. 18 shows marks and templates. FIG. 18(*a*) shows the mark M1 for pallet position detection and FIG. 18(*c*) shows the mark M2 for rack position detection. FIG. 18(*b*) shows the template T1 for the mark M1, and FIG. 18(*d*) shows the template T2 for the mark M2. The designs of the marks M1 and M2 in this embodiment are the same as those of the embodiment in FIG. 5 except that their white and black are inverted to those of the designs of the marks in the embodiment in FIG. 5.

The height sensor 58 shown in FIG. 4 detects if the forks 2 are at or higher than a set height (height), and is comprised of a switch whose ON/OFF is switched at, for example, the set height. The automatic fork positioning control is executed only when the detected height of the height sensor 58 is equal to or greater than the set height. The height sensor 58 may be a sensor capable of continuously detecting the height of the forks 2. For example, a reel type height sensor which detects the amount of rotation of a reel from and on which a wire is fed out and wound in accordance with the elevation of the carriage 14 and an ultrasonic height sensor which detects the stroke of a cylinder from the measured time by which an ultrasonic wave that propagates in a fluid in the lift cylinders 15 is reflected at a piston and returned can be employed as the height sensor 58.

The load weight sensor 59 detects the weight of the load 43 placed on the forks 2, and is comprised of a pressure sensor which detects the hydraulic pressure in the lift cylinder 15B in the present embodiment. The load weight sensor 59 sends out a signal of a voltage value according to the weight of the load 43 on the forks 2.

The load handling control section 47 determines "a load present" when a detected value W of the load weight sensor 59 exceeds a predetermined threshold value Wo and determines "no load" when the detected value W is equal to or smaller than the threshold value Wo. As the detected value W of the load weight sensor 59 includes the weight component of the carriage 14 or the like, a detected value at the time of an empty load or a value added with a small value to that detected value is set as the threshold value Wo. For example, it is desirable to set the threshold value Wo in such a way that "load present" is judged when only the pallet 41 is loaded.

The load handling control section 47 enters a standby mode for the activation of the automatic positioning control of the forks only when it is determined that a height condition (height H≧2 (m)) in which the height of the forks 2 which is grasped from the detected value of the height sensor 58 is equal to or greater than the set height (e.g., about 2 meters) is satisfied. After entering the activation standby mode, the load handling control section 47 determines whether or not there is a load 43 placed on the forks 2 based on the detected value from the load weight sensor 59. When having judged that it is "no load", the load handling control section 47 determines that a load carrying work to be done thereafter is a load pickup work and sets the "load pickup mode", and when having judged that it is "load present", it determines that a load carrying work to be done thereafter is a load deposition work and sets the "load deposition mode". The setting process of the load handling mode is performed every predetermined time (e.g. several tens milliseconds)

The camera unit 23 is placed in the storage position when the height H of the forks 2 is less than 2 m. When it is the "load pickup mode" during the activation standby mode (height H≧2 m), the load handling control section 47 places the camera unit 23 in the storage position, whereas in the "load deposition mode", it places the camera unit 23 in the lift-down position. The driving of the electric actuator 61 that has been activated to move the camera unit 23 is stopped when the camera unit 23 reaches the upper-limit position and the upper-limit position detection switch 52 is switched on and is stopped when the camera unit 23 reaches the lower-limit position and the lower-limit position detection switch 53 is switched on. This causes the camera unit 23 to be placed in two positions, the storage position and the lift-down position, and the image of a load carrying work area in front of the forks is picked up by the camera 24 from those two positions.

The camera unit 23 is switched between the storage position and the lift-down position in accordance with the "load pickup mode" and "load deposition mode". The reason is that although it is desirable to pick up an image from approximately the same height as the load deposition portion of the forks 2, while there is no load on the forks 2 at the time of load pickup so that an image can be picked up even if the camera 24 is positioned at approximately the same height as the forks 2, if the camera 24 is positioned at approximately the same height as the forks 2 at the time of load deposition, the load placed on the forks 2 obstructs and the image of the load carrying work area cannot be picked up. In this respect, the camera 24 is placed in the storage position at approximately the same height as the forks 2 in "load pickup mode" while in "load deposition mode", the camera 24 is placed in the lift-down position separated below the forks 2 by a predetermined distance so that the load does not interfere with image pickup.

The automatic fork positioning control is used in a load carrying work at a high place where the forks 2 are positioned at a height of 2 meters or higher. The driver manipulates the knob 35 of the multi lever 31 to lift the forks 2 up and roughly position the forks 2 with respect to the targeting load handling target 41 (42) while viewing the screen of the display device 28. When the activation switch 38 is operated in the state where the mark M1 (M2) affixed to the load handling target 41 (42) to be a target is displayed on the screen, the automatic fork positioning control is initiated.

The tilt angle sensor 60 detects a tilt angle with an angle at which the forks 2 are in a horizontal state as a reference, and is comprised of, for example, a potentiometer. At the time the automatic fork positioning control is performed, the load handling control section 47 controls driving of the tilt cylinder 72 in such a way that the forks 2 are positioned horizontal based on a detected value from the tilt angle sensor 60.

When receiving a signal indicative of the manipulation of the activation switch 38, the load handling control section 47 instructs the image control section 46 to start the automatic positioning control of the forks 2 via communications. The image control section 46 receives from the load handling control section 47 activation instruction data to initiate the image recognition process and load handling mode data indicating whether it is the load pickup mode or the load deposition mode.

The image control section 46 has a display processing section 75, an image processing section 76, a drawing display section 77, a drawing data memory section 78 and a voice synthesizing section 79. The display processing section 75 sends out a video signal input from the camera 24 to the display device 28 in such a way that the image picked up by the camera 24 is displayed on the screen. The voice synthesizing section 79 performs voice synthesizing process for voice guidance or the like and outputs a voice signal to the speaker 51. Image data from the display processing section 75 is input to the image processing section 76.

The image processing section 76 performs an image recognition process to compute the position of the mark M1, M2 on the screen and computes the positional relationship between the vehicle (forks 2) and the load handling target based on the computed position of the mark M1, M2. The image processing section 76 has an image recognition processing section 81, a template memory section 82, an image computing section 83 and a display position determining section 84.

The image recognition processing section 81 performs an image recognition process based on a pattern matching process. The image computing section 83 computes the positional coordinates of the mark M1 (M2) in the screen coordinate system from the result of the image recognition process.

A start command for the image recognition process and load handling mode data or the like sent to the image control section 46 from the load handling control section 47 are input to the image processing section 76. In the image processing section 76, upon reception of those data, an image recognition process is performed by the image recognition processing section 81 and a control amount calculating process for automatic fork positioning control is executed by the image computing section 83, the relative coordinate computing section 85 and the control amount computing section 86 by using the result of the image recognition process.

First, upon reception of the start command data, the image recognition processing section 81 executes the image recognition process of one of the marks M1 and M2 based on the load handling mode data input together then. That is, the image recognition processing section 81 performs an image recognition process with the mark M1 for pallet position detection as a recognition target when the load handling mode recognized based on the load handling mode data is the load pickup mode and performs an image recognition process with the mark M2 for rack position detection as a recognition target when it is the load deposition mode. Stored in the template memory section 82 are a template T1 which is used in a pattern matching process with the mark M1 as a recognition target and a template T2 which is used in a pattern matching process with the mark M2 as a recognition target (see FIG. 18 for both). At the time of executing a pattern matching process, the image processing section 76 uses the template T1 when it is the load pickup mode and uses the template T2 when it is the load deposition mode. This image recognition process is equivalent to a process that is executed by the control means based on the decision result from the decision means.

Figure 19A:
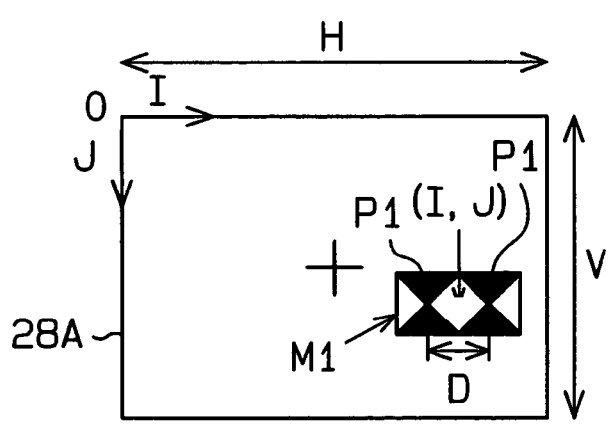
FIG. 19(a) and 19(b) are screen diagrams for explaining a screen coordinate system according to the fourth embodiment.
Figure 19B:
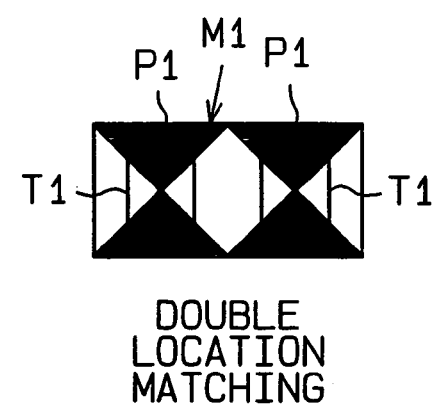

FIG. 19 shows the screen coordinate system set on the screen. In the screen coordinate system, the coordinates are treated pixel by pixel, and in the diagram, H is the number of horizontal pixels of the screen 28A and V is the number of vertical pixels of the screen 28A. The image recognition processing section 81 performs matching with respect to the two patterns P1, P1 (P2, P2) constituting the mark M1 on image data at two locations using the template T1 (T2) and recognizes each pattern P1, P1, as shown in FIG. 19(*b*). The image computing section 83 computes coordinates (I1, J1), (I2, J2) of the center points (radial center points) of the individual patterns P1, P1 recognized by the image recognition processing section 81 and acquires a barycenter (I, J) of the mark M1 and a center distance D between the two patterns P1, P1 based on those two coordinate values.

The display position determining section 84 performs a process of computing a display position (drawing position) for drawing on the screen of the display device 28. The display position determining section 84 computes the drawing position for the contour of the mark and the drawing position of a target mark to be a moving target point of the mark M1 (M2) at the time of positioning the forks 2 to a load handling target. When receiving drawing position data from the display position determining section 84, the drawing display section 77 reads drawing data (image data or the like) corresponding to the drawing content from the drawing data memory section 78 and sends a drawing signal to the display processing section 75 to display the drawing content in the designated drawing position on the picked-up image in such a way that it is overlapped in the designated drawing position on the picked-up image. The voice synthesizing section 79 generates a voice guidance for the driver from the speaker 51, as needed, in synchronism with the drawing timing.

The data (I, J, D) computed by the image computing section 83 is sent to the load handling control section 47 from the image control section 46. The load handling control section 47 has the relative coordinate computing section 85 and the control amount computing section 86. The load handling control section 47 computes control amounts (the amounts of movement in the Y and Z directions) needed to position the forks 2 to the load handling target. The calculation method is the same as that of the above-described embodiment.

Figure 20:
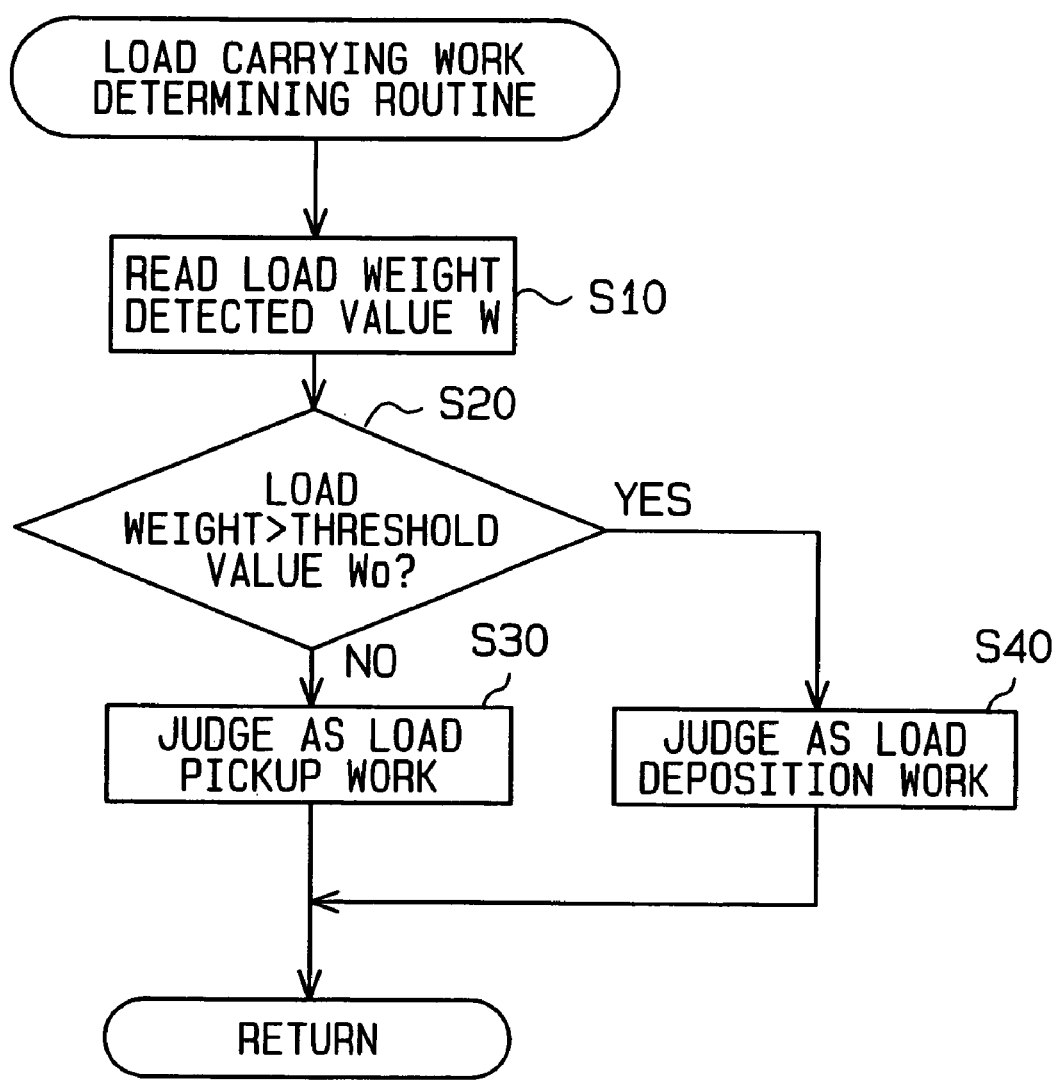
FIG. 20 is a flowchart of a load carrying work determining routine.

The load handling control section 47 stores the program of a load carrying work determining routine as shown in a flowchart in FIG. 20. This routine is executed by a CPU in the load handling control section 47. The CPU executes the lifting control of the camera and automatic positioning control of the forks in accordance with the result of the decision in each routine. In the routine, the CPU determines whether a load carrying work to be conducted next as a result of the operation of the activation switch 38 is a load pickup work, or a load deposition work, and the lifting control of the camera and automatic fork positioning control according to the type of the load carrying work. The automatic fork positioning control is equivalent to automatic load handling control and aiding control to aid it is the camera lifting control.

The following will discuss the load carrying work determining routine which is executed by the CPU of the load handling control section 47 based on FIG. 20.

First, in step (hereinafter simply written as "S") 10, the CPU acquires the detected value from the load weight sensor 59.

In S20, it is determined whether or not the load weight W exceeds the threshold value Wo. When the load weight $W \leq Wo$ is met, the process proceeds to S30 and when the load weight W>Wo is met, the process proceeds to S40.

In S30, it is determined that the load carrying work to be carried out next is a "load pickup work".

In S40, it is determined that the load carrying work to be carried out next is a "load deposition work".

The CPU always judges the contents of the load carrying work by executing this routine every interval of a predetermined time, and allows the forks 2 to carry out a load handling operation according to the decision result when the height is equal to or higher than 2 m and the activation switch 38 is operated. That is, when the height is equal to or higher than 2 m and the activation switch 38 is operated, a load handling operation to place the forks 2 in the "load pickup position" is performed if the decision result is a load pickup work, while a load handling operation to place the forks 2 in the "load deposition position" is performed if the decision result is a load deposition work.

Figure 21:
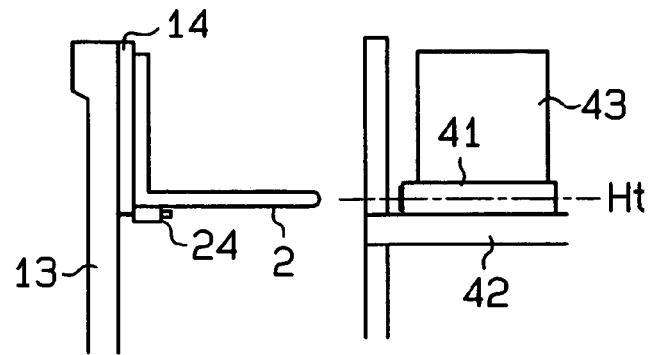
FIG. 21(a) is a side view showing forks placed in a load pickup position and FIG. 21(b) is a side view showing the forks placed in a load deposition position.
Figure 21:
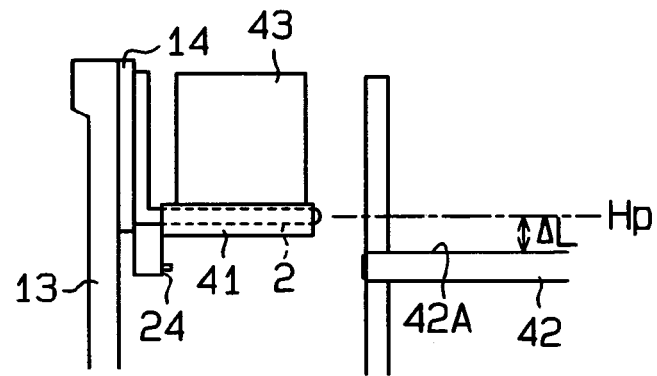

FIG. 21 illustrates a load handling operation based on automatic fork positioning control, and FIG. 21(*a*) shows a state in which the forks are placed in a load pickup position, and FIG. 21(*b*) shows a state in which the forks are placed in a load deposition position. When the detected value (load weight) from the load weight sensor 59 is equal to or smaller than the threshold value Wo ($W \leq Wo$), as described above, it is determined that the load carrying work to be done next is a "load pickup work", and the forks 2 are placed in the load pickup position shown in FIG. 21(*a*). At this time, as the template T1 is read and an image recognition process of the mark M1 for pallet position detection is carried out, the position of the mark M1 is acquired and the relative coordinates (Xc, Yc, Zc) of the mark M1 and the camera 24 are acquired based on data (I, J, D) that is determined from that mark position. The individual controls amounts in the up and down and the left and right directions determined from the relative coordinates (Xc, Yc, Zc) are instructed to the control valve 65. As a result, the forks 2 are placed in a state where they face the holes 41A of the pallet 41 as shown in FIG. 21(*a*). At this time, the forks 2 are positioned at a height Ht.

When the detected value (load weight) W from the load weight sensor 59 exceeds the threshold value Wo (W>Wo), on the other hand, it is determined that the load carrying work to be done next is a "load deposition work", and the forks 2 are placed in the load deposition position shown in FIG. 21(*b*). As the template T2 is read and an image recognition process of the mark M2 for rack position detection is carried out, the position of the mark M2 is acquired and the relative coordinates (Xc, Yc, Zc) of the mark M2 and the camera 24 are acquired based on data (I, J, D) that is determined from that mark position. To place the forks 2 in the load deposition position for the shelf plate 42, the individual controls amounts in the up and down and the left and right directions determined from the relative coordinates (Xc, Yc, Zc) are instructed to the control valve 65. As a result, the forks 2 are placed at a height Hp positioned above the shelf surface 42A by a predetermined distance $\Delta L$ as shown in FIG. 21(*b*).

Prior to that, when the height H of the forks 2 reaches 2 m or higher and the activation standby mode is entered, the lifting control of the camera is started. The camera lifting control is started by a signal input from the height sensor 58 when the height H of the forks 2 reaches the height of 2 m. At this time, it is also determined based on the detected value from the load weight sensor 59 whether or not the load carrying work to be done next is a load pickup work or a load deposition work. The height sensor 58 constitutes the detection means that outputs a signal to be used in determining if the start condition for the camera lifting control as aiding control is satisfied.

While the contents of the camera lifting control program is almost the same as the routine in FIG. 20, inputting of a signal from the height sensor 58 indicating that the height 2 m has been reached in place of the operation of the activation switch 38 is the condition to start that program. When load weight $W \geq Wo$, it is determined that a load carrying work to be done next is a "load pickup work" and the camera unit 23 is placed in the storage position. When the load weight W<Wo, on the other hand, it is determined that a load carrying work to be done next is a "load deposition work" and the camera unit 23 is placed in the lift-down position. During this control, the electric actuator 61 is activated only when it is necessary to move the camera unit 23.

The present embodiment has the following advantages.

(1) As the activation switch 38 is operated, the controller 45 makes a decision on whether the load carrying work to be done next is a load pickup work or a load deposition work based on the detected value from the load weight sensor 59. Then, control of the load handling operation is executed according to the type of the determined load carrying work. It is therefore possible to simplify the driver's operations needed for a load carrying work as much as possible.

(2) When the height condition ($H \geq 2$ m) is met, camera lifting control is started according to the signal from the height sensor 58 and the camera unit 23 is placed in a position according to the type of the load carrying work. At this time, the controller 45 also makes a decision on whether the load carrying work to be done next is a load pickup work or a load deposition work based on the detected value from the load weight sensor 59 and the camera unit 23 is placed in the position according to the type of the determined load carrying work. This makes it unnecessary for the driver to notify the controller 45 of which work the load carrying work to be done next is, so that the driver need not perform any operation for the camera lifting control.

(3) The decision on whether or not there is a load 43 on the forks 2 is executed based on the detected value from the load weight sensor 59. Therefore, the sensor 59 is not easily broken and has a high reliability as compared with the structure that determines the presence/absence of a load by means of a contact type switch, such as a limit switch.

Fifth Embodiment

The fifth embodiment will be described next. This embodiment is an example adapted to an automatic elevation unit equipped on an industrial vehicle. The automatic elevation unit is a unit that registers height data of forks in a memory beforehand in association with an operation button and performs control to automatically lift up the forks to a height corresponding to the button when operated.

Figure 22:
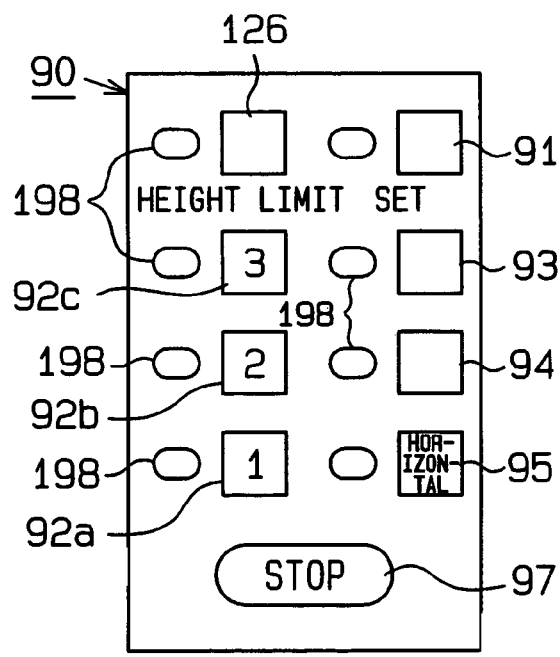
FIG. 22 is a plan view of a control panel of an automatic elevation unit according to a fifth embodiment.

As shown in FIG. 22, the instrument panel of the forklift 1 is provided with a control panel 90 to place the forks 2 automatically in a predetermined position by a separate operation from the knob 35 of the multi lever 31.

The control panel 90 is comprised of a set key 91, three number keys 92a to 92c, a stocking key 93, a shipment key 94, a horizontal key 95, a height limiting key 126, a stop key 197 and LEDs 198 provided adjacent to the individual keys.

The set key 91 is used when the height position of the forks 2 is set or when the height limit position of the forks 2 is set at the time of doing shipment (load pickup) or stocking (load deposition) is performed. The number keys 92a to 92c are used when the height position of the forks 2 is set or when the forks 2 are automatically lifted up and can distinguish three height positions by numbers "1, 2, 3".

The stocking key 93 is used when the forks 2 are automatically lifted up for lad deposition with a load placed on the forks 2 or when the height position is set. The shipment key 94 is used when the forks 2 are automatically lifted up or when the height position is set at the time of picking up a load stored at a predetermined height. The height position can be set distinguishably for each type of the load carrying work. In this embodiment, the stocking key 93 and the shipment key 94 are used only when the height position is set. Of course, the stocking key 93 and the shipment key 94 can be eliminated by employing a method of automatically setting the load deposition height to a position set apart above the load pickup height by a predetermined distance when any of the number keys 92a-92c is selected and the load pickup height (load pickup height) is set.

Figure 23:
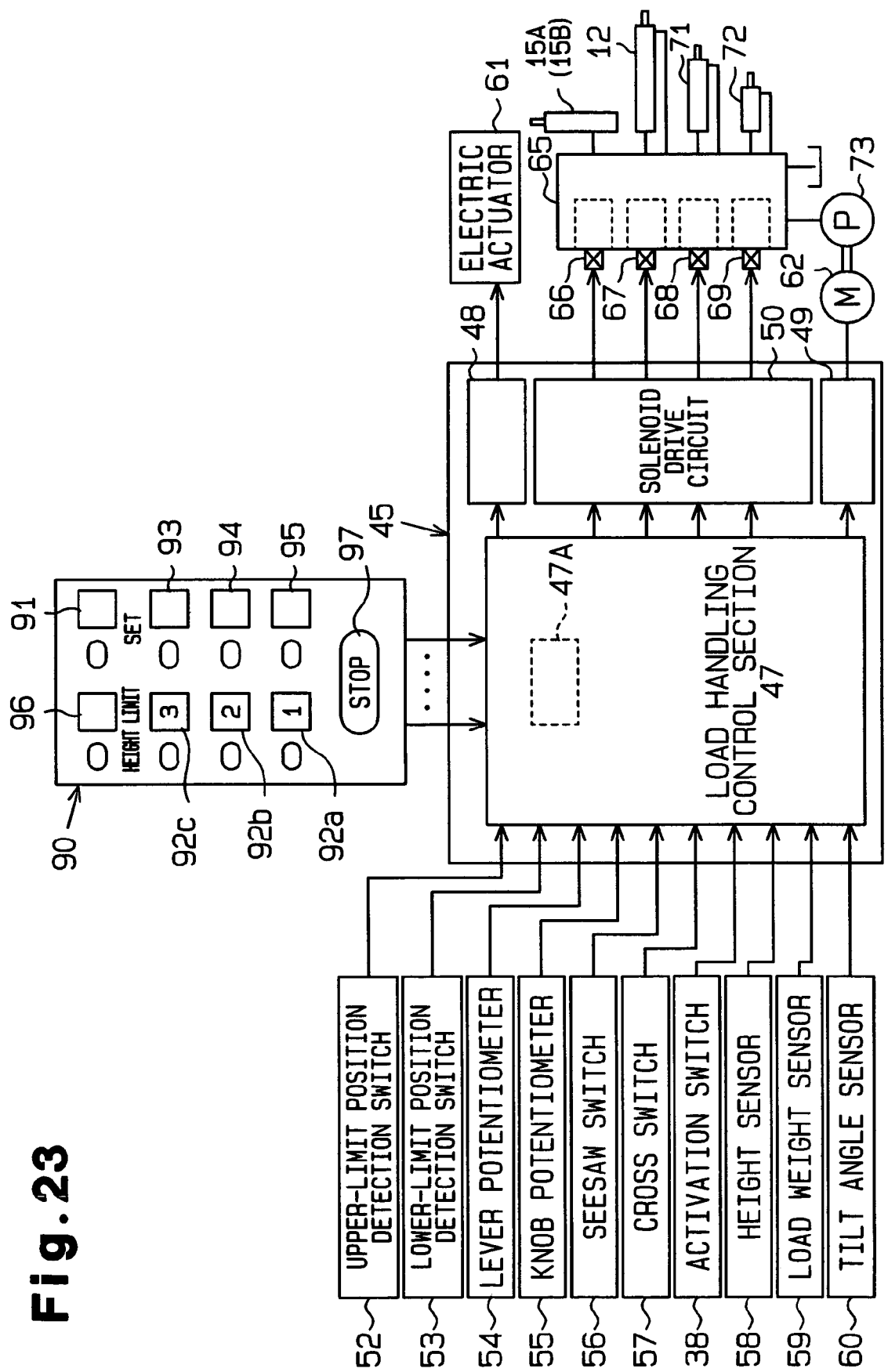
FIG. 23 is a block diagram showing the electrical structure of the automatic elevation unit according to the fifth embodiment.

FIG. 23 shows the electrical structure of the automatic elevation unit. In the present embodiment, the structural portions of the camera lifting control system and the image control system according to the first embodiment are omitted and the control panel 90 is connected to the input side of the load handling control section 47 instead. The structural portion of the load handling system is the same as that of the first embodiment. Height sensor 58 can be used continuously to detect the height.

Although the height of the forks 2 slightly differs between a load deposition work and a load pickup work, the presence/absence of a load 43 on the forks 2 is detected based on the detected value from the load weight sensor 59. Then, it is determined that the load carrying work is a load deposition work (stocking) in case of no load (load weight W<threshold value Wo) and it is determined that the load carrying work is a load pickup work (shipping) in case of the presence of a load (load weight W>threshold value Wo). The routine for determining the load carrying work is the same as the process of the flowchart in FIG. 20. The three number keys 92a to 92c, instead of the activation switch 38, constitute the start operation means, and the forks 2 are lifted up to that one of the load pickup position and load deposition position, preset for each number key, which is determined by the detected load weight.

The height limiting key 126 is used when the elevation height of the forks 2 is restricted at the time of operating the multi lever 31 or automatic lifting. The individual LEDs 198 are controlled to be turned on, or flickered by the controller 45 in association with the depression of each key at the time of setting the height position, at the time of an automatic lifting operation, at the time of setting the height limit, at the time of a horizontal stop operation, etc.

The load handling control section 47 of the controller 45 has a memory 47A. Target position data set through the control panel 90 is stored beforehand in the memory 47A. The target position data includes load deposition target position data and load pickup target position data for a single storage section of the rack 40.

In case where the forks 2 are lifted up to the target position under automatic lifting control, one of the number keys 92a to 92c which corresponds to that target position is depressed. The load handling control section 47 determines the presence/absence of a load based on the detected value from the load weight sensor 59, reads load deposition target position data corresponding to the depressed number key (one of 92a–92c) when it is determined that there is a load, and reads load pickup target position data corresponding to the depressed number key (one of 92a–92c) when it is determined that there is no load.

The controller 45 activates the control valve 65 to drive the lift cylinders 15A, B in such a way as to move the forks 2 to the target position. While the lift cylinders 15A, 15B are being driven, the load handling control section 47 detects the height position of the forks 2 every predetermined time based on the detection signal from the height sensor 58.

When the forks 2 reach a height before the target position by a predetermined distance, the load handling control section 47 controls the current value of the electromagnetic control valve 66 to stop the protracting actions of the lift cylinders 15A, 15B. Then, the forks 2 are stopped in the target position. That is, it is stopped in the load deposition position (FIG. 21(b)) if there is a load 43 on the forks 2, and load deposition is carried out at that height. It is stopped in the load pickup position (FIG. 21(a)) if there is no load 43 on the forks 2 and load pickup is carried out at that height. When the work is done, the forks 2 are moved from that height position. In case where it is followed by execution of automatic height control, for example, one of the number keys 92a to 92c is depressed next in that state unchanged to move the forks 2 to the next target position.

This embodiment has the following advantage.

As one of the number keys 92a to 92c is depressed, it is possible to lift the forks 2 up with one of the "load pickup position" and "load deposition position" as the target position based on the detected value from the load weight sensor 59. It is therefore unnecessary for the driver to determine whether the work to be done next is a load pickup work or a load deposition work and then select a key, but it is sufficient to depress one of the number keys 92a to 92c which is of the desired height.

The embodiment is not limited to the above-described one, but may be embodied in the following forms.

The control contents of automatic load handling control is not limited to the automatic fork positioning control or automatic lifting control in each of the above-described embodiments. For example, the speed of the load carrying apparatus may be controlled in such a way that when it is determined, based on the detected load weight, that a "load pickup work" should be done, the lift-up speed of the load carrying apparatus is increased. When it is determined, based on the detected load weight, that a "load deposition work" should be done, the lift-up speed of the load carrying apparatus is dropped.

The load detection means is not limited to the load weight sensor. This load detection means may be a limit switch to be provided on, for example, the forks. Alternatively, another sensor which detects a load placed on the forks may be used as well. For example, a non-contact type sensor, such as a proximity sensor, which detects a load in a non-contact manner, may be used. Further, it is possible to detect the presence/absence of a load on the forks based on an image picked up by the camera. For example, means is provided for identifying the bottom shapes of the forks through an image. It is determined that there is no load (load pickup work) when the bottom shapes of the forks can be identified, and it is determined that there is a load (load deposition work) when the bottoms of the forks are hidden by a load and the bottom shapes of the forks cannot be recognized.

When a limit switch or a proximity switch is used, a signal to be output from the switch is an ON/OFF signal. When the output signal of the switch is an ON signal indicating the detection of a load, for example, the decision means judges that it is a load deposition work and allows a load handling operation or an aiding operation according to the load deposition work to be carried out. When the output signal is an OFF signal indicating that a load has not been detected, the decision means judges that it is a load pickup work and allows a load handling operation or an aiding operation according to the load pickup work to be carried out.

In the above-mentioned embodiment, camera lifting control is started by using a signal when the height condition (height H≧2 m) is satisfied, i.e., when the height sensor 58 detects the height H being reached 2 m, as an instruction signal. Instead, the operation signal of the activation switch 38 may be used as instruction signal to start camera lifting control. In this case, although the moving time of the camera unit 23 delays automatic load handling control, a work can still be done with the operation of the activation switch alone.

In the above embodiment, automatic fork positioning control is started with the operation signal of the activation switch 38 as an instruction signal. Instead, automatic fork positioning control may be started when it is determined that the start condition is satisfied based on the signal output from the sensor that serves as the detection means. It is to be noted however that the sensor does not detect the operation by a driver. For example, a given time (e.g., 0.3 sec) passes after the forks are lifted up to a predetermined height and stopped, the CPU initiates the automatic fork positioning control. Then, the automatic fork positioning control is executed targeting the mark closest to the stopped forks (one of the marks M1 and M2 which corresponds to the detected load weight). In this case, the detection section that detects the stop of the forks and the timer (counter) that measures the time after the stop constitute the detection means.

The automatic elevation unit is constructed in such a way that a plurality of heights are stored in the memory beforehand and the target height at which the forks are to be lifted is specified by a button operation. By way of contrast, control may be employed which places the forks at a rough height through the operation of the operation lever, automatically calculates the adequate position from a plurality of target positions stored in the memory and places the forks at the adequate target height. That is, the height sensor detects the height at which the forks are placed by the operation of the operation lever by the driver, that height in the height data stored in the memory which is the closest to the detected height is determined as the height intended by the driver, and the lift cylinder is controlled in such a way as to place the forks in the load pickup position or load deposition position for the height intended by the driver. While this structure does not perform automatic elevation, if the driver performs rough positioning of the forks at a temporary height and always operates the same single switch, decision on whether it is a load pickup work or a load deposition work is executed based on the detected value from the load weight sensor and the forks are automatically positioned in the adequate position according to the decision result.

Start instruction means is not limited to a switch, but a height may be designated with a voice input. For example, the driver can wear a headphone type microphone and can inform the controller of information designating the height, such as the number of shelves of the rack, in a voice input through the microphone.

A load handling operation after positioning a load carrying apparatus can also be controlled automatically. For example, a structure can be employed which positions the forks and then automatically performs a load pickup operation or a load deposition operation which is accompanied with forward/backward movement of the forks. That is, if the decision is load pickup, after the forks are positioned, the forks are reached to be inserted into the holes of a pallet, then lifted up by a predetermined amount (e.g., about 10 to 20 cm) to lift a load up, then pulled backward to unload the load from the rack. If the decision is load deposition, on the other hand, after the forks are positioned, the forks are reached to push a load on the forks forward, then lifted down by a predetermined amount (e.g., about 10 to 20 cm) to place the load on the rack, then pulled backward.

The use of the marks is not limited to the use of two types for load pickup and load deposition. A method that affixes a single mark for load pickup and load deposition in common to, for example, a shelf portion, can be used. When using this method to acquire the target position of the forks at the time of load pickup, for example, the position of the shelf portion can be known by identifying the mark, and computing the height of the holes of a pallet placed on the shelf surface from the position of the shelf portion to be the target position of the forks.

It is not limited to making such a decision that it is load pickup when there is a load and it is load deposition when there is no load. When the timing of the start switch is set to operate immediately after a load pickup or load deposition, and when the operation of the load carrying apparatus is started by the start switch, it is possible to decide that it is a load deposition work when there is a load and it is a load pickup work when there is no load. The operation of moving the forks backward may be automatically carried out when the activation switch is operated after load pickup with the forks is completed and the operation of moving the forks backward may be automatically carried out when the activation switch is operated after load deposition with the forks is completed.

Sixth Embodiment

The sixth embodiment of the present invention will be described mainly on those that differ from the above-described embodiments according to FIGS. 24 to 29. The present embodiment relates to a work mode switching apparatus, which sets the mode in accordance with a load carrying work. To simplify the description, same reference symbols are given to those constituents that are the same as those of each of the above-described embodiments and their descriptions will be omitted.

Figure 24:
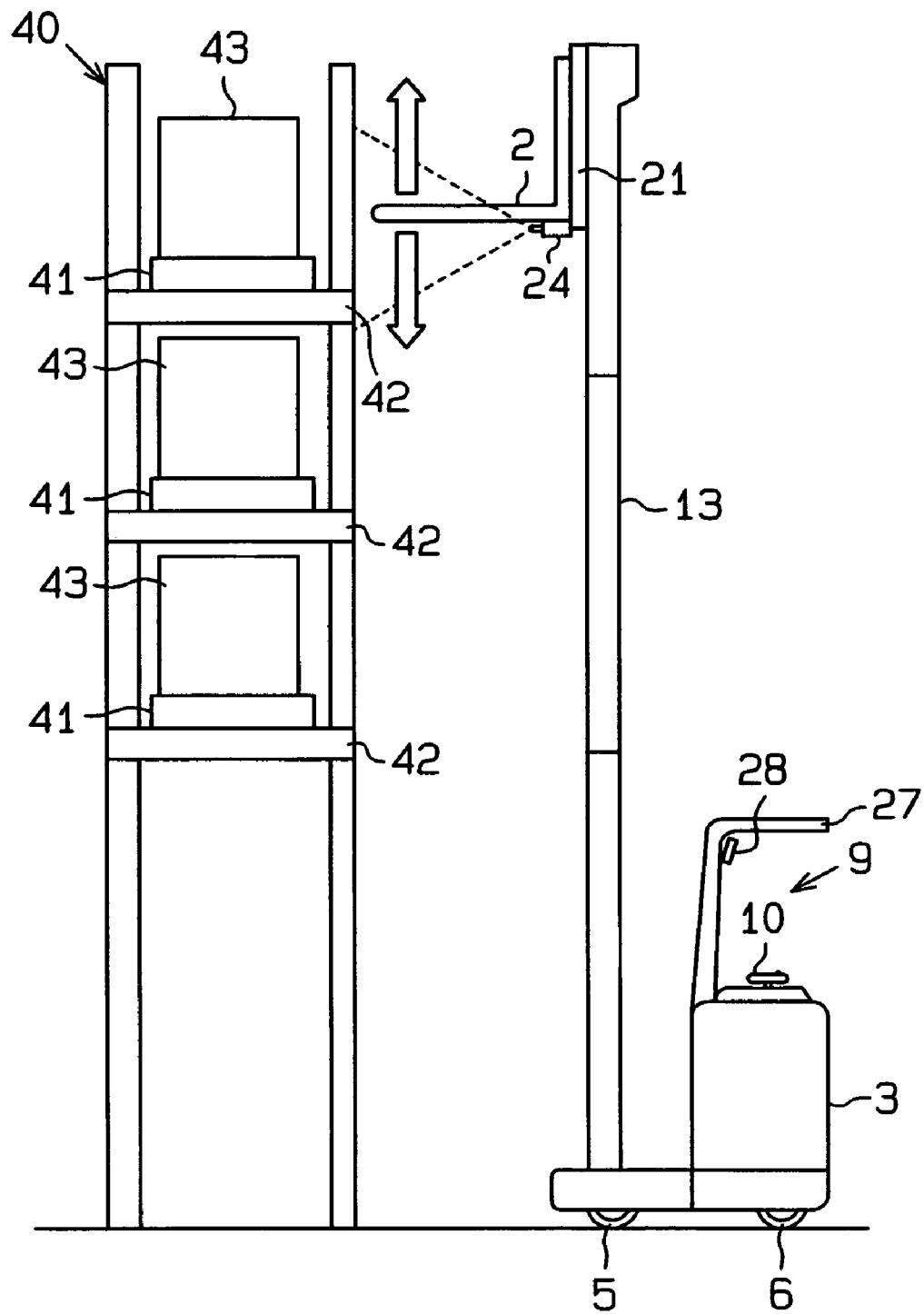
FIG. 24 is a side view showing a state when a load carrying work is done with a forklift 1 equipped with a camera according to a sixth embodiment.

FIG. 24 shows the state of a load carrying work by the forklift equipped with the camera 24. The load carrying work for loads 43 is carried out with the loads placed on pallets 41. A rack 40 where the loads 43 are to be placed has a multi-stage structure and some has an overall height equal to or higher than the height of the forklift. If the rack 40 has such a height, there may be a case where the driver cannot see the load carrying work from the driver's seat 9 at the time of doing a load carrying work at a shelf plate 42 at a high place. To solve it, the forklift equipped with the camera 24 picks up the image of an area in front of the forks 2 by the camera 24 and automatically positions the forks 2 based on the picked-up image, thereby supporting the load carrying work.

Figure 25:
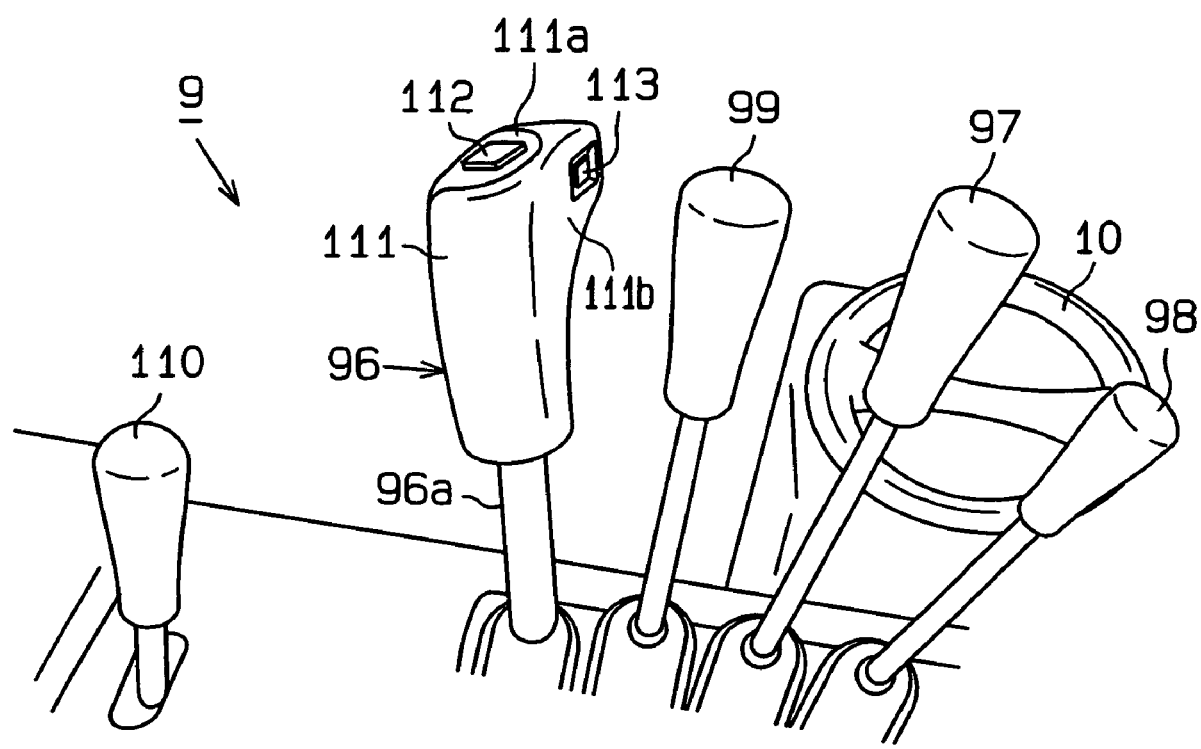
FIG. 25 is a perspective view of a driver's seat.

FIG. 25 shows the driver's seat 9 of the forklift. An instrument panel is provided on the front portion of the driver's seat 9. Laid out on the instrument panel are the lift lever 96, the tilt lever 99, the reach lever 97, the side shift lever 98 and an accel lever 110. The forks 2 are moved in the up and down direction by the operation of the lift lever 96, are moved in the forward and backward direction by the operation of the reach lever 97, are moved in the left and right direction by the operation of the side shift lever 98, and are tilted by the operation of the tilt lever 99. Those levers 96 to 98 are equivalent to load handling levers.

The lift lever 96 has a lever body 96a and a grip portion (knob) 111 is formed on the upper portion of the lever body 96a. An activation switch 112 is provided on a top surface 111a of the grip portion 111 and, as the activation switch 112 is depressed, the forks 2 automatically start moving and are positioned. A mode changeover switch 113 as switching means is provided on a side surface 111b of the grip portion 111. The operation mode of automatic fork positioning control is switched between a load pickup mode for picking up a load and a load deposition mode for placing a load in a predetermined position by depressing the mode changeover switch 113.

Figure 26:
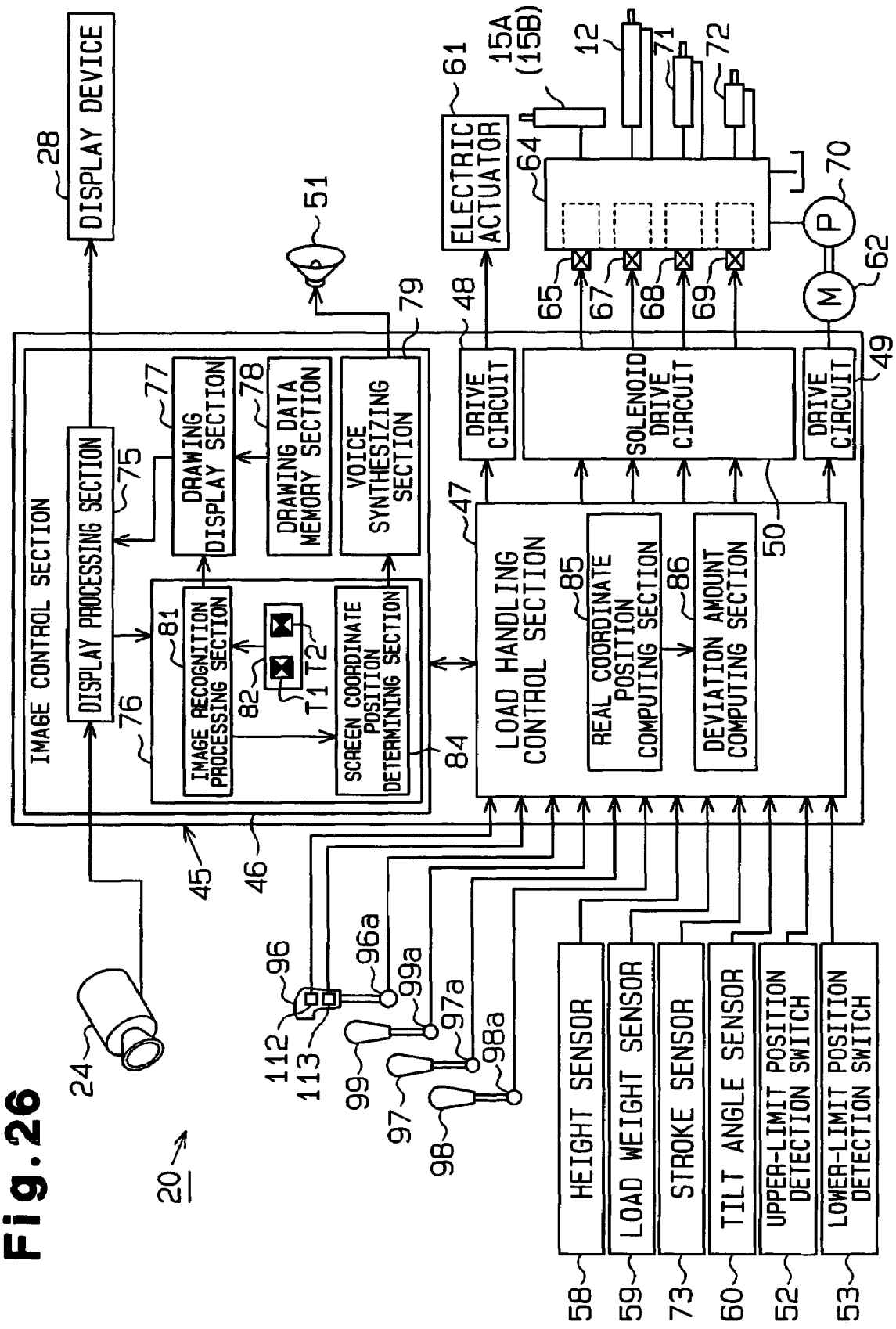
FIG. 26 is an electric circuit diagram of a forklift.

FIG. 26 shows the control circuit of the forklift. The load handling operation aiding apparatus 20 has a controller 45, which has the image control section 46, the load handling control section 47 which constitutes control means and work mode setting means, the drive circuits 48 and 49 and the solenoid drive circuit 50. The camera 24 is connected to the input side of the image control section 46, and the display device 28 and the speaker 51 are connected to the output side of the image control section 46, so that a video image is displayed on the screen 28A (see FIG. 28 and FIG. 29) of the display device 28, based on the video signal (image signal) from the camera 24, or a predetermined announcement is made from the speaker 51.

Meanwhile, the load handling control section 47 is connected with the upper-limit position detection switch 52, the lower-limit position detection switch 53, potentiometers 96a to 99a of the levers 96 to 99, the activation switch 112, the mode changeover switch 113, the height sensor 58, the load weight sensor 59, as detection means (load weight detection means), the stroke sensor 73, the tilt angle sensor 60, etc. The load handling control section 47 is connected with the electric actuator 61 and load handling motor (electric motor) 62 via the drive circuits 48, 49 and with the solenoids of various electromagnetic selector valves 65 to 69 attached to the oil control valve 64 via the solenoid drive circuit 50.

Based on signals from the individual potentiometers 96a to 99a, the load handling control section 47 performs current value control of the electromagnetic selector valves 65 to 69 and drive control of the load handling motor 62. As the load handling motor 62 is operated, the load handling pump (hydraulic pump) 70 is driven, thus supplying the hydraulic fluid to the oil control valve 65. Based on a signal at the time when each of the levers 96 to 98 is operated, each of the electromagnetic selector valves 65 to 69 corresponding to that operation is subjected to selection control. By this selection control, the reach cylinder 12, the lift cylinders 15A, 15B, the side shift cylinder 71, and the tilt cylinder 72 are controlled to perform the elevation operation, reach operation, side shift operation, and tilt operation of the forks 2.

To acquire the deviation amount of the forks 2 at the time of positioning the forks, the image control section 46 executes image processing based on image data acquired from the camera 24.

The image control section 46 has the display processing section 75, the image processing section 76, the drawing display section 77, the drawing data memory section 78 and the voice synthesizing section 79. The display processing section 75 outputs a video signal, input from the camera 24, to the display device 28 in such a way that the image picked up by the camera 24 is displayed on the screen. The image processing section 76 receives the image data from the display processing section 75, performs an image recognition process based on the image data and calculates the coordinate positions of the marks M1 and M2 on the display screen 28A of the display device 28 (the screen coordinate system shown in FIG. 27(a)).

Based on the results of the processing of the image processing section 76, the drawing display section 77 displays the drawing of the moving target point mark 87 and a target line 120 (see FIG. 28 and FIG. 29) or the like on the display screen 28A as drawing data stored in the drawing data memory section 78. The drawing display section 77 respectively displays, on the display screen 28a, the "load pickup mode" when the operation mode is the load pickup mode and the "load deposition mode" when the operation mode is the load deposition mode. The voice synthesizing section 79 performs a voice synthesizing process for voice announcement or the like and outputs a voice signal to the speaker 51.

The image processing section 76 has the image recognition processing section 81, the template memory section 82 and the display position (screen coordinate position) determining section 84. The load handling control section 47 has a real coordinate position calculating section (relative coordinate computing section) 85 and a deviation amount computing section (control amount calculating section) 86. The following will describe the contents of the processes performed by the image recognition processing section 81, the screen coordinate position determining section 84, the real coordinate position calculating section 85 and the deviation amount computing section 86 according to FIGS. 27 and 28. The image recognition processing section 81, the template memory section 82 and the screen coordinate position calculating section 84 constitute sign position calculation means, and the real coordinate position calculating section 85 and the deviation amount computing section 86 constitute moving distance calculation means.

Figure 27A:
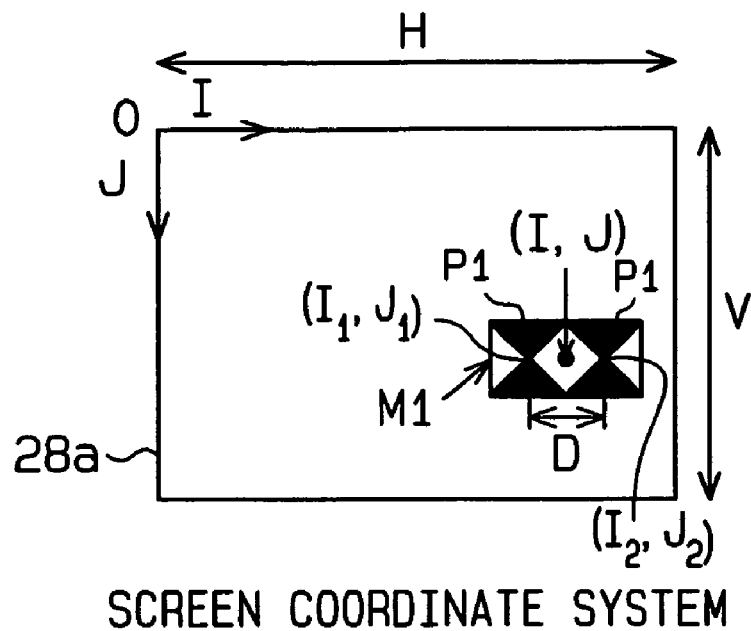
FIG. 27(a) is a diagram showing a screen coordinate system and FIG. 27(b) is a diagram showing a real coordinate system.

In case where the work mode is the load pickup mode and the mark M1 is identified as shown in FIG. 27(a), the image recognition processing section 81 performs matching on the two patterns P1, P1 constituting the mark M1 at two locations using the template T1 and recognizes each pattern P1, P1. Likewise, in case where the operation mode is the load deposition mode, each pattern P2, P2 is identified through matching on the two patterns P2, P2 constituting the mark M2 at two locations using the template T2.

After pattern recognition, the screen coordinate position calculating section 84 computes coordinates $(I_1, J_1)$, $(I_2, J_2)$ of the center points (radial center points) of the individual patterns. P1, P1 in the screen coordinate system. Then, the screen coordinate position calculating section 84 computes the barycentric coordinates (I, J) of the mark M1 and a center distance D of the patterns P1, P1 based on those two coordinate values. In case where the operation mode is the load deposition mode, the barycentric coordinates of the mark M2 and the center distance of the patterns P2, P2 are computed in procedures similar to those for the mark M1.

Figure 27B:
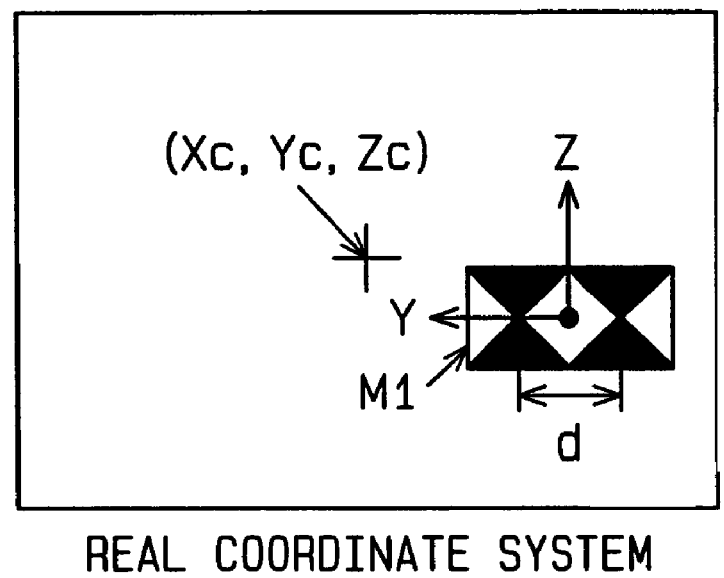

Meanwhile, the real coordinate position calculating section 85 performs geometric conversion using the values of the barycentric coordinates (I, J) and the center distance D of the screen coordinate system to compute three-dimensional relative positional coordinates (Xc, Yc, Zc) with respect to the mark M of the camera 24 in a real coordinate system (XYZ coordinate system) shown in FIG. 27(b). The coordinates (Xc, Yc, Zc) of the camera 24 are computed by the equations (1) to (3).

Then, the deviation amount computing section 86 computes the amount of positional deviation of the forks 2 based on the relative positional coordinates (Xc, Yc, Zc) of the camera 24 acquired in the real coordinate system. Then, at the time the automatic fork position control is executed, the load handling control section 47 drives the lift cylinders 15A, 15B and the side shift cylinder 71 based on the deviation amount calculated by the deviation amount computing section 86 and executes positioning of the forks 2.

Figure 28:
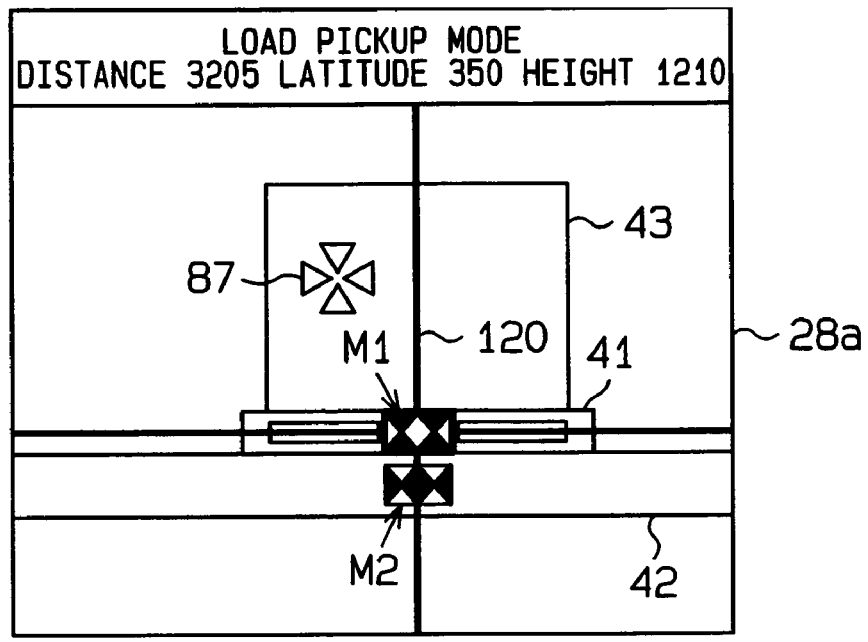
FIG. 28 is a diagram showing the screen of a display device at a time of a load pickup mode.
Figure 29:
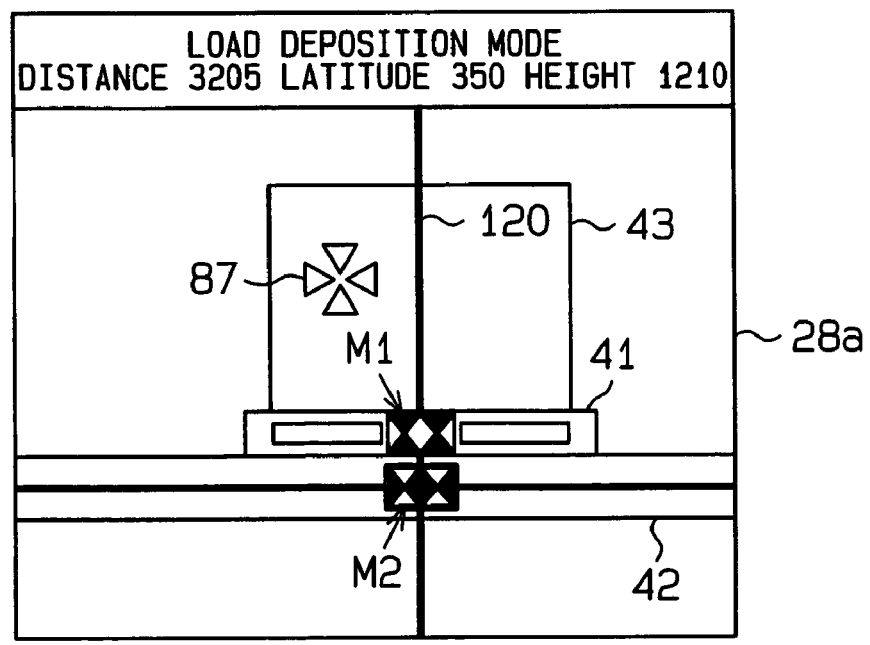
FIG. 29 is a diagram showing the screen of the display device at a time of a load deposition mode.

FIG. 28 shows the screen of the display device 28 at a time of a load pickup mode, and FIG. 29 shows the screen of the display device 28 at a time of a load deposition mode. A moving target point 87 which will overlap the mark M1 or M2 when the forks 2 are positioned is drawn on the screen 28A. A target line 120 with an approximately cross shape is displayed on the screen 28A. The target line 120 is displayed on the mark M1 when the work mode is a load pickup mode and is displayed on the mark M2 when it is a load deposition mode.

The work mode is displayed on the upper left portion of the screen 28A and "load pickup mode" or "load deposition mode" is displayed on the screen in accordance with the work mode at that time. When automatic fork positioning control is executed by the depression of the activation switch 112 of the lift lever 96 and positioning of the forks 2 is completed, the moving target point mark 87 becomes matched with the mark M1 at the time of a load pickup mode and the moving target point mark 87 becomes matched with the mark M2 at the time of a load deposition mode.

A description will now be given of the operation of the thus constituted work mode switching apparatus of an industrial vehicle.

First, assume that in case where a load deposition work is performed, a load deposition work of placing a pallet 41 carrying a very light load on a shelf plate 42. If the load is too light at this time, there may be a case where the load weight sensor 59 cannot detect the load weight of the load due to the matter of the sensor sensitivity. When the forks 2 are lifted down, buoyancy according to the descending speed (acceleration) acts on the load so that a value smaller than the real load weight may be detected by the load weight sensor 59. Therefore, the work mode, which should normally be set to the load deposition mode, is set to the load pickup mode erroneously, displaying the load pickup mode on the screen 28A of the display device 28 as shown in FIG. 28.

At the time of the load deposition work, the operator sees the work mode displayed on the screen 28A of the display device 28 and checks if the work mode is correctly set for the load carrying work that is being carried out. In this case, as the work mode is set to the load pickup mode although a load deposition work is being performed, the operator decides that the work mode should be switched and depresses the mode changeover switch 113 of the lift lever 96. This switches the work mode to the load deposition mode from the load pickup mode and the work mode is set to the load deposition mode as shown in FIG. 29.

In case where a load pickup work is performed, when the forks 2 are lifted up, a load according to the ascending speed (acceleration) acts on the forks 2 so that the load weight sensor 59 may detect that load as a load weight. Therefore, the work mode, which should normally be set to the load pickup mode, is set to the load deposition mode erroneously, displaying the load deposition mode on the screen 28A of the display device 28 as shown in FIG. 29. When the operator depresses the mode changeover switch 113, however, the work mode is switched to the load pickup mode from the load deposition mode and the work mode is set to the load pickup mode as shown in FIG. 28.

In the structure that automatically sets the work mode based on the load weight acquired from the load weight sensor 59, therefore, a load weight different from the actual one may be detected at the time an extremely light load is placed on the forks 2 or the forks 2 are lifted up or down. Even in case where the work mode does not coincide with the actual load carrying work due to those causes, operating the mode changeover switch 113 provided on the lift lever 96 can set the work mode to the correct mode according to the load carrying work.

This embodiment therefore has the following advantages.

The mode changeover switch 113, which switches the work mode manually when the load pickup mode or load deposition mode is automatically set as the work mode based on the load weight acquired from the detected value from the load weight sensor 59 and the set work mode is in error, is provided on the lift lever 96. There is a case where the relatively low detection sensitivity of the load weight sensor 59 prevents the load weight sensor 59 from detecting the load when a load is extremely light, or the acceleration at the time of lifting the forks 2 up or down causes the weight of a load to be detected lighter or heavier than it really is, so that the load weight sensor 59 erroneously recognizes the load.

Even if the work mode is erroneously set due to the erroneous recognition by the load weight sensor 59, however, the work mode can be set to the correct mode according to the load carrying work by operating the mode changeover switch 113.

As the set work mode is displayed on the screen 28A, it is possible to determine if the set work mode is correct with respect to the load carrying work that is actually undergoing by checking the work mode displayed on the screen 28A.

As the mode changeover switch 113 is provided on the grip portion 111 of the lift lever 96, the switch 113 can be operated without setting a hand free of the lift lever 96, so that the working efficiency at the time of automatic fork positioning control can be improved. Particularly, movement of the forks 2 up and down is often done by using the lift lever 96 and the provision of the switch 113 on the lift lever 96 can ensure a smooth work of switching the work mode.

Seventh Embodiment

The seventh embodiment will be described next according to FIGS. 30 to 32. Like the fifth embodiment, this embodiment is an example adapted to an automatic elevation unit equipped on an industrial vehicle.

Figure 31:
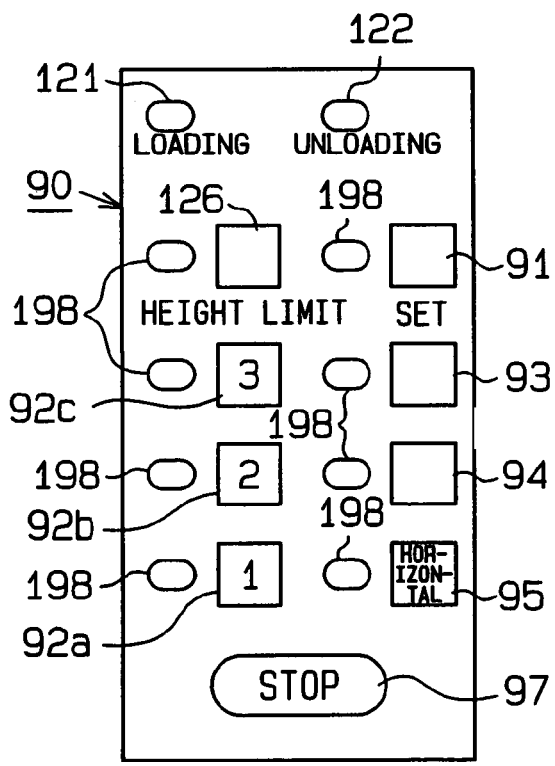
FIG. 31 is a plan view of a control panel.

Two LEDs 121 and 122 are provided on the control panel 90 according to this embodiment shown in FIG. 31 in addition to various keys, etc. provided on the control panel 90 shown in FIG. 22.

Figure 32:
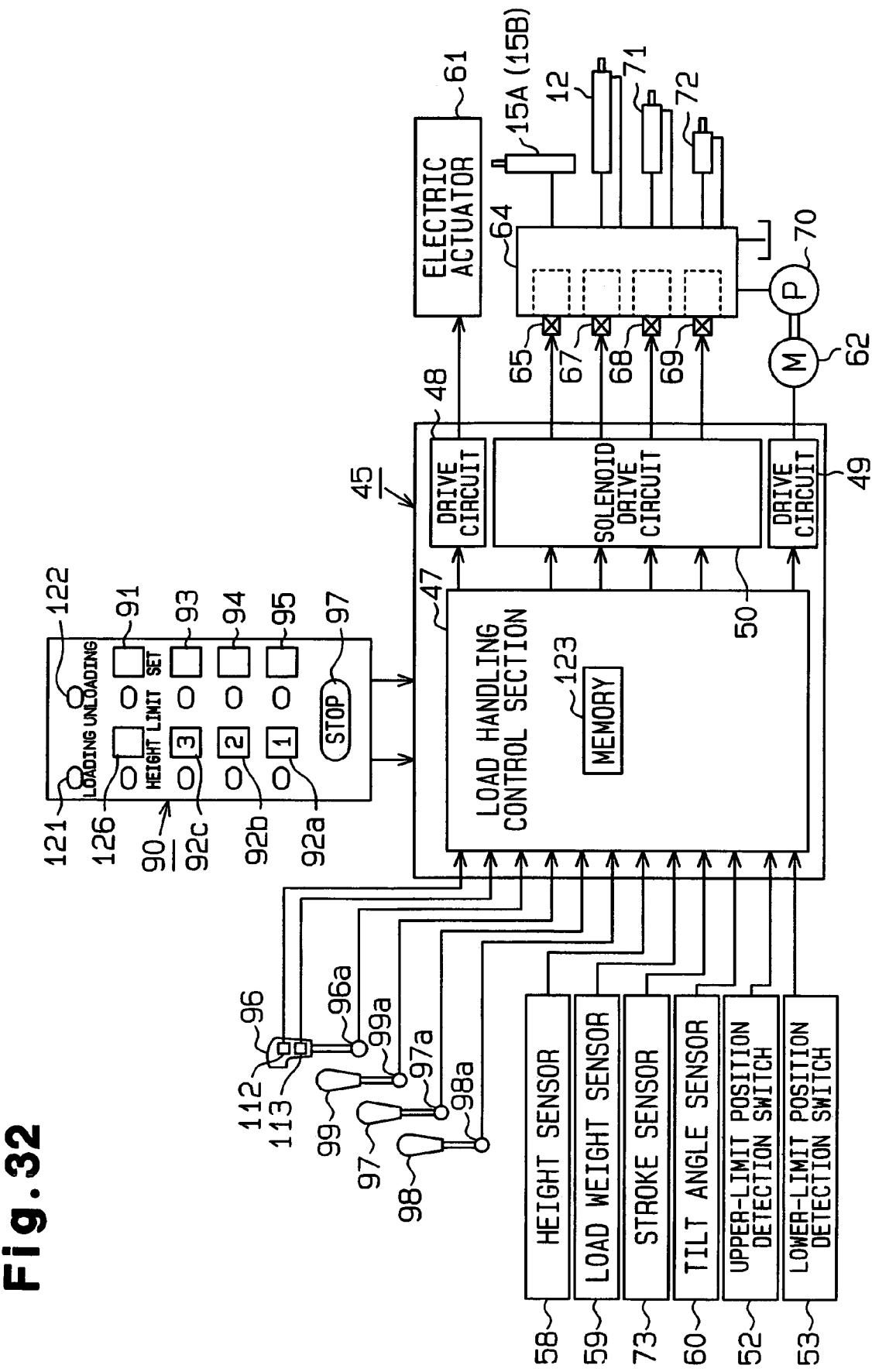
FIG. 32 is an electric circuit diagram of a forklift according to the seventh embodiment.

FIG. 32 shows the electrical structure of the automatic elevation unit. The structural portions of the camera lifting control system and the image control system according to the sixth embodiment are omitted and the control panel 90 is connected to the input side instead. The structural portion of the load handling system is the same as that of the sixth embodiment. A sensor that can continuously detect the height is used as the height sensor 58.

Although the height of the forks 2 slightly differs between a load deposition work and a load pickup work, the presence/absence of a load on the forks 2 is detected based on the detected value from the load weight sensor 59. Then, it is determined that the load carrying work is a load deposition work (stocking) in case of no load (load weight $W \leq$ threshold value $W_0$) and it is determined that the load carrying work is a load pickup work (shipping) in case of the presence of a load (load weight W>threshold value $W_0$). As the three number keys 92a to 92c are depressed, the forks 2 are lifted up to that one of the load pickup position and load deposition position, preset for each number key, which is determined by the detected load weight.

The height limiting key 126 is used when the elevation height of the forks 2 is restricted at the time of operating the lift lever 96 or automatic lifting. The individual LEDs 121, 122 and 198 are controlled to be turned on, or flickered by the controller 45 in association with the depression of each key at the time of setting the height position, at the time of an automatic lifting operation, at the time of setting the height limit, at the time of a horizontal stop operation, etc.

The load handling control section 47 of the controller 45 has a memory 123. Target position data set through the control panel 90 is stored beforehand in the memory 123. That is, the target position data is data set according to the number keys 92a to 92c for load deposition and load pickup and load deposition target position data and load pickup target position data are set with respect to the individual shelf plates 42 of the rack 40, which have different heights.

In case where the forks 2 are lifted up to the target position under automatic lifting control, one of the number keys 92a to 92c which corresponds to that target position is depressed. The load handling control section 47 determines the presence/absence of a load based on the detected value from the load weight sensor 59, reads load deposition target position data corresponding to the depressed number key 92a–92c when it is a load deposition mode, and reads load pickup target position data corresponding to the depressed number key 92a–92c when it is a load pickup mode. The control valve 64 is actuated in such a way as to move the forks 2 to the target position. While the lift cylinders 15A, 15B are being driven, the load handling control section 47 detects the height position of the forks 2 every predetermined time based on the detection signal from the height sensor 58.

Figure 30A:
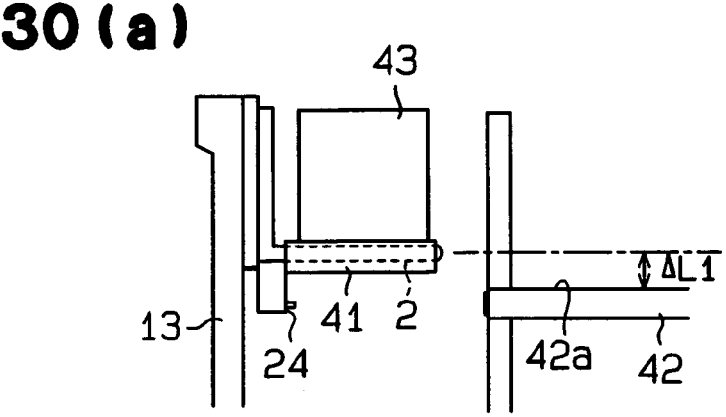
FIG. 30(a) is an explanatory diagram showing a work state at the time of load deposition with a forklift according to a seventh embodiment and FIG. 30(b) is an explanatory diagram showing a work state at the time of load pickup.
Figure 30B:
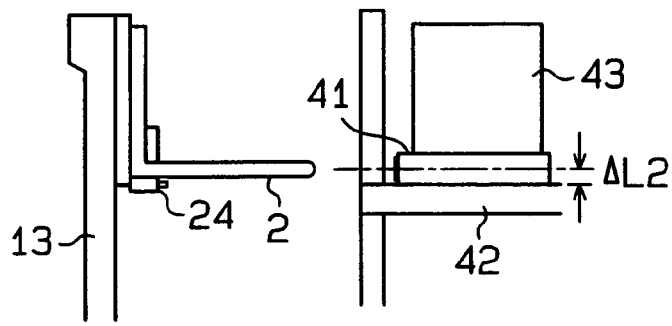

When the height position of the forks 2 reaches a height before the target position by a predetermined distance, the load handling control section 47 controls the current value of the electromagnetic control valve 65 to stop the protracting actions of the lift cylinders 15A, 15B, causing the forks 2 to stop in the target position. That is, when a load 43 is on the forks 2 as shown in FIG. 30(a), forks 2 are stopped in an upper position apart from the shelf surface 42a by $\Delta L1$ and load deposition is carried out at that height. When there is no load 43 on the forks 2 as shown in FIG. 30(b), the forks 2 are stopped in an upper position apart from the shelf surface 42a by $\Delta L2$ and load pickup is carried out at that height. When the work at that height is finished, the forks 2 are moved from that height. In case where it is followed by execution of automatic height control, for example, one of the number keys 92a to 92c is depressed directly to move the forks 2 automatically to the next target position.

The load weight sensor 59 might detect a false value when the load is extremely light and the load weight sensor 59 may not be able to detect the weight of the load due to the sensor sensitivity, or when the forks 2 are lifted up or down and buoyancy or acceleration acts on the load. Therefore, the work mode is erroneously set with respect to the actual load carrying work and the load pickup mode is set, even though a load is placed on the forks 2, and the LED 122 for load pickup emits light or the load deposition mode is set, even though there is no load on the forks 2, and the LED 121 for load deposition emits light.

In case where the LED in the two LEDs 121 and 122 which emits light on the control panel 90 does not correspond to the actual load carrying work, however, the operator can switch the work mode by depressing the mode changeover switch 113 of the lift lever 96. In case where the load pickup mode is set even though a load is placed on the forks 2, or in case where the load deposition mode is set even though there is no load on the forks 2, therefore, depressing the mode changeover switch 113 sets the work mode to the correct mode according to the load carrying work.

This embodiment can have the same advantages as the sixth embodiment as well as the following advantage.

As one of the number keys 92a to 92c is depressed, the forks 2 are lifted up with the "load pickup position" as the target position in load pickup mode and the forks 2 are lifted up with the "load deposition position" as the target position in load deposition mode. It is therefore unnecessary for the operator to determine whether it is load pickup or load deposition and then select a key to be operated, but the forks 2 can be automatically lifted up to the desired position by merely depressing one of the number keys 92a to 92c which is equivalent to the desired height.

The embodiment is not limited to those described above, but may be modified in the following forms.

In the sixth and seventh embodiments, works that are automatically controlled by an industrial vehicle are not limited to a work of positioning the forks 2 with respect to the mark M1 (M2) and a work of positioning the height of the forks 2 by the automatic elevation unit. For example, an operation of performing the reach operation of the forks 2 to unload a load on the rack 40 or an operation of placing a load on the forks 2 in the rack 40 may be automated. And, a plurality of work modes to be set then may be manually switched by the mode changeover switch 113.

In the sixth and seventh embodiments, the work modes are not limited to the load pickup mode and the load deposition mode, but may be any modes necessary for various works, such as a load carrying work and a transportation work. The detection means is not limited to the load weight sensor 59, and may be anything which acquires a detected value necessary at the time of setting a mode other than the load pickup mode and load deposition mode.

In the sixth and seventh embodiments, the work modes are not limited to two, the load pickup mode and the load deposition mode, but may be three or more with predetermined modes added to those two. In this case, the work mode may be switched in order every time the mode changeover switch 113 is depressed once or exclusive switches may be provided for the individual modes.

In the sixth and seventh embodiments, the work mode set then should not necessarily be notified by the display device 28 and the LEDs 121, 122 for notification. That is, the work mode may be switched by operating the mode changeover switch 113 in case where this type of notification means is not installed, the work mode is checked visually and the work mode differs from the actual load carrying work as a result of the visual check.

In the sixth and seventh embodiments, both of the function of positioning the forks 2 through an image recognition process and the automatic elevation unit may be mounted on the forklift or one of them may be mounted.

In the sixth and seventh embodiments, the levers may be a multi lever singularly capable of doing a reach operation, a lift operation, a side shift operation and a tilt operation, instead of assigning a single function lever by lever. The mode changeover switch 113 may be provided in a predetermined position of this multi lever.

In the sixth and seventh embodiments, the mode changeover switch 113 as the switching means is not limited to provision on the lift lever 96 but may be provided on the tilt lever 99, reach lever 97, side shift lever 98 or the like. It may also be provided on a portion other than the lever, such as the instrument panel.

In the sixth and seventh embodiments, the mode changeover switch 113 as the switching means is not limited to a depression button switch type, but may be any type that can switch the work mode, such as a lever type or a touch panel type.

In the sixth and seventh embodiments, the switching means is not limited to a single switch that switches the work mode between the load pickup mode and the load deposition mode. That is, a switch for the load pickup mode and a switch for the load deposition mode may be provided separately.

In the sixth and seventh embodiments, the load weight detection means is not limited to the load weight sensor 59 that outputs a detected value according to the load weight, but may be a sensor which detects the presence/absence of a load, such as a limit switch or a proximity switch.

In the sixth and seventh embodiments, the actuator is not limited to various cylinders 12, 15, 71, and 72 that are driven at the time of executing automatic fork positioning control but may be, for example, a motor or the like.

In the sixth and seventh embodiments, the notification means is not limited to the display device 28 and the LEDs 121, 122 that provide visual notification, but the set work mode may be audibly notified by outputting sounds from the speaker 51. In this case, the speaker 51 is equivalent to the notification means. Further, visual notification is not limited to character display but a lamp, such as a LED, may be turned on and left so.

In the sixth embodiment, the deviation amount of the forks 2 may be calculated by performing an image recognition process with the pallet 41 or rack 40, for example, as a sign and acquiring the real coordinate position of the camera 24 based on the processing result.

In the seventh embodiment, the operator may operate the lift lever 96 to lift the forks 2 up to a predetermined position, then depress a number key to lift them to the desired height position. In this case, the height positions of the forks 2 are detected by the height sensor one after another, the height to the target height position from the point of time at which the number key has been depressed is acquired and the forks 2 are lifted up by that amount.

Eighth Embodiment

The eighth embodiment of the present invention will be described mainly on those that differ from the first embodiment according to FIGS. 33 to 39. Conventionally, at the time of moving an industrial vehicle close to a load handling target, such as a pallet 41, if it was found that the forks 2 could not be inserted in the holes 41A of the pallet 41 after moving the forklift shown in FIG. 39(a) close to the load handling target, the driver performed the following operation. That is, it was necessary to steer the steering wheel 10 while temporarily moving the forklift back, then steer the steering wheel 10 again to pull over as shown in FIG. 39(b) and place the vehicle in the correct position shown in FIG. 39(c).

According to the present embodiment, by way of contrast, at the time of moving an industrial vehicle close to a load handling target, such as a pallet, the position of the load handling target is detected beforehand and an adequate instruction or guiding notification is given to the driver so that a working loss can be avoided.

The image control section 46 in the present embodiment performs an image recognition process (template matching process) to recognize a mark from an image, grasps the position of a load handling target from the position of the mark in the screen coordinate system on the screen, and further performs a notification process to guide the course of the vehicle so that the load handling target is caught by the forks 2. In the notification process, a method of displaying an instruction guide on the screen of the display device 28 and a method of giving notification with voice guidance from the speaker 51 are used together as a method of guiding the course of the vehicle. It is of course possible to use one of the notification methods.

Figure 33:
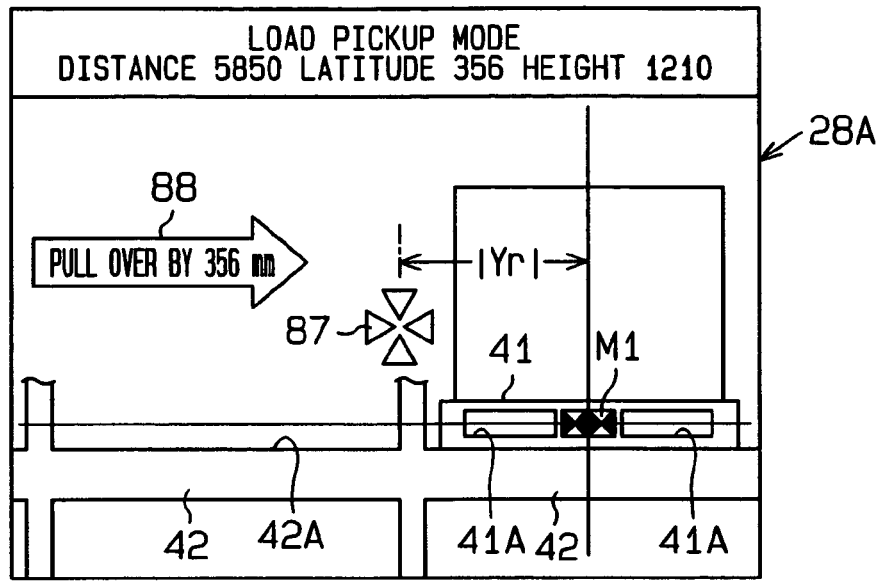
FIG. 33 is a diagram showing a screen on which a pull-over instruction guide according to an eighth embodiment is displayed.
Figure 34:
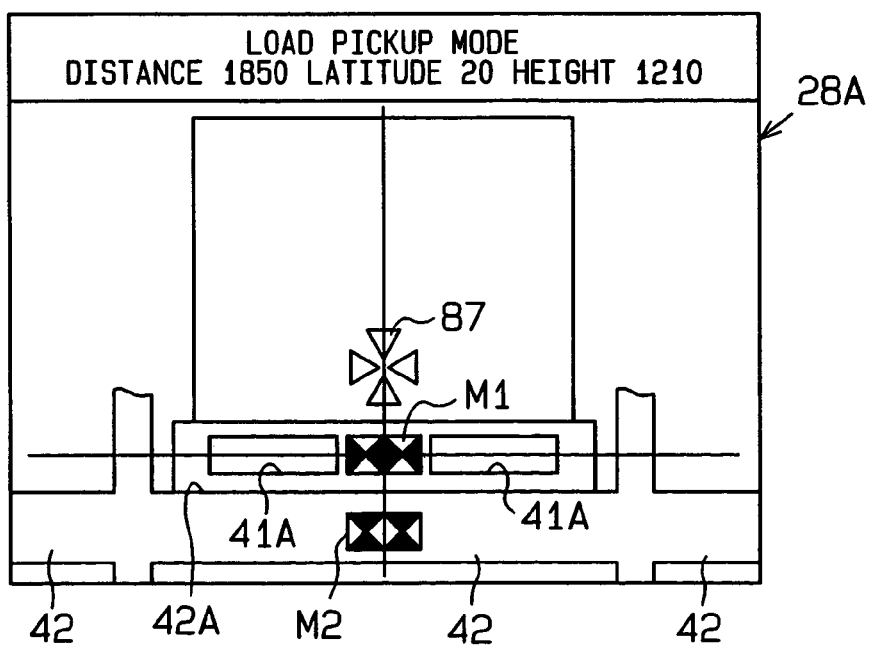
FIG. 34 is a diagram showing the state of the screen after the position of a vehicle has been corrected.

As shown in FIGS. 33 and 34, at the time of positioning the forks 2 in this embodiment, a target mark 87 is displayed on the screen 28A of the display device 28 at the target position to which the mark M1, M2 should be moved. As the forks 2 are moved in such a way that the center point (moving target point) of the target mark 87 coincides with the center point of the mark M1 affixed to the pallet 41, the forks 2 coincide with the insertion holes 41A. As the forks 2 are moved in such a way that the target mark 87 coincides with the mark M2 affixed to the shelf plate 42, on the other hand, the forks 2 are placed in the load deposition position above the shelf surface 42A by about 10 to 20 cm.

As the camera 24 is placed in the center portion in the vehicle's widthwise direction between a pair of forks 2, the Y-directional component (see FIG. 3) of the moving target point is identical to the coordinate Yc of the camera 24. As mentioned above, the coordinates of the camera 24 are expressed by (Xc, Yc, Zc). Therefore, the difference (deviation) of the Y-directional component between the moving target point and the center point (origin) of the mark M1 is equal to the coordinate Yc. If the sideway deviation Yc is greater than zero (Yc>0), the forks 2 are deviated leftward on the screen 28A (i.e., the mark is in the rightward), If Yc<0, the forks 2 are deviated rightward on the screen (i.e., the mark is in the leftward), and if Yc=0, there is no sideway deviation of the forks 2.

If the forks 2 are in a side-shifted state, the value Yc includes that side shift amount Sshift. First, it is therefore necessary to acquire the Y-directional deviation amount Yr between the moving target point and the mark on the assumption that the forks 2 are not side-shifted and is positioned in the vehicle's widthwise center. This deviation amount Yr is computed from $$Yr=Yc-Sshift.$$

It is assumed that when the forks 2 are shifted to the right, the side shift amount takes a value of Sshift<0, and when the forks 2 are shifted to the left, the side shift amount takes a value of Sshift>0. The screen 28A in FIG. 33 shows a case where the forks 2 are placed in the vehicle's widthwise center and the side shift amount Sshift=0.

When the deviation amount |Yr| has a value within a maximum side shift amount Smax, the forks 2 can be positioned to a load handling target by side-shifting the forks 2. When the deviation amount |Yr| exceeds Smax, however, the load handling target can no longer be caught by the forks 2 even if the forks 2 are side-shifted. In this respect, a set value S ($\leqq$Smax), which is the same as the maximum side shift amount Smax, or a smaller value S with a slight margin, is set beforehand, and when |Yr|>S (S=150 mm in this example) is satisfied, it cannot be coped with side shifting and the driver is informed by a pull-over instruction through the display on the screen 28A and by voices from the speaker 51. At this time, the pull-over direction is determined by the positive/negative of the value of Yc. That is, when Yc>0, it is determined that the forks 2 are shifted leftward and should be pulled over rightward, and when Yc<0, it is determined that the forks 2 are shifted rightward and should be pulled over leftward. An instruction guide 88 as shown in FIG. 33 (the diagram shows a case of a pull-over-to-the-right instruction) is displayed on the screen 28A. In FIG. 33, the mark M2 is omitted.

The display position determining section 84 performs the following process to determine the display position of the instruction guide 88. When Yc>0, it is determined that the forks 2 are deviated leftward and a load handling target is positioned on the right-hand half of the screen as in FIG. 33, and the left-hand area of the screen is decided as the display position of the instruction guide 88. When Yc<0, on the other hand, it is determined that the forks 2 are deviated rightward and the load handling target is positioned on the left-hand half of the screen as in FIG. 33, and the right-hand area of the screen is decided as the display position of the instruction guide 88. When the instruction guide 88 is displayed on the right-hand side of the screen or the left-hand side of the screen, the respective display position is determined previously. When the deviation amount |Yr| becomes |Yr|$\leqq$S (150 mm in this example), the display of the instruction guide 88 disappears.

If the display position is determined when the display of an instruction guide is needed, the display position determining section 84 sends data of the instruction guide to the drawing display section 77. The instruction guide 88 is comprised of an arrow figure directed in the pull-over direction, a numeral "(numeral) mm" of the pull-over distance to be displayed in the arrow figure and a sequence of characters "pull over". The value of the actual deviation amount |Yc| comes into the value of the pull-over distance.

Stored in the drawing data memory section 78 are figure data of two types of instruction guides and font data, which shows the pull-over distance |Yc|. There are two types of figure data prepared: one is a figure for pull-over to the right (see FIG. 33) and the other is a figure for pull-over to the left (a figure with the opposite direction of the arrow to that of the figure in FIG. 33). The drawing display section 77 reads necessary figure data and font data from the drawing data memory section 78 according to an instruction from the display position determining section 84 and displays the instruction guide 88 as shown in FIG. 33 in a predetermined position in such a way as to overlap the picked-up image. Further, when the display of the instruction guide is needed, the display position determining section 84 outputs an instruction of voice guidance according to that content to the voice synthesizing section. The image processing section 76 is comprised of a microcomputer and program data stored in the memory (ROM) or the like. The drawing display section 77 and the drawing data memory section 78 are constituted by a drawing control gate array and a drawing VRAM.

In the present embodiment, a guide displaying process routine illustrated in a flowchart in FIG. 35 is stored in the memory of the image processing section 76 as a process the microcomputer of the image processing section 76 executes to display an instruction guide.

The following will describe the instruction guide displaying process that is executed by the image processing section 76 in accordance with the flowchart illustrated in FIG. 35.

First, in step (hereinafter simply written as "S") 110, the image processing section 76 executes image processing (mark identifying process). That is, if it is a load pickup mode, a process of identifying the mark M1 using the template T1 is executed, whereas if it is a load deposition mode, a process of identifying the mark M2 using the template T2 is executed. Thus, position data I, J and D values of the mark are acquired.

In the next S120, the relative position change Yr between the forks and the target is calculated. That is, the relative position (Xc, Yc, Zc) is acquired based on the position data I, J and D values of the mark. Then, Yr (=Yc−Sshift) is calculated from the Yc value.

In S130, it is determined whether or not |Yr|>S is satisfied. If |Yr|>S is not satisfied, this routine is terminated, whereas if |Yr|>S is satisfied, the process proceeds to S140.

In S140, a pull-over instruction is performed. That is, if Yc>0, a pull-over-to-the-right instruction as shown in FIG. 33 is displayed in the left-hand area of the screen and if Yc<0, a pull-over-to-the-left instruction is displayed in the right-hand area of the screen. At this time, notification of pulling over is also made in voice from the speaker 51.

Assume that while facing a load handling target at a predetermined distance (e.g., 2 to 3 m), the forklift 1 is greatly deviated to the left in the vehicle's widthwise direction with respect to the load handling target as shown in FIG. 36(a). At this time, the instruction guide 88 instructing pulling over in the rightward direction is displayed on the screen 28A as shown in FIG. 33, and an instruction for pulling over in the rightward direction is given in voice guidance. And, the driver steers the steering wheel 10 to the right according to the instruction to pull over to the right, and when the vehicle is corrected to the point where no further pulling over is needed, the instruction guide 88 disappears from the screen. This can reduce the frequency of occurrence of the inconvenience that after the forklift 1 are moved close to the load handling target, the wheel of the forklift 1 should be quickly turned due to a large sideway positional deviation between the forks 2 and the load handling target.

After the instruction guide 88 is gone, the forks 2 can be inserted into the insertion holes 41A of the pallet 41 by using side shifting as needed.

The display position of the instruction guide 88 is set to the left side of the screen when it is "pull-over-to-the-right" and is set to the right side of the screen when it is "pull-over-to-the-left". That is, the display position of the instruction guide 88 is set in an area opposite to the position where the mark M is displayed with respect to the moving target point. In case of the pull-over-to-the-right where the vehicle body is shifted to the left, for example, the instruction guide 88 is displayed on the left-hand side, so that the load handling target is not blocked by the display of the instruction guide 88. As the load handling target on the screen comes closer to the center of the screen by the pulling over of the vehicle, the instruction guide 88 disappears so that the image of the load handling target is less blocked by the instruction guide 88 displayed on the screen 28A.

When the activation switch 38 of the multi lever 31 is operated in a state in which the forks 2 can be inserted in the insertion holes 41A of the pallet 41 by using side shifting, automatic fork positioning control is initiated. The control amounts are acquired from the relative positional coordinates (Xc, Yc, Zc), and the positioning of the forks 2 is executed by controlling the current values of the electromagnetic proportional valve 65 for lifting and the electromagnetic proportional valve 68 for side shifting via the solenoid drive circuit 50 based on the control amounts and by driving and controlling the lift cylinders 15 and the side shift cylinder 71 as needed.

The present embodiment has the following advantages.

Before approaching a load handling target, the position of the load handling target on the image picked up by the camera 24 beforehand is grasped by using an image recognition process and the deviation amount between the forks 2 and the pallet 41 is calculated. Then, when the deviation amount |Yr| exceeds the set value S, the pull-over instruction guide 88 is displayed on the screen 28A. If the vehicle is allowed to approach the load handling target while being pulled over according to the instruction guide 88, therefore, the vehicle can be placed in the position where the instance it approaches the load handling target, the forks 2 are insertable in the insertion holes 41A of the pallet 41.

The instruction guide 88 instructs not only the pull-over direction but also the pull-over distance. As the direction and the distance in and by which pulling over should be made are known, therefore, the driver can correctly place the vehicle with respect to the load handling target by following the instruction guide 88.

If and only if even side-shifting the forks 2 cannot cause the forks 2 to be inserted into the insertion holes 41A of the load handling target (pallet 41), the instruction guide 88 is displayed on the screen 28A. Therefore, the vehicle can be directly driven without being pulled over when side shifting can cope with it.

The timing to set off the display of the instruction guide 88 is when the deviation amount |Yr| falls within the set value S. Therefore, pulling over according to the instruction of the instruction guide 88 can correct the vehicle to the position where side shifting can cope with it.

The instruction guide 88 is displayed on the screen 28A at the position to avoid the load handling target. That is, the instruction guide 88 is displayed to the left on the screen when the load handling target is shifted to the right on the screen 28A, and the instruction guide 88 is displayed to the right on the screen when the load handling target is shifted to the left on the screen 28A. Thus, the display of the instruction guide 88 does not block the display for positioning the load handling target displayed on the screen 28A.

A pull-over instruction is notified in voice from the speaker 51. Even when the driver is not watching the screen 28A, therefore, as the driver listens to the voice instruction, the driver can know beforehand that the vehicle body is shifted in the vehicle's widthwise direction with respect to the load handling target. Therefore, it is possible to prevent the quick turn of the wheel of the vehicle originated from overlooking the instruction guide 88 on the screen 28A.

As the method of detecting the position of the load handling target through an image recognition process using the image picked up by camera 24, is adopted, the position of the load handling target can surely be detected even at a distance apart from the load handling target by several meters.

By using the camera 24 and display device 28 provided to support a load carrying work at a high place, the instruction guide 88 is displayed on the screen 28A of the display device 28. It is therefore possible to easily add the pull-over instruction notifying function merely by adding software.

Ninth Embodiment

The controller 45 in this embodiment determines how far to approach when the forklift 1 is caused to approach a load handling target, and instructs it to the driver. For example, after the vehicle is moved close to the load handling target, the load handling apparatus 11 is extended such that the forks 2 are inserted into the insertion holes 41A of the pallet 41. At this time, if the vehicle is not sufficiently close to the load handling target, the vehicle must be moved forward after extending the load handling apparatus 11. To avoid such an inconvenience, an instruction is output onto the screen 28A until the vehicle comes as close to the load handling target as needed. The forklift 1 is provided with a reach sensor (not shown) that detects a reach amount, and the controller 45 calculates the reach amount from a signal input from the reach sensor.

Figure 37:
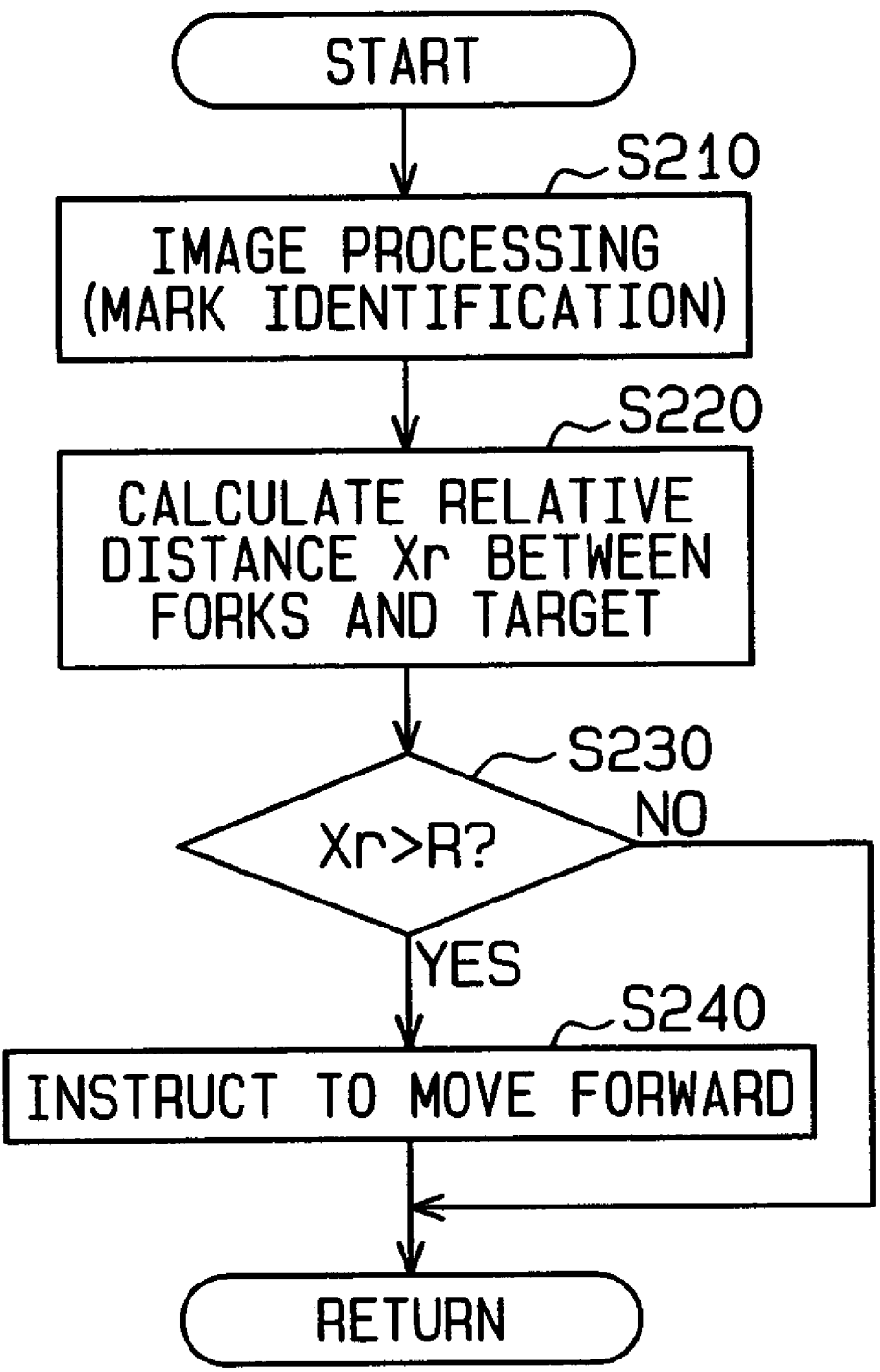
FIG. 37 is a flowchart of an instruction displaying process routine according to a ninth embodiment.

In the present embodiment, a guide displaying process routine illustrated in a flowchart in FIG. 37 is stored in the controller 45 as a process the controller 45 executes to display an instruction guide. The following will describe the instruction guide displaying process that is executed in accordance with this flowchart.

First, in S210, the controller 45 executes image processing (mark identifying process). That is, if it is a load pickup mode, a process of identifying the mark M1 using the template T1 is executed, whereas if it is a load deposition mode, a process of identifying the mark M2 using the template T2 is executed. Thus, position data I, J and D values of the mark are acquired.

In the next S220, the controller 45 calculates the relative distance Xr between the forks and the target. That is, the relative position (Xc, Yc, Zc) is acquired based on the position data I, J and D values of the mark. Then, Xr(=−Xc−Rshift) is calculated from the Xc value. Here, Rshift is the reach amount that is grasped based on the detection signal from the reach sensor.

In S230, the controller 45 determines whether or not Xr>R is satisfied. If Xr>R is not satisfied, this routine is terminated, whereas if Xr>R is satisfied, the process proceeds to S240. Here, R is a set value equal to or smaller than the maximum reach amount.

In S240, the controller 45 makes a forward drive instruction. That is, an instruction guide to instruct the forward driving is displayed on the screen 28A and the forward driving is instructed also in voice from the speaker 51.

If the vehicle is stopped according to the display on the screen 28A and an instruction guide made in voice at the time of moving the vehicle closer to the load handling target, it is possible to reach the forks 2 from the stop position and surely catch the load handling target. This can avoid a wasteful work of moving the vehicle forward again by a short distance because of an insufficient forward movement of the vehicle after the operation enters the reach operation.

Tenth Embodiment

This embodiment determines beforehand whether the forks 2 reach the height of the target or not and, when it is determined that it is not reachable, the driver is given a notification to that effect. The instrument panel is provided with a height check switch 130 (see FIG. 4) which is operated at the time of checking whether the height of the target rack exceeds the limit of a maximum height Hmax of the forklift 1. When there are plural marks shown on the screen 28A, with the topmost mark M1 (M2) taken as a target, the target height is calculated in load pickup mode as the height to the insertion holes 41A of the pallet 41 corresponding to the mark M1 and the target height is calculated in load deposition mode as the deposition height to the shelf plate 42 corresponding to the mark M2.

At the time of calculating the target height, first, the top stage of the rack 40 is picked up by the camera 24 at the position at a distance from the rack 40. In this case, a sufficient distance from the rack 40 may be taken or the forks 2 may be lifted up to make it easier to show the topmost stage of the rack. When the height check switch 130 is operated in that state, the controller 45 aims at the mark M1 (M2) at the topmost position in the image shown on the screen 28A. The height sensor 58 can be used continuously to detect the height.

Figure 38:
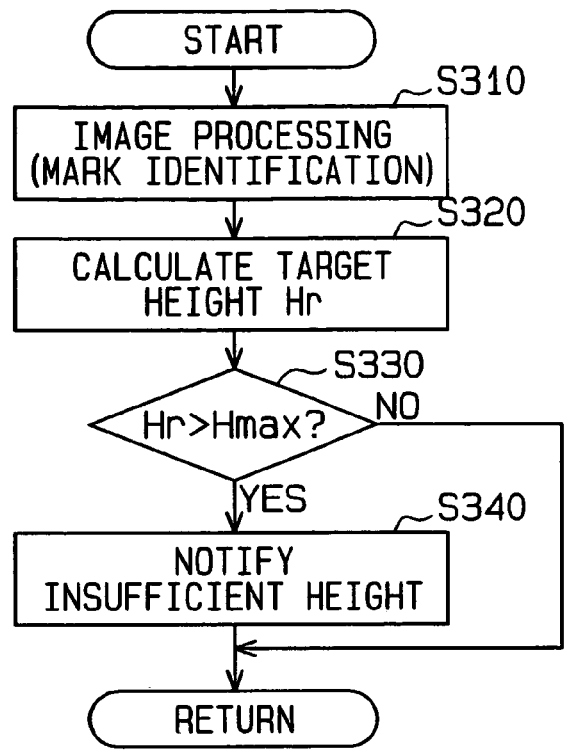
FIG. 38 is a flowchart of an instruction displaying process routine according to a tenth embodiment.
Figure 39:
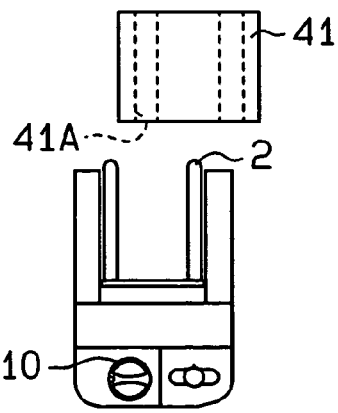
FIGS. 39(a), (b) and (c) are explanatory diagrams showing a circumstance in which the position of a vehicle is corrected according to a prior art corresponding to the eighth embodiment.
Figure 39:
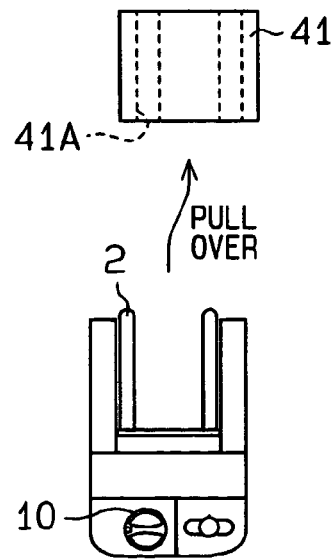
Figure 39:
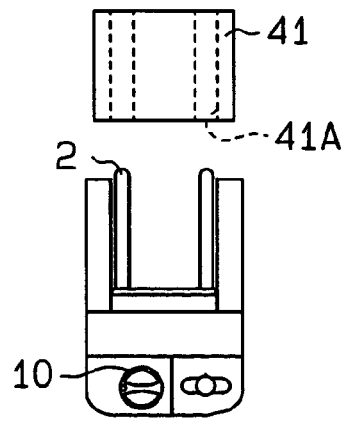

In the present embodiment, a height checking routine illustrated in a flowchart in FIG. 38 is stored in the controller 45 as a process the controller 45 executes to display for height checking. The following will discuss the height checking process that is executed according to this flowchart.

First, in S310, the controller 45 executes image processing (mark identifying process). That is, if it is a load pickup mode, a process of identifying the mark M1 using the template T1 is executed, whereas if it is a load deposition mode, a process of identifying the mark M2 using the template T2 is executed. And, position data I, J and D values of the mark are acquired.

In the next S320, the controller 45 calculates the height Hr of the target. That is, the relative position (Xc, Yc, Zc) is acquired based on the position data I, J and D values of the mark. Then, the target height Hr (=Zc+Hf) is calculated using the Zc value and the height Hf obtained from the detection signal from the height sensor 58.

In S330, the controller 45 determines whether or not Hr>Hmax is satisfied. If Hr>Hmax is not satisfied, this routine is terminated, whereas if Hr>Hmax is satisfied, the process proceeds to S340.

In S340, the controller 45 notifies that load handling is impossible due to an insufficient height. That is, notice is displayed on screen 28A and by voice from speaker 51 that the forks 2 do not reach the target and the height is insufficient.

If the load handling target to be an aim is shown on the screen 28A and the height check switch 130 is manipulated, the target height is detected and it is determined whether or not the forks 2 reach the target, and if the forks 2 do not reach the target, notification to that effect (insufficient height) is made through the display on the screen 28A and voices from the speaker 51. Therefore, the driver can know beforehand that the load handling target should be changed before going to a work of actually approaching the rack or lifting the forks 2 up. It is thus possible to avoid a wasteful work of changing the load handling target after actually approaching the rack 40 or lifting the forks 2 up and finding out that the target is not reachable.

The present embodiment is not limited to what is described above, but may be embodied in the following forms.

In the eighth embodiment, the timing to set off the display of the instruction guide 88 is set to when |Yr|≦S (e.g., S=150 mm) is satisfied and the vehicle is guided to the position where side shifting can cope with it. In contrast to that, the timing to set off the display of the instruction guide 88 may be set to |Yr|≦S (e.g., S=within 40 mm) so that the vehicle can be pulled over to the position where the forks 2 can be inserted directly into the insertion holes 41A of the pallet 41 without being side-shifted. In this case, if the vehicle is pulled over according to the instruction guide 88, the forks 2 can be inserted directly into the insertion holes 41A of the pallet 41 without being side-shifted. This can eliminate the troublesome side shifting operation, further improving the work efficiency.

The contents to be notified by the notification means is not limited to the pull-over direction and distance. The direction alone may be notified. For example, when the pull-over direction is notified and the position of the vehicle is corrected within the range where the load handling target can be caught by mere movement of the forks, the notification of "OK" may be given or notification may be ended. Instead of the pull-over direction, the moving direction may be instructed; for example, the angle of the arrow direction of the instruction guide may be changed in accordance with the course.

The detection means is not limited to a camera. It may be a sensor which can detect the position of the load handling target. For example, a plurality of laser beams may be irradiated horizontally from a predetermined height of a rack while an industrial vehicle may be equipped with plural sensors in the vehicle's widthwise direction at the same height as the irradiation height of the laser beams, the position of the industrial vehicle may be calculated from the layout of those of the plural sensors which have received the laser beams, and the pull-over direction and distance may be instructed based on the calculated position.

Further, in case of using a camera, the camera need not be provided on the industrial vehicle. A method may be employed which the camera is set on the ceiling of a warehouse, the position of the industrial vehicle is calculated based on image data picked up by that camera and the controller of the industrial vehicle is informed of the calculated vehicle position data by radio communication. The controller calculates the pull-over direction and distance to be corrected, based on the received vehicle position data and notifies the driver through display or in voice.

It is possible to set the position arbitrarily to display an instruction guide on the screen of the display device. For example, it is possible to calculate the position of a mark, predict and calculate a work area on the screen from the position of the mark, and display an instruction guide in a display position where the predicted work area is avoided.

The path of a course (drive line) to guide the vehicle may be displayed on the screen 28A.

Instead of instructing the steering direction by a figure, such as an arrow, on the screen of the display device, the direction in which the steering is manipulated may be displayed in a sequence of characters. For example, a sequence of characters, such as "pull over to the right" or "pull over to the left", is displayed.

The instruction sign is not limited to the shape that has directivity, such as an arrow. A mark with a shape that does not have directivity (a circle, rectangle, or the like) may be used and the pull-over direction may be notified by the position on the screen where that mark is to be displayed. In this case, the driver can see that it is an pull-over-to-the-left instruction if the mark is displayed on the left-hand side of the screen and it is a pull-over-to-the-right instruction if the mark is displayed on the right-hand side of the screen.

A structure may be such that two types of indicator lights, such as lamps or LEDs, are provided on the instrument panel in the driver's cab and the direction to correct the vehicle is indicated by turning on the indicator lights. In this case, the indicator lights constitute the notification means.

Although the mark for position detection of a load handling target is a radial figure, it is not limited to such a figure. It may be a simple figure, such as a circle (○), a rectangle (■) or a triangle (Δ). The position detection of a load handling target may be carried out by performing pattern matching using multiple templates, or an image recognition method other than the pattern matching may be used to detect the position of a load handling target.

The eighth to tenth embodiments are not limited to an industrial vehicle that has forks (load carrying apparatus) provided movable in the vehicle's widthwise direction. They can be adapted to a forklift that does not have the side shifting function. In this case, if notification to guide the course of the forklift in such a way as to insert the forks into the holes of a pallet is designed to be made through display or in voice or the like, the same advantages as those of the above embodiments can be obtained.

The direction indicating sign, such as the instruction guide 88, which indicates the direction to guide the vehicle through display is not limited to an arrow mark. Any direction indicating sign is displayed on the screen from which the direction can be seen is sufficient. For example, it may be a figure of a pattern of a steering wheel, which indicates an arrow with a rotational direction, a figure of a vehicle that tilts in the direction according to the course, or the like. Of course, the direction indicating sign may be a moving picture as well as a still picture. The direction indicating sign may flicker.

The above embodiments are premised on that the vehicle approaches a load handling target from the front. However, the steering angle may be considered at the time of giving an instruction so that a pull-over instruction is carried out correctly even in the process in which, for example, the vehicle enters a load handling symmetry from the oblique direction or approaches the load handling target from the oblique direction to be pulled over. That is, the steering angle (tire angle) of the drive and steering wheel may be detected by a steering angle sensor (tire angle sensor), the state angle of the vehicle with respect to the load handling target (mark) may be calculated from the detected steering angle, the direction to steering the steering wheel may be acquired from the relationship between a change in steering angle and a change in the distance Yc between the moving target point and mark, and the direction and angle to steer may be displayed on the screen or indicated in voice.

In an industrial vehicle that does not employ automatic fork positioning control and is constructed to only display the image of a load carrying work area on the screen of a display device provided in a driver's cab to aid a load handling operation performed by a driver, a structure which notifies only the direction to manipulate the steering wheel or the operation lever for the driver to position the forks can be employed. The notification in this case is done by an instruction through display on the screen or a voice or sound instruction.

Although notification to guide a position correction is made only when the vehicle is deviated with respect to a load handling target in the eighth embodiment, notification may also be made when the position of the vehicle coincides with the load handling target.

Eleventh Embodiment

The present embodiment relates to an industrial vehicle equipped with a voice notification apparatus capable of notifying a change in the display state of a display device in voice. This embodiment will be described mainly on differences from the individual embodiments according to FIGS. 40 to 45.

Figure 40:
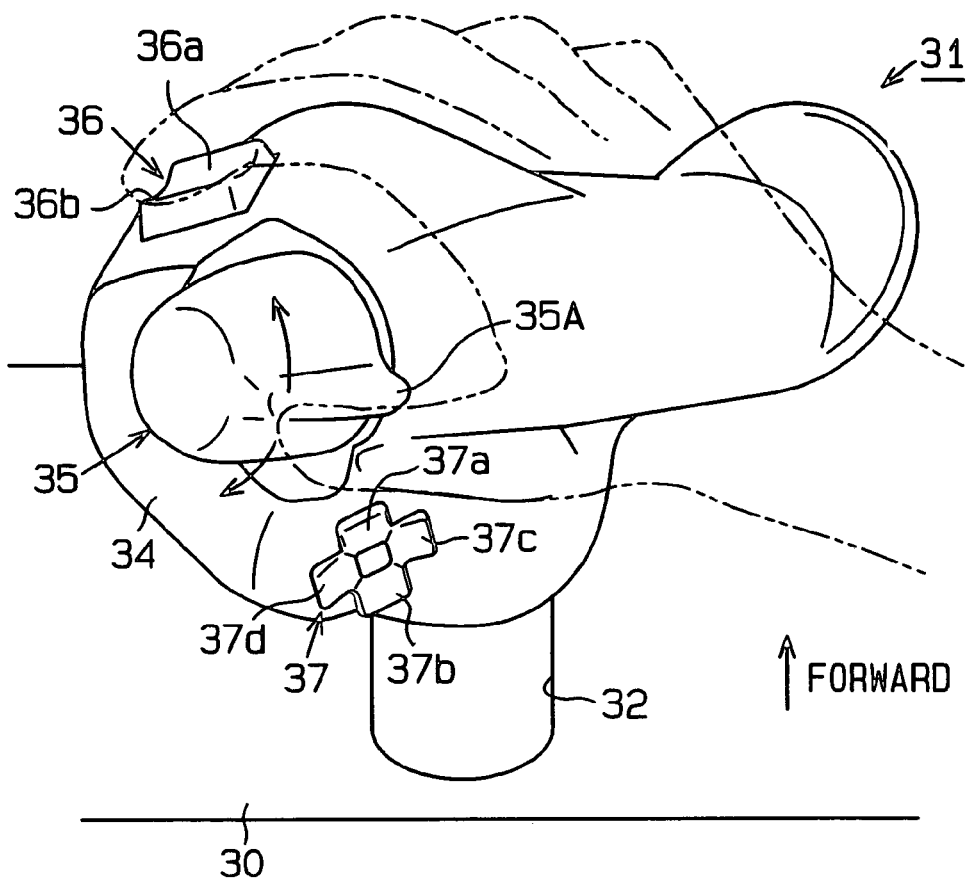
FIG. 40 is a perspective view of a multi lever according to an eleventh embodiment.
Figure 41:
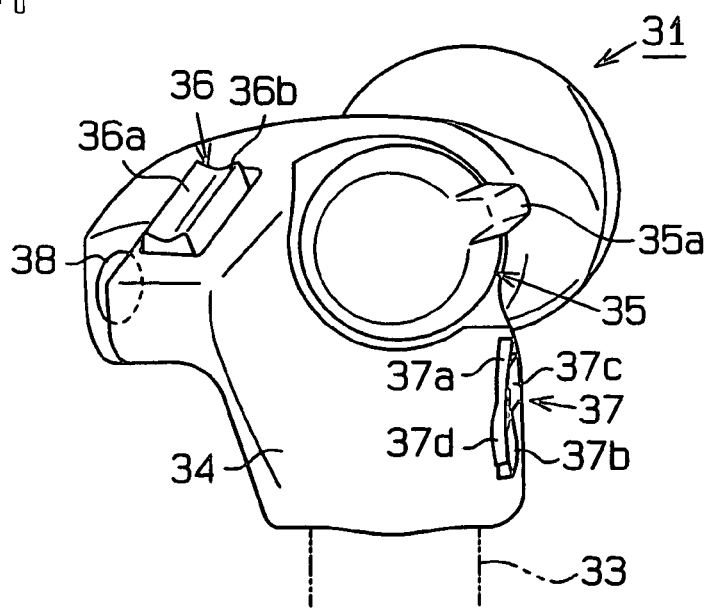
FIG. 41 is a side view of the multi lever.

FIG. 40 is a perspective view of a multi lever according to the present embodiment. FIG. 41 is a side view of the multi lever. The multi lever 31 as a load handling lever is provided on the instrument panel. The multi lever 31 has plural types of operation sections that can ensure all the operations of the driving operation and load handling operation. As its specific structure is the same as that of the multi lever of the first embodiment, the detailed description will be omitted.

Figure 42:
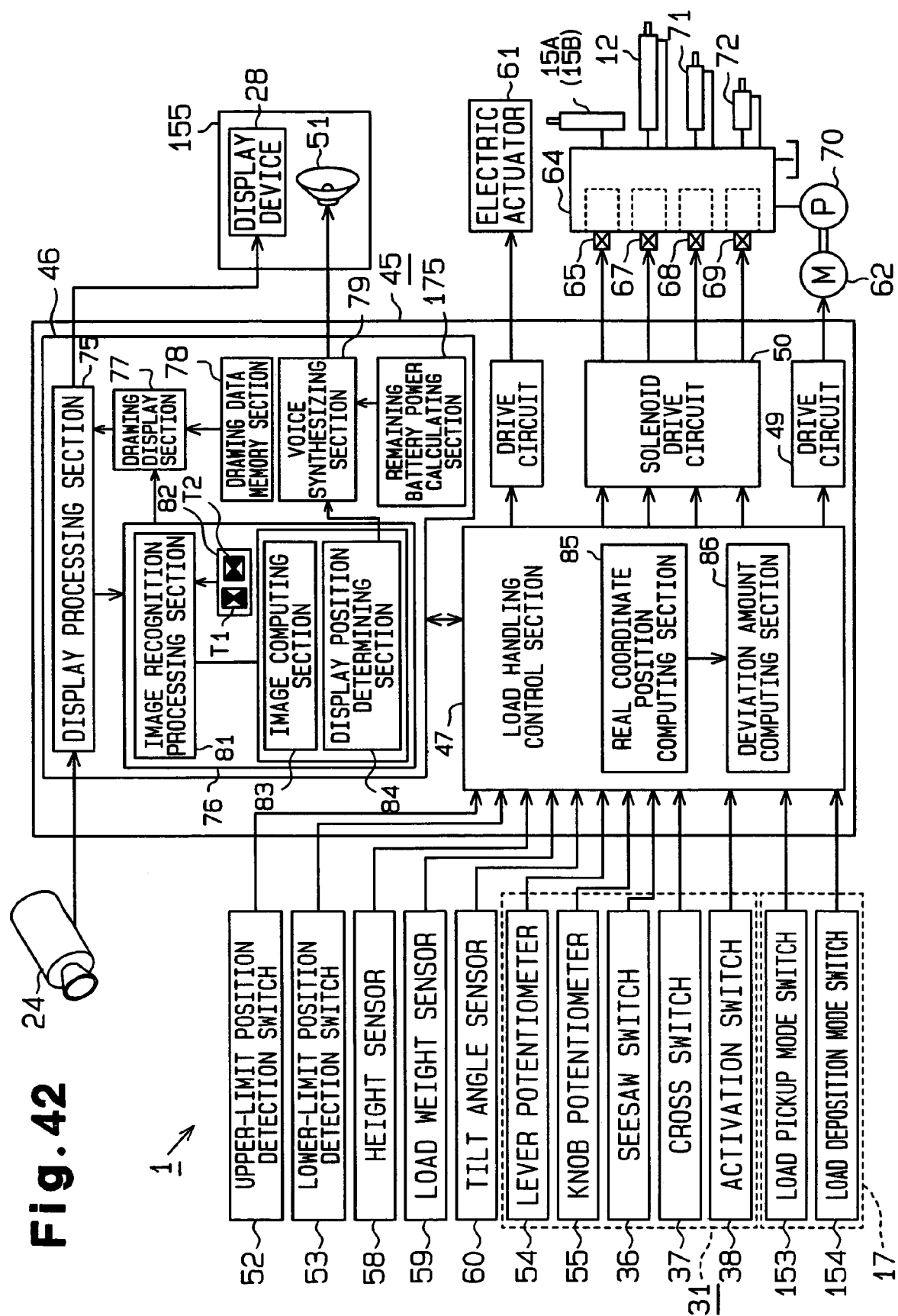
FIG. 42 is an electric circuit diagram of a forklift.

FIG. 42 shows the control circuit of a forklift of the present embodiment. Formed on a handle knob 17 of the vehicle shown in FIG. 1 are a load pickup mode switch 153 and a load deposition mode switch 154, which set the operation mode manually. Those two switches 153 and 154 are connected to the input side of the load handling control section 47 shown in FIG. 42. When the load pickup mode switch 153 in those switches 153 and 154 is depressed, the operation mode is set to the "load pickup mode" and when the load deposition mode switch 154 is depressed, the operation mode is set to the "load deposition mode".

The camera 24 is connected to the input side of the image control section 46 and an output device 155 is connected to the output side. The output device 155 has the display screen 28A of the display device 28 and the speaker 51, and the image control section 46 displays the image (video image), picked up by the camera 24, on the display screen 28A and causes the speaker 51 to generate a predetermined sound. To acquire the amount of deviation of the forks 2 at the time of the automatic fork position control, the image control section 46 executes image processing based on image data acquired from the camera 24.

The image control section 46 has the display processing section 75, the image processing section 76, the drawing display section 77, the drawing data memory section 78 and the voice synthesizing section 79. The display processing section 75 outputs a video signal, input from the camera 24, to the display device 28 in such a way that the image picked up by the camera 24 is displayed on the screen. The image processing section 76 receives the image data from the display processing section 75, performs an image recognition process based on the image data and calculates the coordinates of the marks M1 and M2 and the coordinates of a shift target point 87 or the like on the display screen 28A of the display device 28.

Figure 43A:
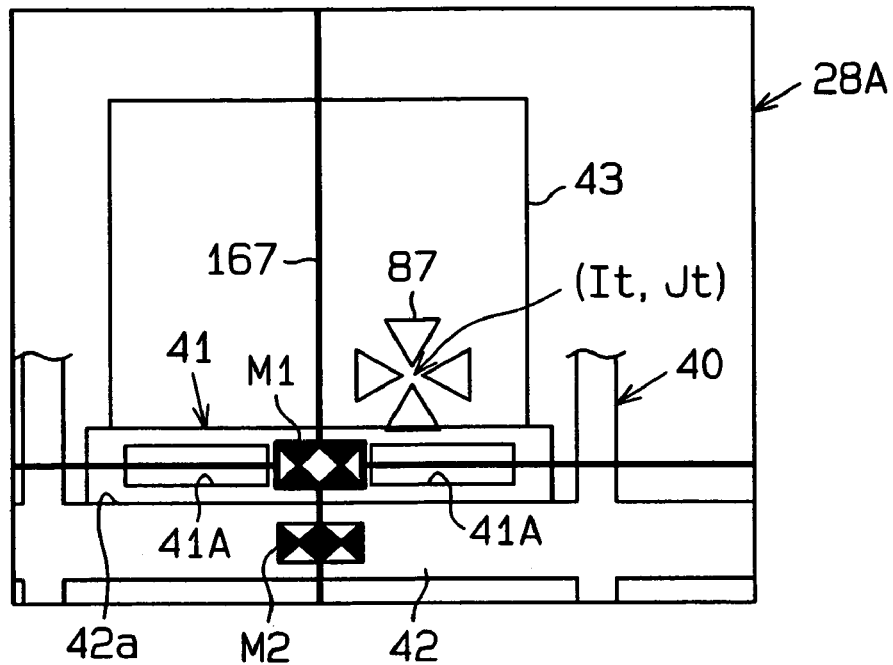
FIG. 43(a) is a diagram showing the screen of a display device before positioning of forks and FIG. 43(b) is a diagram showing the screen after positioning.

Based on the results of the processing of the image processing section 76, the drawing display section 77 displays the drawing of the shift target point 87 and a target line 167 (see FIGS. 43(a), (b)) or the like on the display screen 28A as drawing data stored in the drawing data memory section 78. The drawing display section 77 respectively displays, on the display screen 28A, the "load pickup mode" when the operation mode is the load pickup mode and the "load deposition mode" when the operation mode is the load deposition mode.

The image processing section 76 has the image recognition processing section 81, the template memory section 82, the image computing section 83 and the display position determining section 84. The load handling control section 47 has the real coordinate position calculating section 85 and the deviation amount computing section 86.

The following will describe the contents of the processes performed by the image control section 46 and the load handling control section 47 at the time of the automatic fork position control according to the drawings.

Figure 43B:
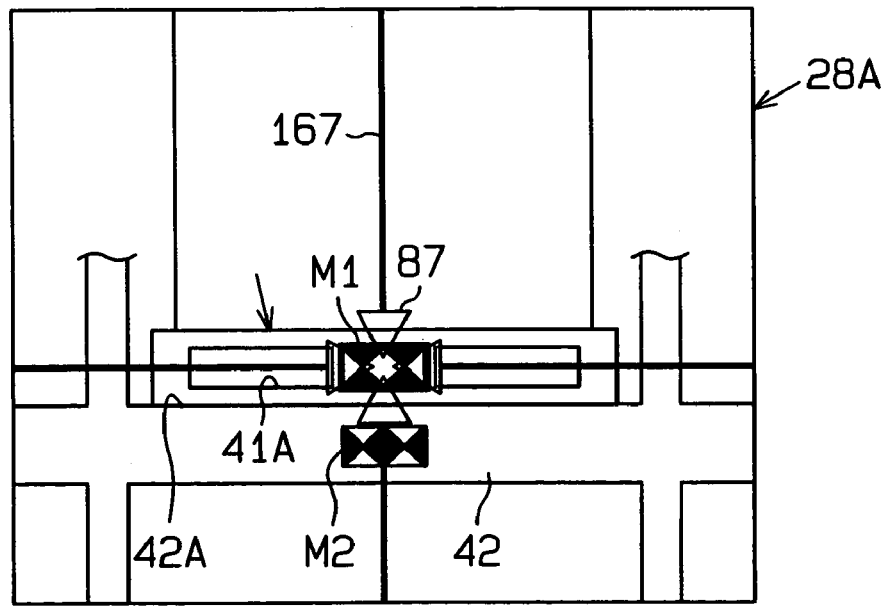

As automatic fork positioning control is executed, the display screen 28A changes to a state after positioning shown in FIG. 43(b) from a state before positioning shown in FIG. 43(a) in case of the load pickup mode. While both diagrams show the case of a load pickup work to pick up a pallet 41 placed in the rack 40, a load deposition work is carried out in similar procedures. The target line 167 with an approximately cross shape is drawn on that of the marks M1, M2 displayed on the display screen 28A which is set as a target for positioning of the forks 2 at the time of automatic fork positioning control. In case of the load pickup mode shown in FIG. 43, the mark M1 is highlighted by the target line 167.

As the automatic fork positioning control is started by depressing the activation switch 38 of the multi lever 31, the automatic fork positioning control is executed based on an image picked up by camera 24. That is, the forks 2 are automatically shifted in up and down and left and right directions, targeting the mark M1 highlighted by the target line 167 on the display screen 28A, in such a way that the mark M1 coincides with the moving target point mark 87. When the moving target point mark 87 coincides with the mark M1 after the shift operation, the forks 2 are placed in the adequate position. In a load deposition work, the mark M2 coincides with the moving target point mark 87.

The display position determining section 84 for the moving target point mark 87 calculates the center coordinates (It, Jt) of the moving target point 87. Its calculation method has been described earlier.

When the display state of the display screen 28A changes, the voice synthesizing section 79 shown in FIG. 42 causes the speaker 51 to make notification according to the change. When the camera 24 is moved from a state shown in FIG. 44 or a state where the mark M1 is not displayed on the display screen 28A, the state becomes as shown in FIG. 43(a) where the mark M1 is displayed on the display screen 28A. Then, when the image recognition processing section 76 identifies the mark M1 in case where the work mode is the load pickup mode, the voice synthesizing section 79 generates a first sound SA from the speaker 51. As the first sound SA, a sound effect, for example, "pippipipopoppopipopoppo . . . ", is generated.

Suppose that as the automatic fork positioning control has been executed, the forks 2 have been moved to the suitable position, bringing the state shown in FIG. 43(b) where the mark M1 coincides with the moving target point mark 87. That is, when the coordinates (I, J) of the mark M1 calculated by the image computing section 83 coincide with the center coordinates (It, Jt) of the moving target point 87 calculated by the display position determining section 84, the voice synthesizing section 79 generates a second sound SB from the speaker 51. As the second sound SB, a sound effect, for example, "pippipipopopopipopopo . . . ", is generated.

Suppose that as the positioned state of the forks 2 is shifted, the state where the mark M1 coincides with the moving target point mark 87 becomes the state shown in FIG. 43(a) where the moving target point mark 87 comes off the mark M1 coincides. That is, when the coordinates (I, J) of the mark M1 are shifted from the center coordinates (It, Jt) of the moving target point 87 calculated by the display position determining section 84, the voice synthesizing section 79 generates a third sound SC from the speaker 51. As the third sound SC, a sound effect, for example, "pippi", is generated.

Figure 44:
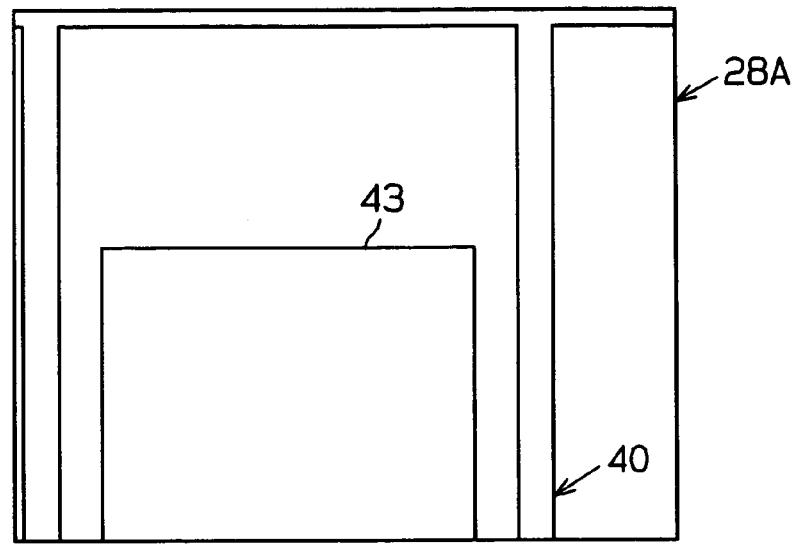
FIG. 44 is a diagram showing the screen of the display device when a mark is not displayed.

When the load handling target comes away from the camera 24 and the mark M1 comes off the image pickup range of the camera 24, the state shown in FIG. 43(a), (b), where the mark M1 is displayed on the display screen 28A, becomes the state shown in FIG. 44, where the mark M1 comes off the display screen 28A. That is, when the image recognition processing section 81 does not identify the mark M1, the voice synthesizing section 79 generates a fourth sound SD from the speaker 51. As the fourth sound SD, a sound effect, for example, "poppoppo", is generated. The generation of those sounds SA to SD is similarly done in load deposition mode, too.

Figure 45:
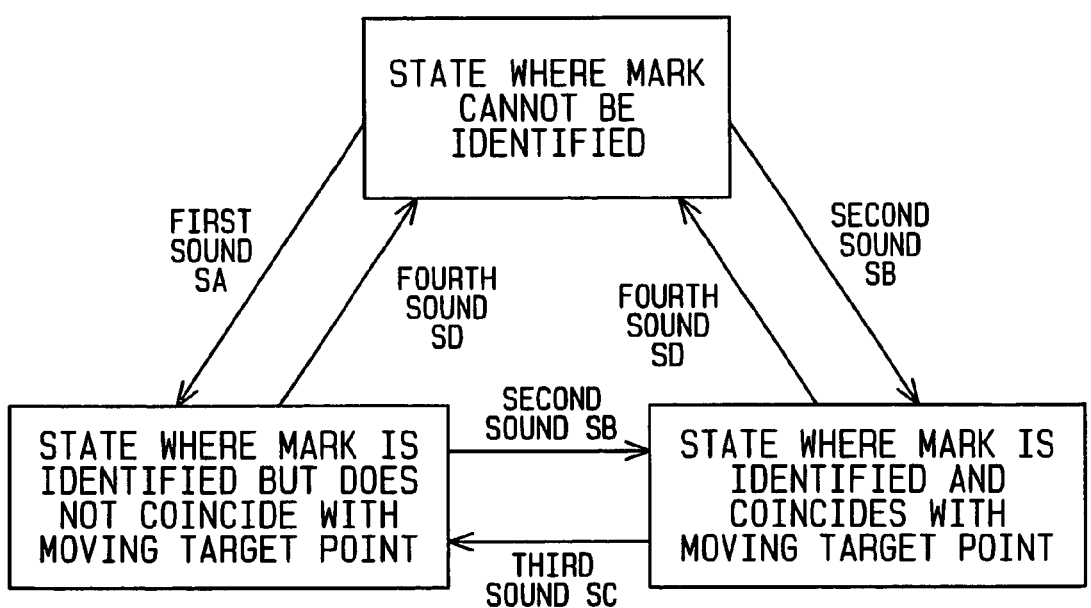
FIG. 45 is a diagram showing the relationship between the state of mark identification and sounds.

FIG. 45 shows the relationship between a change in the state of mark identification and the first sound SA to the fourth sound SD. As shown in the diagram, when the state where the mark M1, M2 could not be identified is shifted to the state where the mark M1, M2, identified though it is, does not coincide with the moving target point mark 87, the first sound SA is generated, and when the change occurs in the opposite direction, the fourth sound SD is generated.

When the state where the mark M1, M2, identified though it is, does not coincide with the moving target point mark 87 is shifted to the state where the mark M1, M2 is identified and coincides with the moving target point mark 87, the second sound SB is generated, and when the change occurs in the opposite direction, the third sound SC is generated.

When the state where the mark M1, M2 could not be identified is shifted to the state where the mark M1, M2 is identified and coincides with the moving target point mark 87, the second sound SB is generated, and when the change occurs in the opposite direction, the fourth sound SD is generated.

The above allows the driver to check if the camera 24 catches the mark M1, M2 and the image of the mark M1, M2 is identified and if the automatic fork positioning control is completed without watching the display screen 28A. Therefore, the driver need not see the display screen 28A and can give attention to other works by that amount so that the workability at the time of a load carrying work is improved.

The controller 45 shown in FIG. 42 has a remaining battery power calculating section 175 as measuring means. The remaining battery power calculating section 175 calculates the remaining power of a battery 7 installed on the vehicle body 3 and determines whether or not the remaining power is equal to or lower than a threshold value. Then, based on the decision result from the remaining battery power calculating section 175, the voice synthesizing section 79 generates a fifth sound SE when the remaining power of the battery 7 is equal to or lower than the threshold value (e.g., 10% of the total capacity). As the sound SE, for example, a message "Please charge the battery" is generated.

When the vehicle is keyed on and the automatic fork positioning control system is activated, the voice synthesizing section 79 generates a sixth sound SF from the speaker 51. The sixth sound SF is generated, for example, after the program in the controller 45 is activated and before the main loop of the image recognition process starts. As the sound SF, for example, a message "Accessing computer" is generated.

Therefore, this embodiment has the following advantages.

The sounds SA to SD are generated from the speaker 51 in accordance with the presence/absence of the mark M1 (M2) on the display screen 28A and the positional relationship between the mark M1 (M2) and the moving target point 87. Therefore, the driver can check if the camera 24 catches the mark M1, M2 and the image of the mark M1, M2 is identified and if the automatic fork positioning control is completed without watching the display screen 28A. Thus, the driver need not see the display screen 28A and can give attention to other works by that amount so that the workability at the time of a load carrying work is improved.

As a sound is generated from the speaker 51 when the remaining power of the battery 7 becomes equal to or lower than the threshold value, the driver (worker) can see through the sound that the remaining power of the battery 7 is not much.

Because the sound SF is generated from the speaker 51 when the automatic fork positioning control system is activated, it is possible to check through the sound whether or not the system has been activated normally.

The embodiment is not limited to the eleventh embodiment, but may be modified in the following forms.

The first to sixth sounds SA to SF are not limited to the aforementioned sound effects and messages. That is, the sound effects of the individual sounds in use may be other than the aforementioned ones, and messages may be generated instead of the sound effects. With regard to the messages of the sounds SE and SF, other than the above-described contents may be used and sound effects may be generated in place of the messages.

Not all the sounds SA to SD are limited to the generation type, and the structure may be such that at least one of them is generated. At this time, as what is desired most by the driver is the state of coincidence of the mark M1 (M2) and the moving target point mark 87 with each other, it is preferable that of those four sounds SA–SD, the second and third sounds SB and SC be generated.

The threshold value at the time of generating the remaining battery power is not limited to 10% of the entire battery capacity, but the value may be set freely. The sound SE should not necessarily be generated when the remaining battery power becomes low, and a process of generating the sound SE may be omitted.

The sound SF should not necessarily be generated when the automatic fork positioning control system is activated, and a process of generating the sound SF may be eliminated. The timing to activate the system is not limited to the key-on timing, but, for example, an exclusive activation switch for the system may be provided so that when the switch is set on, the system is activated.

The speaker 51 should not necessarily be incorporated in the output device 155 but may be installed on the vehicle body 3.

The display means is not limited to the display device 28 that shows an image from the camera 24. For example, a lamp is provided that is lit when the mark M1 (M2) is outside the image pickup range of the camera 24; another lamp is provided that is lit when the position of the mark M1 (M2), lying inside the image pickup range of the camera 24 though, does not coincide with the position of the forks 2; and another lamp is provided that is lit when the mark M1 (M2) is positioned with the forks 2. The structure may be such that when the lighting states of those lamps change, sounds according to the stage changes are generated.

When the mark M1 (M2) on the display screen 28A is shifted from the moving target point mark 87, for example, the display color may be changed, such as the entire screen of the display screen 28A being displayed in red. The process of changing the display color may be carried out under individual conditions, such as when the mark M1 (M2) coincides with the moving target point mark 87, when the mark M1 (M2) is displayed on the display screen 28A and when the mark M1 (M2) comes off the display screen 28A.

The automatic fork positioning control system should not necessarily have a function of automatically positioning the forks 2. That is, the structure may be such that only the presence/absence of the mark M1 (M2) on the display screen 28A or the positional relationship between the mark M1 (M2) and the moving target point mark 87 is acquired by performing an image recognition process of the mark M1 (M2).

The drive amounts of the individual cylinders may be calculated, and the position of the forks 2 may be acquired based on the amounts to calculate the moving target point mark 87. The moving target point mark 87 should not necessarily be displayed on the display screen 28A.

A target for sound notification is not limited to the automatic fork positioning control system. For example, a lamp is provided, which is lit when the tilt angle becomes horizontal, and the lamp is lit as the forks 2 with a load placed thereon are leveled at the time of a work. At this time, there may be a case where the forks 2 take a slightly forward tilted state if the forks 2 are lifted up fast. Furthermore, a message "Please lower the ascending speed" may be generated from the speaker 51 when the tilt angle is changed.

Twelfth Embodiment

The twelfth embodiment of the invention will be described mainly on differences from the first embodiment according to FIGS. 46 to 52. This embodiment relates to an apparatus, which displays work images at the time of a load pickup work and load deposition work and at the time the vehicle is running.

Figure 59:
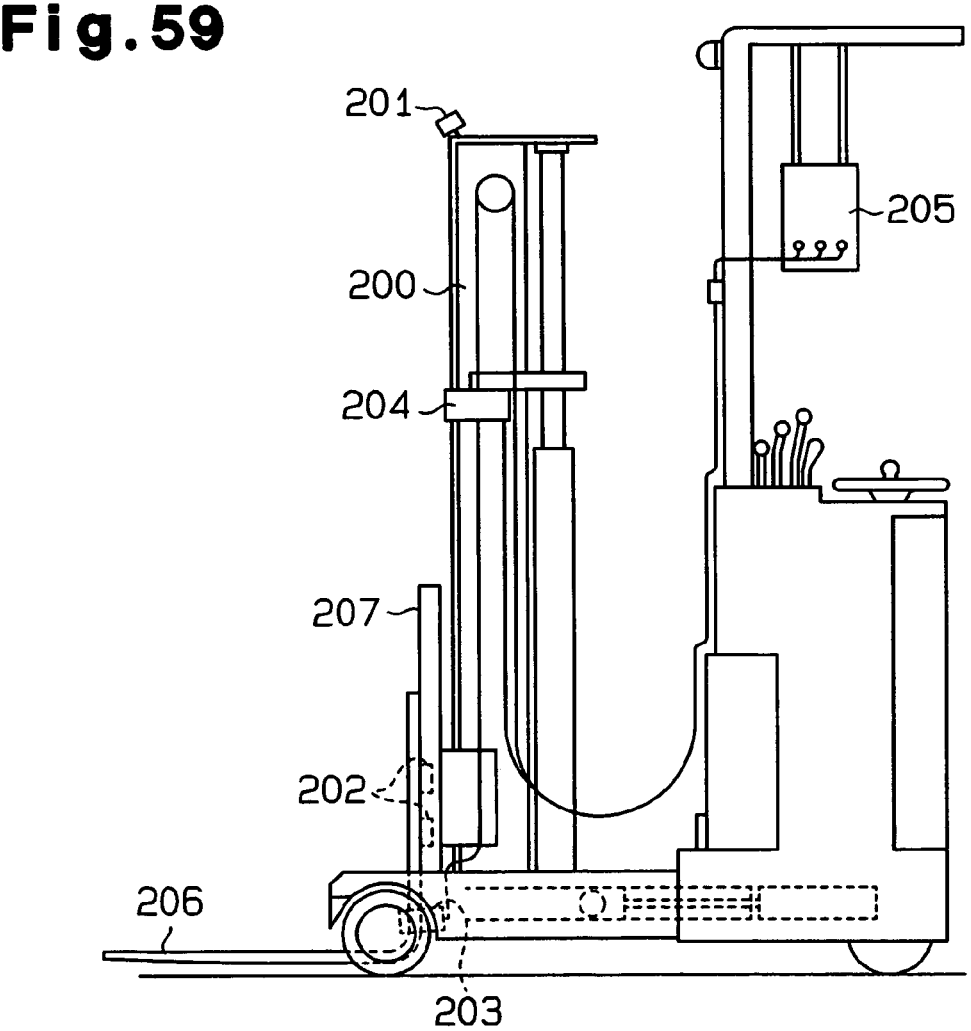
FIG. 59 is a side view of a reach type forklift equipped with a conventional forward visibility improving apparatus.

An apparatus shown in, for example, FIG. 59 is known as a conventional apparatus of this type. The apparatus has a first camera 201 for monitoring forward, which is provided on the upper portion of a mast 200, a second camera 203 for monitoring the distal end portions of forks, which is provided on the lower portion of a finger bar 202, and a third camera for front monitoring, which is provided on the intermediate portion of the mast 200. The images that are picked up by the cameras 201, 203 and 204 are selectively displayed on a monitor as a driver (operator) operates a camera select switch of an image monitor unit 205.

At the time of load pickup, for example, selecting the second camera 203 allows forks 206 to be easily inserted into a pallet at a position higher than the driver's seat while viewing the up, down, left and right states of the forks 206 is displayed on the monitor of the image monitor unit 205.

At the time a load deposition work or load pickup work is carried out with respect to a pallet on a tall truck, selecting the third camera 204 can allow a load deposition work or load pickup work with respect to a pallet blocked by a load on the forks 206 or a back rest 207 to be carried out easily while viewing a state near the pallet displayed on the monitor.

Further, at the time of driving, selecting the first camera 201 can allow the vehicle blocked by a load on the forks 206 to be driven easily while viewing an image in front of the vehicle displayed on the monitor.

However, the apparatus requires that the driver should switch the image displayed on the monitor to an image in front of the vehicle from an image of the distal ends of the forks displayed on the monitor by performing the switching operation of the camera select switch. Likewise, for deposition of a load on a truck after running is stopped, the driver should perform the switching operation of the camera select switch again to switch the image to be displayed to an image in front of the middle portion from an image in front of the vehicle.

It is therefore necessary for the driver to perform the switching operation of the camera select switch to switch the display image on the monitor every time a work state is changed, and there is some room for improvement of the work efficiency.

By way of contrast, for each of a plurality of different works, the present embodiment can provide a driver with a work image for supporting the work view field of the driver who does that work, and, what is more, does not need a switching operation for a work image to be displayed at the time of changing the work.

Figure 46:
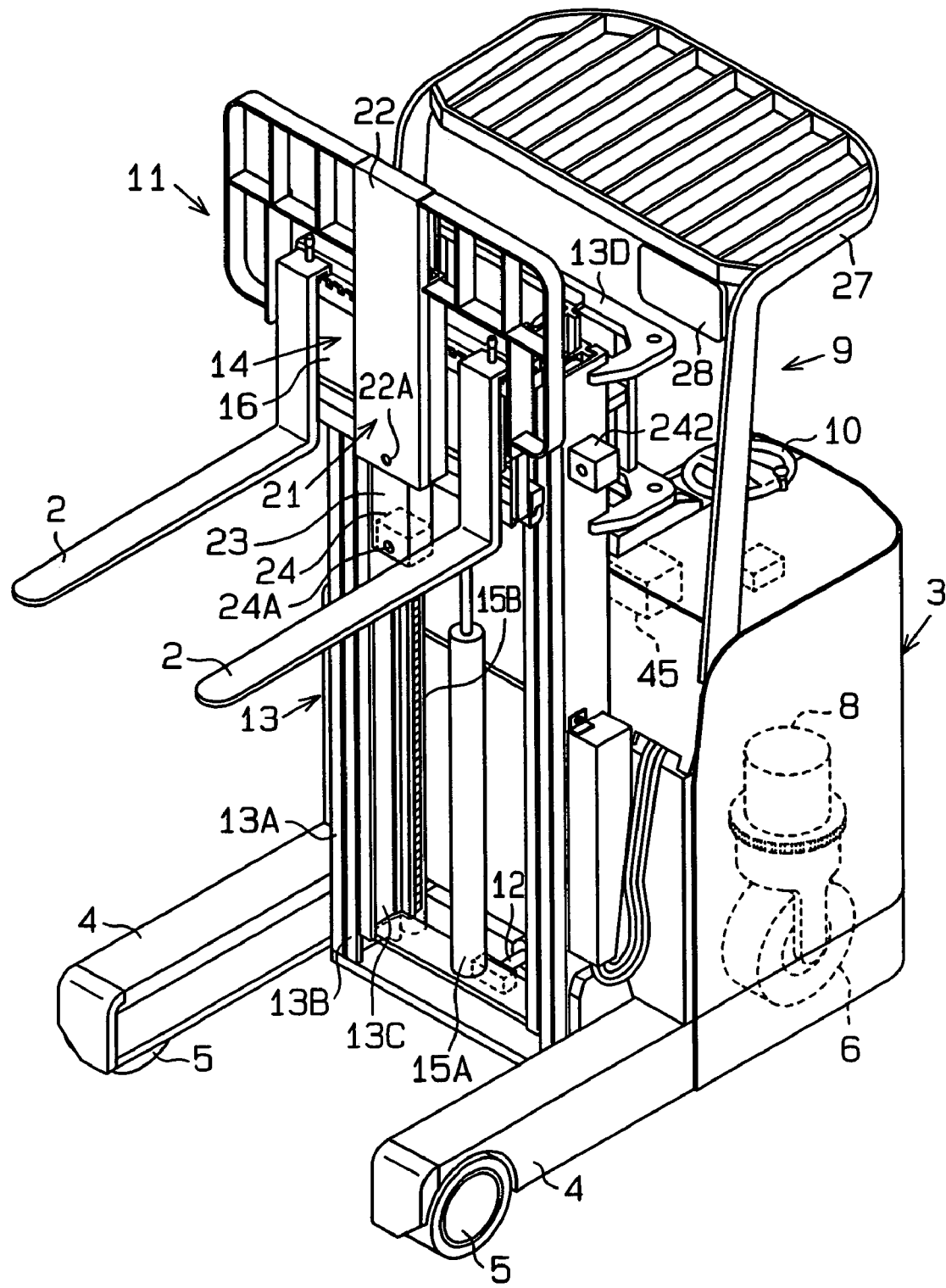
FIG. 46 is a schematic perspective view showing a forklift equipped with a work view field aiding apparatus according to a twelfth embodiment.
Figure 47:
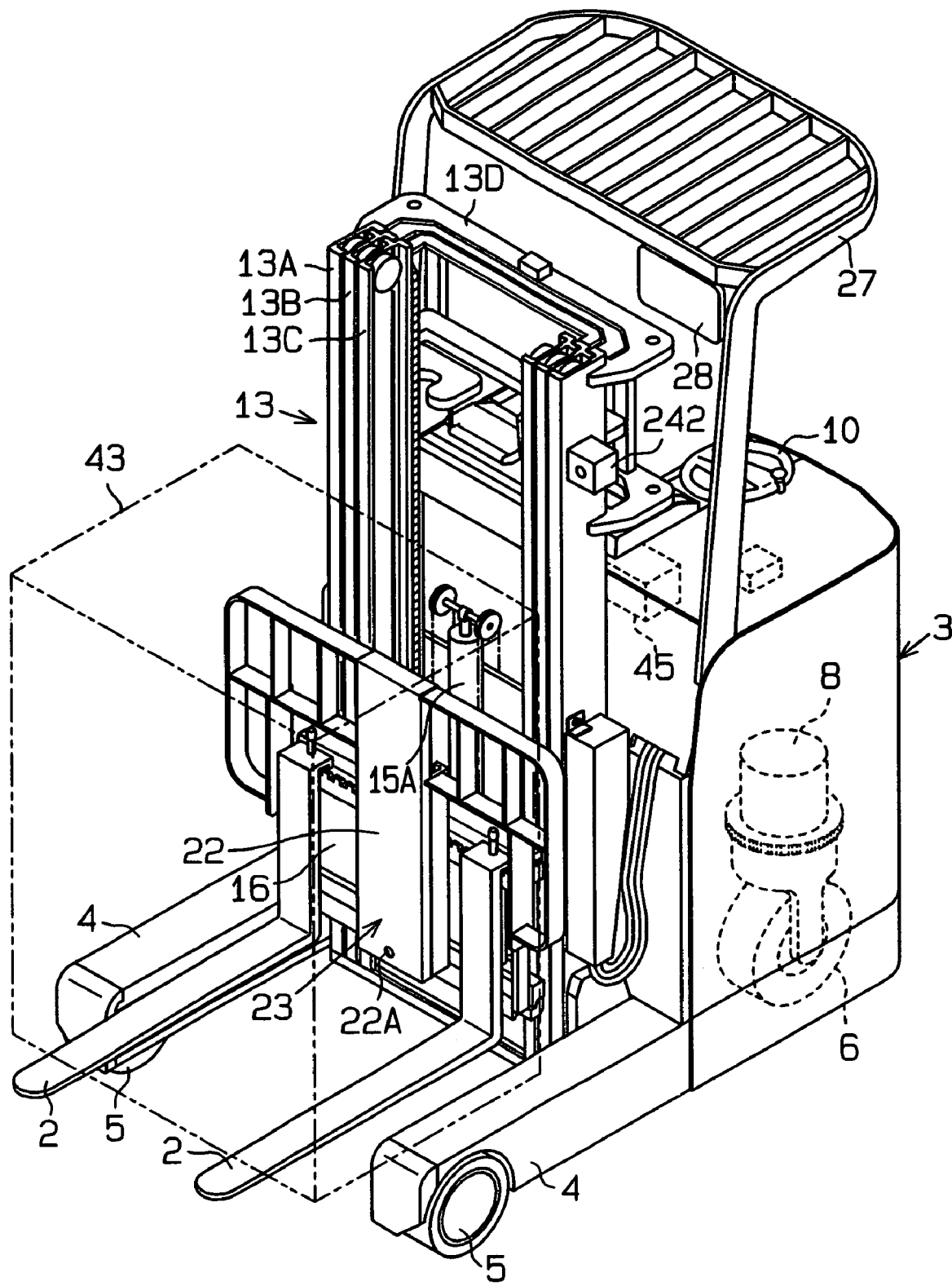
FIG. 47 is a schematic perspective view showing the forklift with forks lifted down.
Figure 48:
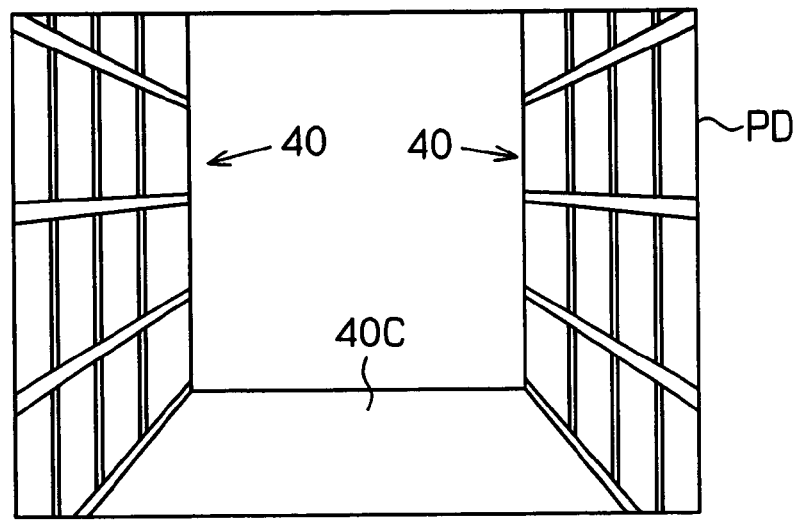
FIG. 48 is an exemplary diagram showing an image in front of a vehicle.

In the present embodiment, as shown in FIGS. 46 and 47, first, as the protraction operation of the lift cylinder 15A is performed at a state where the forks 2 are at the lowest lift-down position, the mast 13 lifts up the forks 2 from the lowest lift-down position to a first height position (reference height position) near the top end of the outer mast 13A. That is, at this time, the middle mast 13B and the inner mast 13C are left unlifted with respect to the outer mast 13A. As the protraction operation of the lift cylinders 15B is further done from that state to lift the middle mast 13B and the inner mast 13C with respect to the outer mast 13A, the forks 2 are lifted up from the upper end position of the outer mast 13A to a second height position, which is the highest.

A cross beam 13D of the outer mast 13A is provided with the height sensor 58 for detecting a state where the inner mast 13C is lifted up from the lowest lift-down position or a high elevation state where the forks 2 are lifted up beyond the first height position. The lift cylinders 15B is provided with the load weight sensor 59 for detecting the weight of the load on the forks 2.

As shown in FIGS. 46 and 47, a drive camera 242 which picks up an image in front of the vehicle for supporting the forward driving of the vehicle is provided on the outer surface of the left-hand side outer mast 13A.

The drive camera 242 is so provided as to be able to pick up, for example, an image PD in front of the vehicle in a moving passage C or the like in which storage racks 40 are provided on the left and right, as shown in FIG. 3, from the left-hand side of the load 43 on the forks 2 moved down to a position lower than the first height position. The frontward image PD in front of the vehicle, which is picked up by the drive camera 242, can supplement the forward view field of the driver which is blocked by the load 43 on the forks 2 and aid the forward running of the vehicle.

As shown in FIGS. 46 and 47, the camera unit 23 for load handling which picks up an image in front of the forks 2 to aid a load deposition work and load pickup work is provided on the front side of the side shifter 16.

As described above, the load handling camera 24 is placed in the "storage position" which is positioned above the top surfaces of the forks 2 when the entire camera unit 23 is retained in the housing 22. When the lower portion of the camera unit 23 projects below the housing 22, the load handling camera 24 is placed in the "lift-down position" which is positioned below the bottom surfaces of the forks 2, as shown in FIG. 46.

Figure 49A:
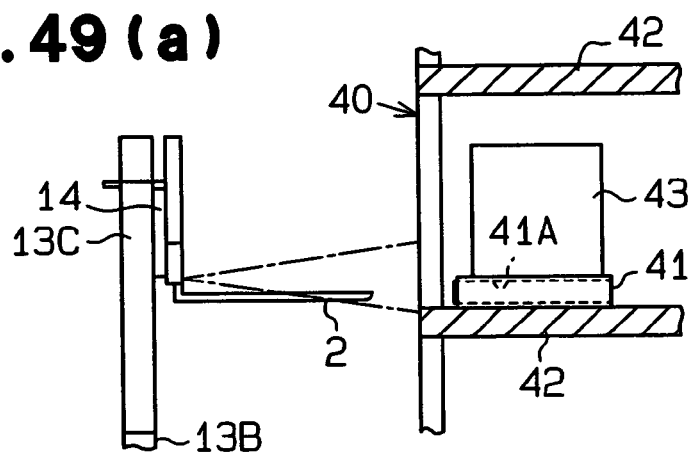
FIG. 49(a) and FIG. 49(b) are exemplary diagrams showing forks and a camera for load handling at the time of a load pickup work and at the time of a load deposition work.
Figure 49B:
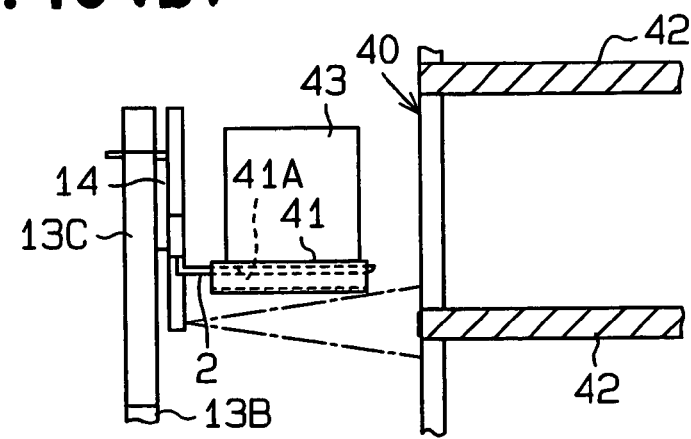
Figure 50:
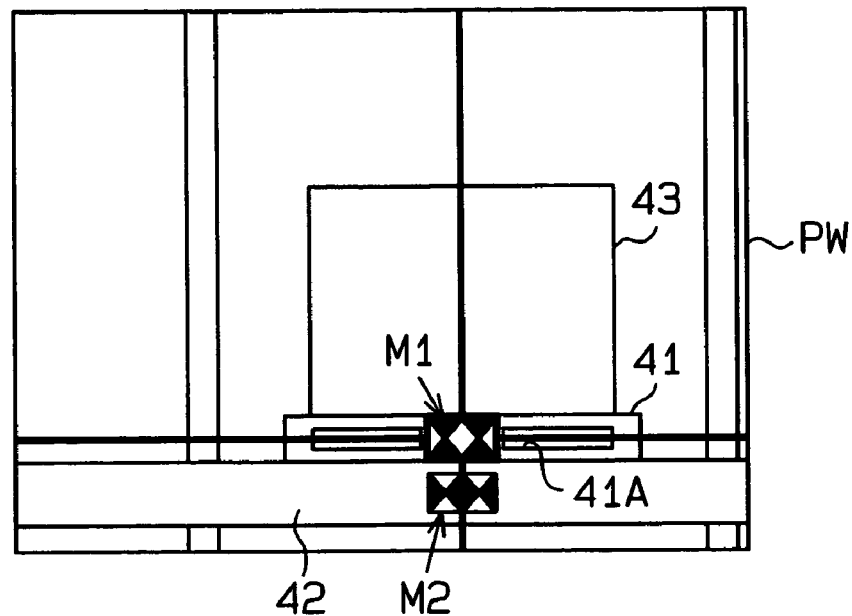
FIG. 50 is an exemplary diagram showing an image in front of the forks at the time of a load pickup work.

At the time of a "load pickup work", the load handling camera 24 is placed in the "storage position" and picks up an image in front of the forks 2 from between the left and right forks 2 without a load 43, as shown in FIG. 49(*a*), through the image pickup window 22A provided on the lower front surface of the housing 22. Then, a frontward image PW including the front surface of the pallet 41 on which the load to be picked up is placed is picked up as shown in FIG. 50.

Figure 51:
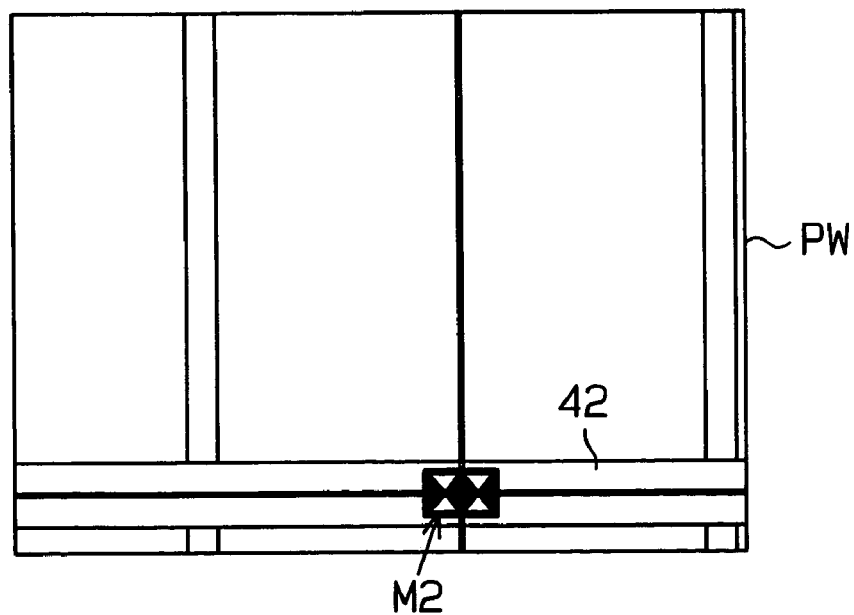
FIG. 51 is an exemplary diagram showing an image in front of the forks at the time of a load deposition work.

At the time of a "load deposition work", on the other hand, the load handling camera 24 is placed in the "lift-down position" and picks up an image in front of the forks 2 directly with the image pickup section 24A from below the load 43 on the forks 2, as shown in FIG. 49(*b*). Then, the frontward image PW including the front surface of the shelf plate 42 for load deposition in the storage rack 40 is picked up as shown in FIG. 51.

As shown in FIGS. 46 and 47, the display device 28 is provided on the bottom surface of the roof 27 located above the driver's seat 9. The display device 28 is comprised of, for example, a liquid crystal display device. The display device 28 is provided to present the driver in the driver's seat 9 with one of the image in front of the vehicle that is picked up by the drive camera 242 and the image in front of the forks 2 that is picked up by the load handling camera 24.

Figure 52:
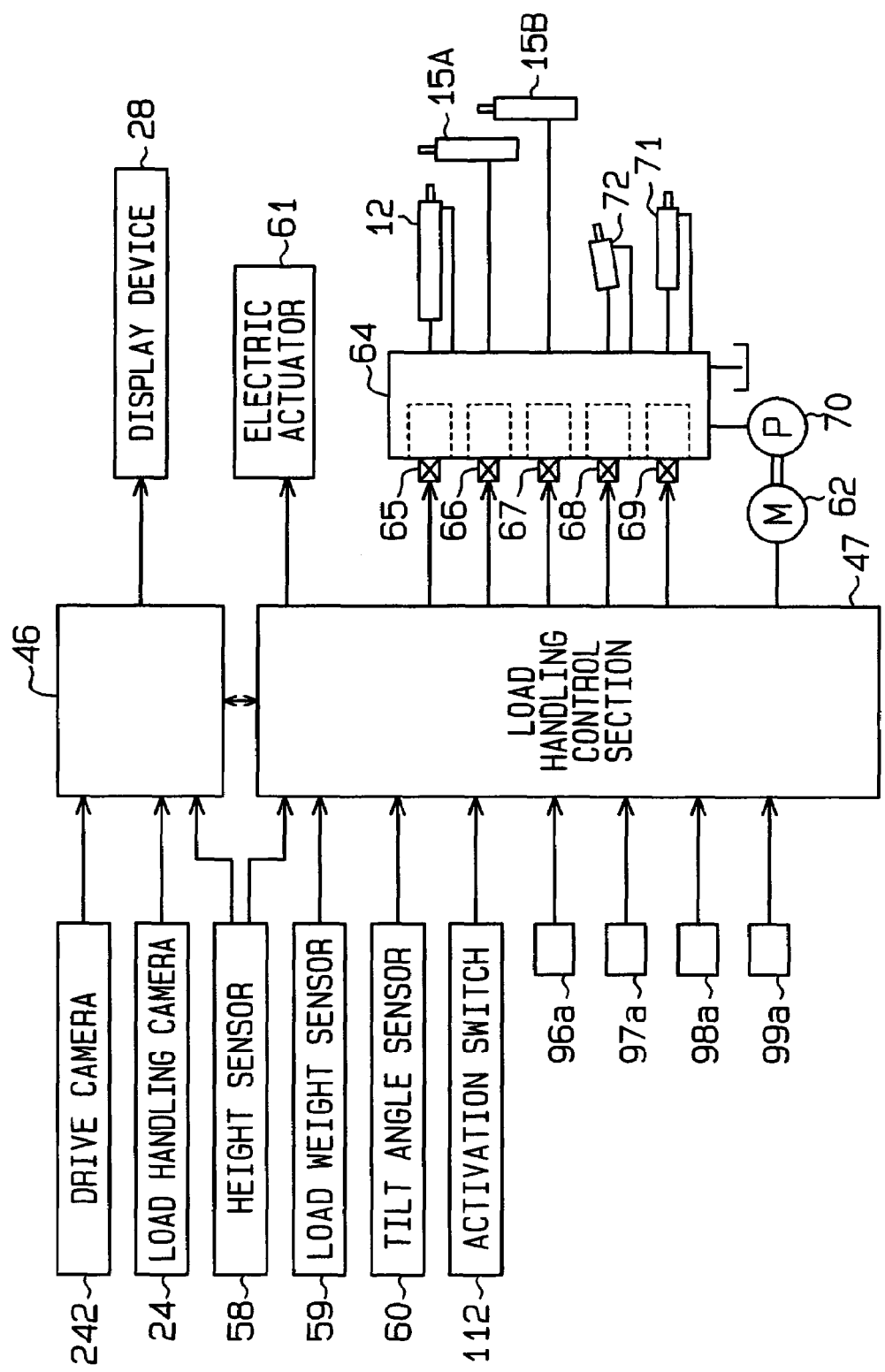
FIG. 52 is an electric block diagram of a work view field aiding apparatus and a load handling control system.

As shown in FIG. 52, the height sensor 58, the load weight sensor 59, the tilt angle sensor 60, the activation switch 112 that is operated at the time of automatically positioning the forks, and the potentiometers 96*a* to 99*a* (see FIG. 26) of the individual levers are electrically connected to the input side of the load handling control section 47. The camera lifting motor 61 as an electric actuator is electrically connected to the output side of the load handling control section 47.

The height sensor 58, the drive camera 242 and the load handling camera 24 are electrically connected to the input side of the image control section 46 and the display device 28 is electrically connected to the output side thereof.

The load handling control section 47 holds the load handling camera 24 in the "storage position" in a range where the height position of the forks 2 ranges from the lowest lift-down position to the first height position. The load handling control section 47 switches the load handling camera 24 to the "storage position" or "lift-down position" in accordance with the weight of the load 43 on the forks 2 when the height position of the forks 2 is beyond the first height position. When the weight of the load 43 is equal to or smaller than a preset decision value, the load handling control section 47 considers that there is no load 43 on the forks 2 and a "load pickup work" is to be done, and places the load handling camera 24 in the "storage position". When the weight of the load 43 exceeds the decision value, on the other hand, it is considered that there is a load 43 on the forks 2 and a "load deposition work" is to be done, and the load handling camera 24 is set in the "lift-down position".

The reason why the load handling camera 24 is placed in the "storage position" in case of a height equal to or lower than the first height position is that when the forks 2 forks are lifted down to the lowest lift-down position, the load handling camera 24 does not collide on the floor. At the time of a "load pickup work" with the forks 2 elevated beyond the first height position, it becomes a state of picking up the image PW in front of the forks 2 from between the left and right forks 2 as shown in FIG. 49(*a*). Likewise, at the time of a "load deposition work", it becomes a state of picking up the image PW in front of the forks 2 from below the load 43 on the forks 2 as shown in FIG. 49(*b*).

The automatic fork positioning control is executed when the activation switch 112 is operated in the high elevation state in which the forks 2 are lifted up beyond the first height position. As the automatic fork positioning control, the load handling control section 47 automatically positions the forks 2 in the load pickup target position for the pallet 41 on which the load 43 is placed at the time of a "load pickup work" as shown in FIG. 49(*a*). At the time of a "load deposition work", it automatically positions the forks 2 in the load deposition target position for the shelf plate 42 on which the load 43 is to be placed as shown in FIG. 49(*b*). Please refer to the individual embodiments described previously for the details of this control.

The image control section 46 switches an image to be displayed on the display device 28 between the image PD in front of the vehicle, which is picked up by the drive camera 242, and the image PW in front of the forks 2, which is picked up by the load handling camera 24, based on the detection signal from the height sensor 58.

When the height of the forks 2 is equal to or lower than the first height position, the image control section 46 displays the image PD in front of the vehicle, which is picked up by the drive camera 242, on the display device 28. In the state in which the height of the forks 2 is equal to or lower than the first height position, the driver can do load pickup or load deposition relatively easily while directly viewing the pallet 41 or shelf plate 42, but it is difficult to see in front of the vehicle when the vehicle is moved forward because of the load 43 on the forks 2 blocking the view. When the height of the forks 2 is equal to or lower than the first height position, the image control section 46 displays the image PD in front of the vehicle so that the driver can drive the vehicle forward while viewing the image PD in front of the vehicle displayed on the display device 28.

When the height of the forks 2 exceeds the first height position, on the other hand, the image control section 46 displays the image PW in front of the forks 2, which is picked up by the load handling camera 24, on the display device 28. In the state in which the height of the forks 2 exceeds the first height position, it is not easy for the driver to do a load pickup or load deposition work while directly viewing the pallet 41 or shelf plate 42, and it is less likely to drive the vehicle forward. Accordingly, at the time of positioning the forks 2 manually, the driver is allowed to be able to position the forks 2 to the pallet 41 or the shelf plate 42 while viewing the image PW in front of the forks 2 displayed on the display device 28. At the time of positioning the forks 2 under automatic fork positioning control, the driver is allowed to be able to roughly position the forks 2 to the pallet 41 or the shelf plate 42 while viewing the image PW in front of the forks 2 displayed on the display device 28.

When the forks 2 are lifted up beyond the first height position to pick up the load 43 stored for each pallet 41 on the shelf plate 42 located at a high place in the storage rack 40, the image control section 46 displays the image PW in front of the forks 2, which is picked up by the load handling camera 24, on the display device 28. This can allow the driver to see, on the display device 28, the image in front of the pallet 41 for the load 43 stored on the shelf plate 42 at a high place at which the height relationship with the forks 2 is difficult to grasp and which is blocked by the forks 2 or the back rest or the like and is difficult to see with eyes. It is possible to easily position the forks 2 to the pallet 41 manually while viewing the image PW in front of the forks 2.

And, merely causing the mast 13 to perform a reach operation frontward of the vehicle can allow the forks 2 to be inserted into the pallet 41. Or, the forks 2 can be roughly positioned to the pallet 41 while viewing the image PW in front of the forks 2 which is displayed on the display device 28. Then, the forks 2 can be position accurately to the pallet 41 by automatic control.

Likewise, even when the load 43 is placed together with the pallet 41 on the shelf plate 42 at a high place in the storage rack 40, the image control section 46 displays the image PW in front of the forks 2 on the display device 28. Therefore, the driver can easily position, or roughly position, the forks 2 while viewing the image PW in front of the forks 2 which is to be displayed on the display device 28. And, merely causing the mast 13 to perform a reach operation frontward of the vehicle can allow the load 43 to be carried over the shelf plate 42 for load deposition.

When the forks 2 are lifted down below the first height position to drive the vehicle forward after load pickup, on the other hand, the image control section 46 displays the image PD in front of the vehicle, which is picked up by the drive camera 242, on the display device 28 in place of the image PW in front of the forks, which is picked up by the load handling camera 24. Therefore, the driver can drive easily the vehicle forward while viewing the image PD in front of the vehicle, which is blocked by the load 43 on the forks 2 and hard to see.

The present embodiment discussed in detail above has the following advantages.

The drive camera 242 picks up the image PD in front of the vehicle with respect to forward driving of the vehicle that is done with the forks 2 lifted down, and the load handling camera 24 picks up a work image for a load carrying work which is carried out with the forks 2 lifted high. The image control section 46 determines whether or not a work to be done then is a load carrying work or forward driving from the height position of the forks 2, and displays the image PD in front of the vehicle or the image PW in front of the forks 2 on the display device 28 according to the work.

Therefore, the driver is presented with a work image picked up by each of the drive camera 242 and the load handling camera 24 according to the work at that time. As a result, a switching operation for a work image to be displayed is not necessary at the time of switching a load carrying work and a moving work, thus ensuring a further improvement on the work efficiency.

An image in front of the vehicle, which supplements the field of view of the driver when the vehicle is driven forward is picked up by the drive camera 242 provided on the outer mast 13A from the left-hand side of the load 43. This can allow the vehicle to run forward easily while viewing, on the display device 28, the image in front of the vehicle, which is blocked by the load on the forks 2 and is difficult to directly see with one's eyes.

The load handling camera 24 provided in front of the carriage 14, which is lifted up and down together with the forks 2, picks up an image in front of the forks 2 which supplements the field of view of the driver at the time of a "load pickup work" or "load deposition work". It is therefore possible to easily position the forks 2 while viewing, on the display device 28, the front image of the pallet 41 or the shelf plate 42 which is blocked by the load 43 on the forks 2 and is difficult to directly see with eyes.

When the inner mast 13C is positioned in or below the lowest lift-down position or the first height position, it is determined that the vehicle is in a state to run based on the height of the forks 2 that is detected by the height sensor 58; and when the inner mast 13C is positioned above the first height position, it is determined that a load carrying work is to be done. It is therefore possible to discriminate, with a simple structure, between the state where the vehicle is driven forward with the forks 2 set at a low height and the state for doing a load carrying work with the forks 2 lifted high.

The load handling control section 47 acquires a positional deviation amount of the forks 2 with respect to the pallet 41 or the shelf plate 42 from the image PW in front of the forks 2, which is picked up by the load handling camera 24, and controls the lift cylinder 15A, 15B and the side shift cylinder 71 to control the forks 2 to the load pickup target position or load deposition target position. It is thus possible to do easily a load pickup work or load deposition work even when the forks 2 are lifted high.

Thirteenth Embodiment

The thirteenth embodiment of the present invention will be described according to FIGS. 53 to 56. The present embodiment differs from the twelfth embodiment only in that the height sensor 58, the drive camera 242, the load handling camera unit 23 and the image control section 46 of the twelfth embodiment are changed to a height switch 270, a work camera unit 272 and a display control unit 277. Therefore, same reference symbols are given to those constituents, which are the same as those of the twelfth embodiment, and their descriptions will be omitted.

Figure 53:
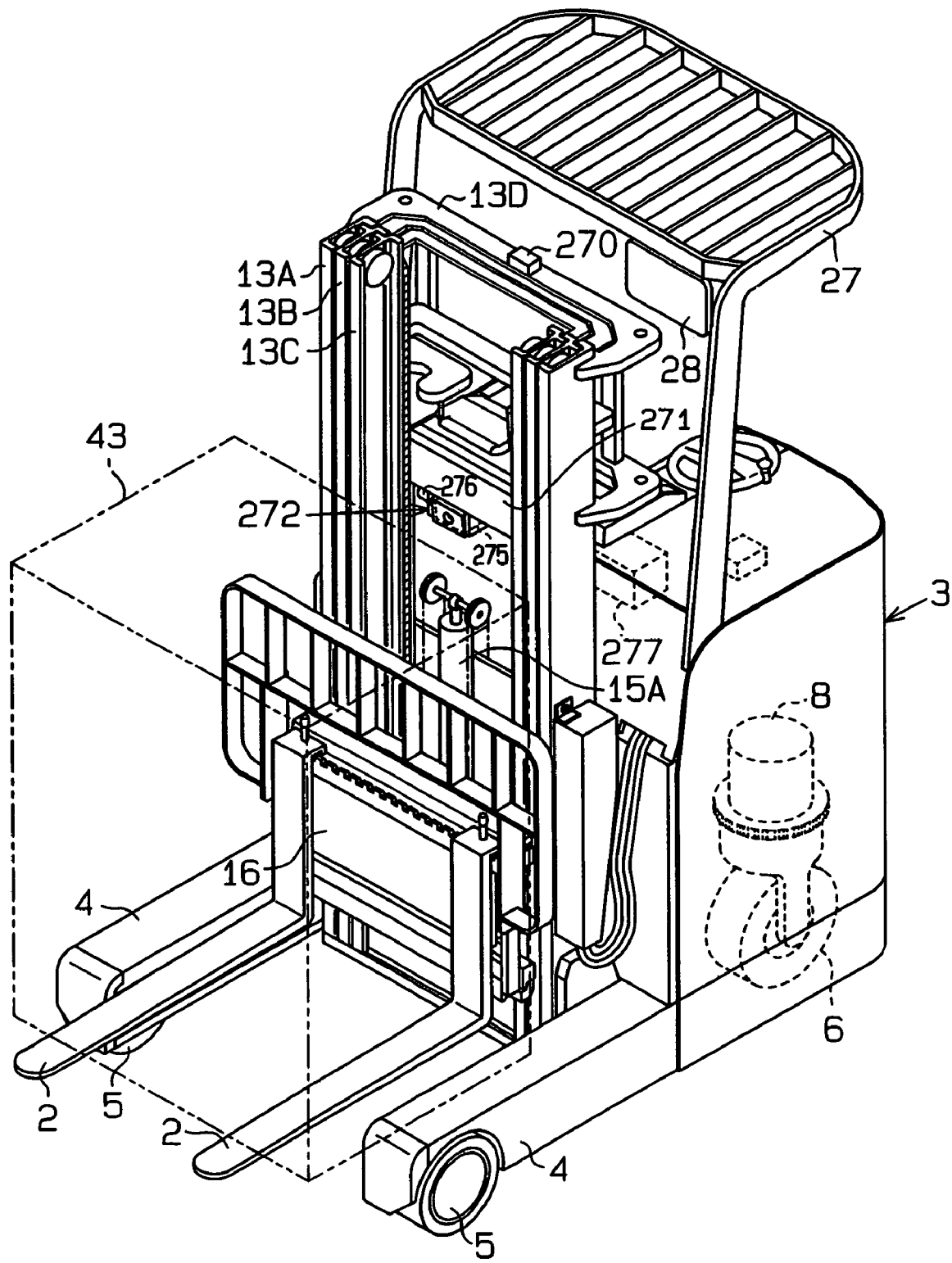
FIG. 53 is a schematic perspective view showing a forklift equipped with a work view field aiding apparatus according to a thirteenth embodiment.

As shown in FIG. 53, the cross beam 13D of the outer masts 13A is provided with the height switch 270 for discriminating whether or not the inner masts 13C is lifted from the lift-down position, i.e., whether or not the height position of the forks 2 is equal to or lower than the first height position.

A cross beam 271 which links the left and right inner masts 13C is provided with the work camera unit 272 which picks up an image in front of the vehicle for supporting the forward drive of the vehicle and an image in front of the forks 2 for supporting load pickup and load deposition works. The work camera unit 272 is provided on the bottom surface of the cross beam 271 to the right so that it does not interfere with a piston rod 15Aa (shown in FIG. 54) of the lift cylinder 15A.

Figure 54:
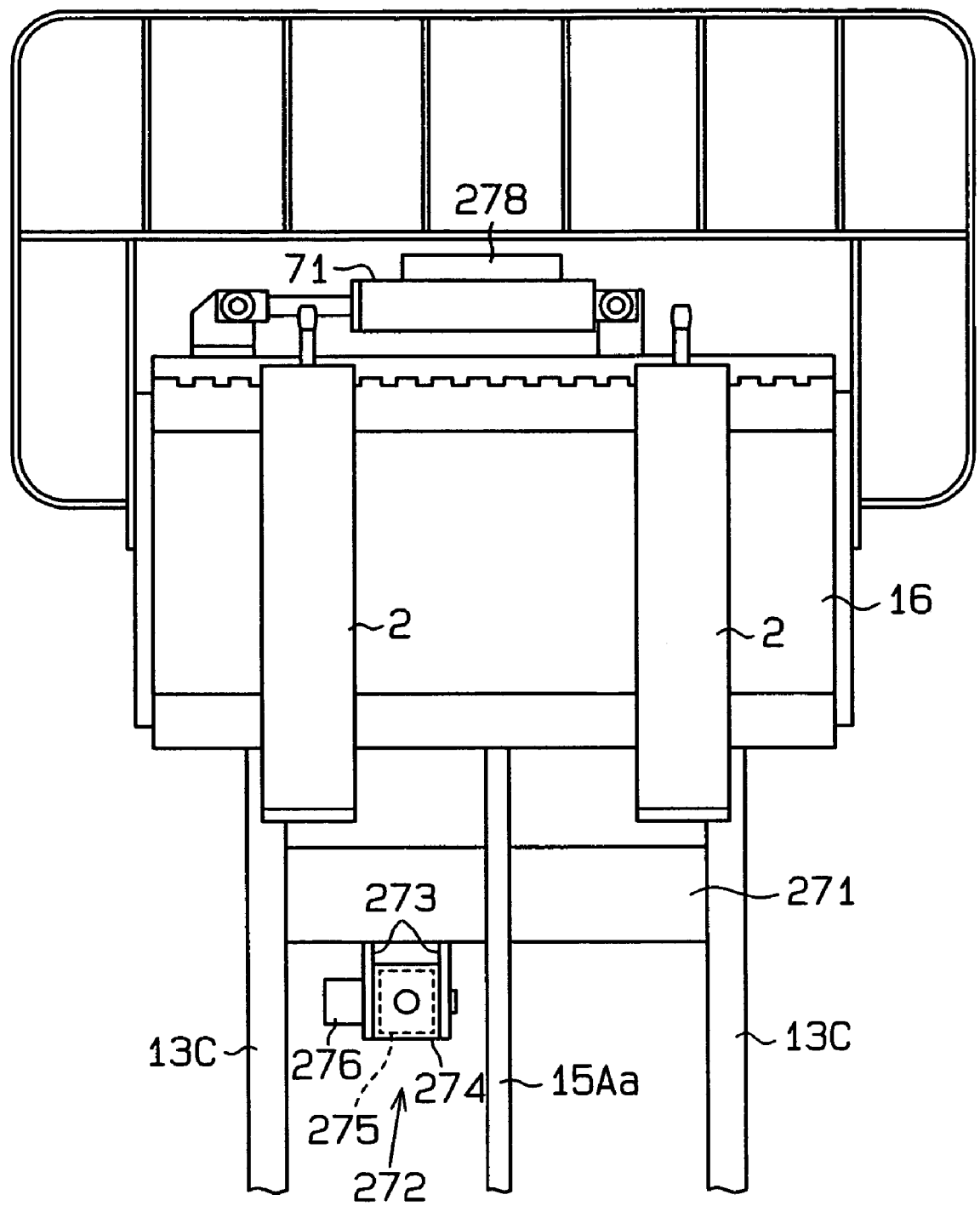
FIG. 54 is a partly schematic front view of forks and a mast including a work camera.

As shown in FIG. 54, the work camera unit 272 comprises a pair of support members 273, a casing 274, a work camera 275 and a motor unit 276. Both support members 273 are fixed to the cross beam 271. The casing 274 is supported on both support members 273 in such a way as to be tiltable about the axial line extending in the left and right direction of the vehicle. The work camera 275 is accommodated in the casing 274.

The work camera 275 picks up an image in front of the vehicle from a pickup window 274a provided in the casing 274. The work camera 275 is electrically connected to the display control unit 277 provided inside the vehicle body 3.

Figure 55:
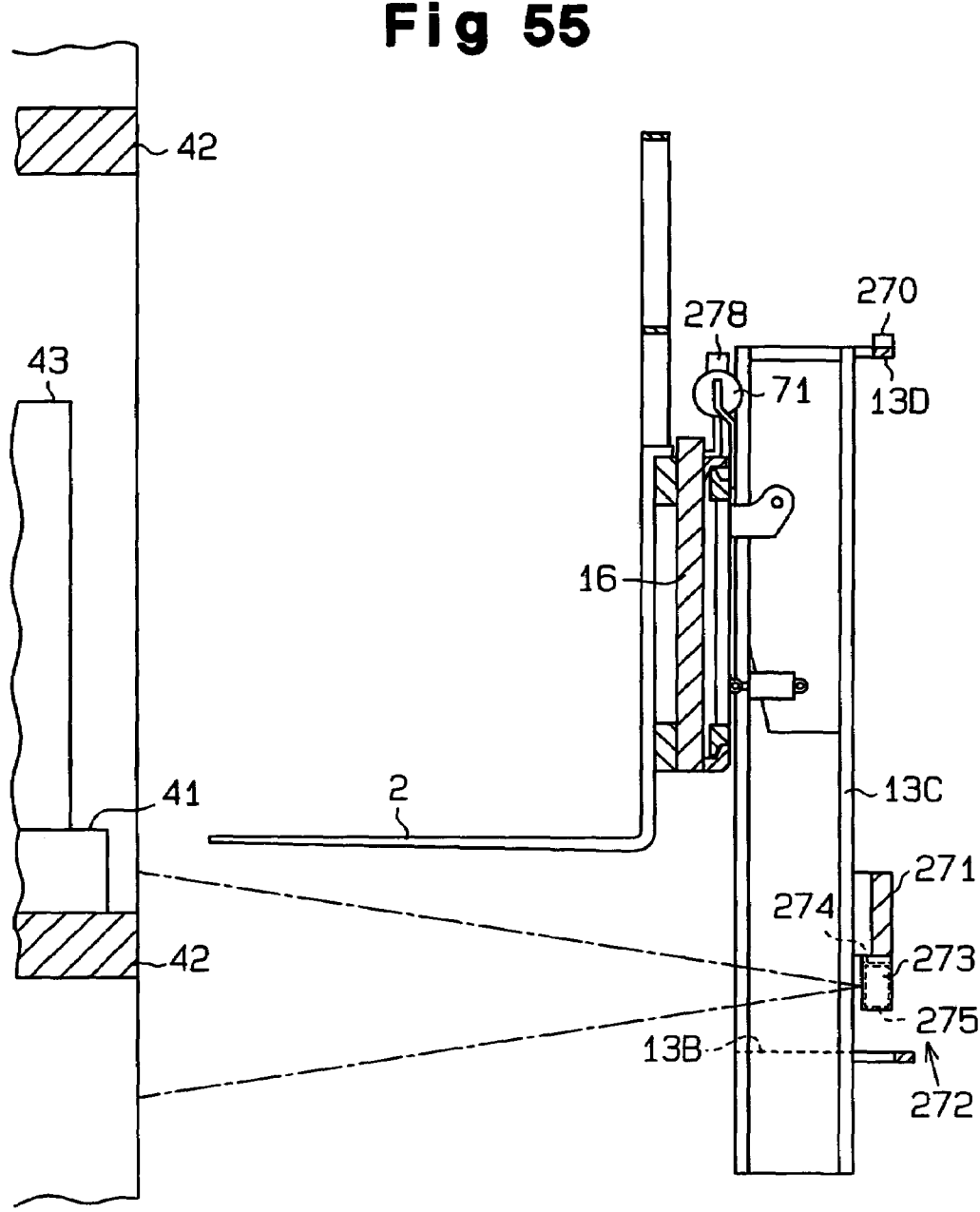
FIG. 55 is an exemplary side view showing the forks and the work camera at the time of a load pickup work.

The motor unit 276 can be switched between a "drive mode" in which the work camera 275 is tilted to direct the image pickup direction down frontward of the vehicle and a "load handling mode" in which it is directed frontward of the vehicle approximately horizontally, as shown in FIGS. 54 and 55. The motor unit 276 is electrically connected to the display control unit 277.

In "drive mode", the work camera 275 can pick up an image in front of the vehicle from above the load 43 on the forks 2 lifted down near the reach legs 4. That is, as the work camera 275 in the present embodiment is positioned more frontward of the vehicle than the position of the driver, it picks up a frontward image including the area in front of the vehicle which is blocked by the load 43 on the forks 2 and is hard for the driver to see with eyes.

As the mast 13 is a full free type, the work camera 275 picks up an image in front of the forks 2 from below the forks 2 in "load handling mode", regardless of the height of the forks 2 lifted higher than the first height position. That is, when the height of the forks 2 exceeds the first height position and the inner masts 13C is lifted with respect to the outer masts 13A, the work camera unit 272 is lifted up and down together with the forks 2 while keeping the positional relationship with the forks 2 at the first height position. The positional relationship at the first height position is the position where a frontward image can be picked up from below the forks 2 as shown in FIGS. 54 and 55, and is equivalent to the "lift-down position" in the twelfth embodiment.

In the present embodiment, the height switch 270, the support members 273, the casing 274, the motor unit 276 and the display control unit 277 constitute the image pickup direction switching means. The display control unit 277 and the display device 28 constitute the image display means. Further, the support members 273, the casing 274, the motor unit 276 and the display control unit 277 constitute the state adjusting means, the height switch 270 and the display control unit 277 constitute the work discrimination means and height detection means, and the display control unit 277 constitutes the switching control means. Further, the lift cylinders 15, the display control unit 277, the load handling control section 47, the side shift cylinder 71, the oil control valve 64, the electromagnetic changeover valves 66 and 69 and the work camera 275 constitute the position control means.

Figure 56:
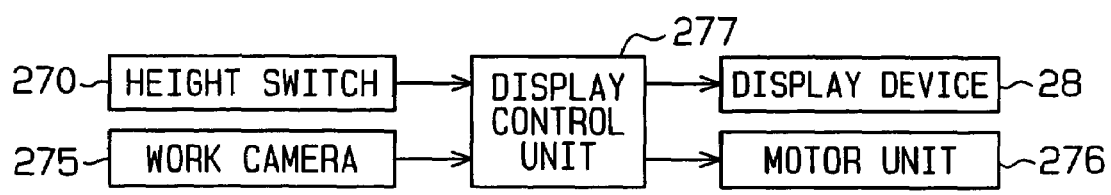
FIG. 56 is an electric block diagram of the work view field aiding apparatus.

As shown in FIG. 56, the height switch 270 and the work camera 275 are electrically connected to the input side of the display control unit 277, and the display device 28 and the motor unit 276 are electrically connected to the output side thereof. Based on a detection signal from the height switch 270, the display control unit 277 controls the motor unit 276 to switch the image pickup direction of the work camera 275 between the "drive mode" and the "load handling mode".

When the height of the forks 2 is equal to or lower than the first height position, the display control unit 277 sets the work camera unit 272 in the "drive mode" and displays an image in front of the vehicle, which is picked up by the work camera 275, on the display device 28 in this state. That is, when the height of the forks 2 is equal to or lower than the first height position, the display control unit 277 displays an image in front of the vehicle on the display device 28 so that the driver can drive the vehicle forward while viewing the image in front of the vehicle displayed on the display device 28.

When the height of the forks 2 exceeds the first height position, the display control unit 277 sets the work camera unit 272 in the "load handling mode" and displays an image in front of the forks 2, which is picked up by the work camera 275, on the display device 28 in this state.

When the forks 2 are lifted above the first height position at the time of a "load deposition work" and are positioned in the vicinity of the load deposition target position with respect to the shelf plate 42, the work camera unit 272 in "load handling mode" picks up an image in front of the forks 2 including the mark M2 on the shelf plate 42 from below the load 43. Likewise, when the forks 2 are positioned in the vicinity of the load pickup target position with respect to the pallet 41 placed on the shelf plate 42 at the time of a "load pickup work", an image in front of the forks 2 including the mark M2 on the shelf plate 42 is picked up.

When the height of the forks 2 exceeds the first height position, the display control unit 277 displays an image in front of the forks 2 on the display device 28 so that the driver can position the forks 2 to the pallet 41 or the shelf plate 42 while viewing the image PW in front of the forks 2 displayed on the display device 28.

In this embodiment, as in the twelfth embodiment, the display control unit 277 identifies the image of the mark M1, M2 shown on the front side of the pallet 41 or the shelf plate 42 and performs automatic fork positioning control to automatically position the forks 2 in the load pickup target position or the load deposition target position. In this embodiment, however, the work camera 275 is provided on the inner masts 13C and is not moved leftward and rightward together with the forks 2, so that the relative positional relationship between the forks 2 and the work camera 275 in the left and right direction (Y direction) changes. In this respect, a side stroke sensor 278 (see FIG. 11) which detects the side shift amount of the forks 2 is provided and automatic fork positioning control based on the detected value is executed.

In the present embodiment, when the forks 2 are lifted above the first height position to pick up the load 43 stored at a high place in the storage rack 40, the display control unit 277 sets the image pickup direction of the work camera 275 to the "load handling mode" and the work camera 275 displays an image in front of the forks 2 on the display device 28.

Therefore, the driver can see, on the display device 28, the image in front of the forks 2 including the front side of the pallet 41 for the load 43 to be stored at a high place at which the height relationship with the forks 2 is difficult to grasp and which is hard to see with eyes. And it is possible to easily position the forks 2 in the load pickup position by a manual operation.

Likewise, at the time the load 43 at a high place in the storage rack 40 is loaded together with the pallet 41, the work camera 275 is also set in the "load handling mode" and an image in front of the forks 2 is displayed on the display device 28. With respect to a high place, which is difficult to see with one's eyes, therefore, the driver can easily position the forks 2 while viewing the image in front of the forks 2 displayed on the display device 28.

When the forks 2 are lifted down below the first height position to drive the vehicle forward after load pickup, the display control unit 277 switches the image pickup direction of the work camera 275 to the "drive mode" from the "load handling mode". Then, an image in front of the vehicle including an area directly in front is displayed on the display device 28. Therefore, the driver can easily drive the vehicle forward while viewing, on the display device 28, the image in front of the vehicle including the image directly in front which is blocked by the load 43 on the forks 2 and is hard to see with eyes.

The present embodiment discussed in detail above has the following advantages.

An image in front of the vehicle and an image in front of the forks 2 can be picked up by switching the image pickup direction of the single work camera 275. Further, the display control unit 277 discriminates a work at that time based on the height position of the forks 2 and switches the image pickup direction of the work camera 275 according to the discriminated work.

As the image pickup direction of the single work camera 275 is switched, therefore, a work image, which supports a work at that time is automatically switched and displayed. As a result, at the time the work is changed, it is unnecessary to switch the work image to be displayed, thus ensuring a further improvement of the work efficiency.

The work camera 275 is provided on the cross beam 13D of the inner masts 13C of the full free type mast 13. The height of the forks 2 is detected by the height switch 270 and when the forks 2 are positioned in or lower than the first height position, the image pickup direction is set to the direction to pick up an image in front of the vehicle, and when it exceeds the first height position, the image pickup direction is set to the direction to pick up an image in front of the forks 2.

At a low height where the inner masts 13C is not lifted up from the lift-down position and only the forks 2 are lifted up and down, therefore, an image in front of the vehicle can be picked up from the height of the same viewpoint for the vehicle body 3. At a high height where the inner masts 13C is lifted up and down together with the forks 2, an image in front of the forks 2 can be picked up with a predetermined positional relationship with the forks 2. Unlike in the twelfth embodiment, therefore, it is unnecessary to provide the drive camera separately from the load handling camera.

Fourteenth Embodiment

The fourteenth embodiment of the present invention as embodied into a work view field aiding apparatus for a counterbalance type forklift truck will be described according to FIGS. 57 and 58.

Figure 57:
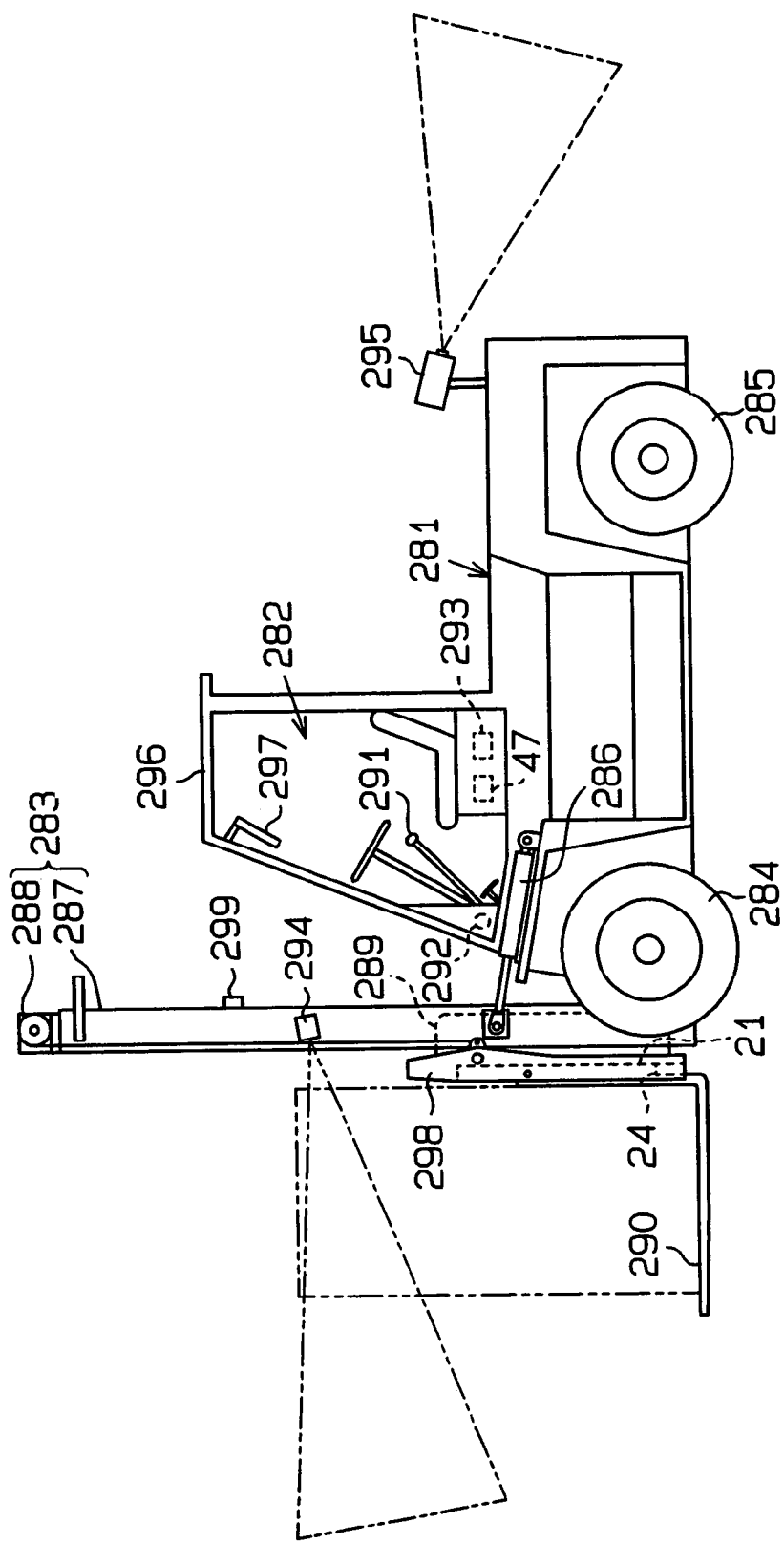
FIG. 57 is a schematic side view showing a counterbalance type forklift equipped with a work view field aiding apparatus according to a fourteenth embodiment.

As shown in FIG. 57, in a counterbalance type forklift (hereinafter simply called forklift) 280, a driver's seat 282 is provided on the front portion of a vehicle body 281 and a mast 283 is provided on the front side of the driver's seat 282. Drive wheels 284 are provided on the front portion of the vehicle body 281 and steered tire wheels 285 are likewise provided on the rear portion.

The mast 283 is supported on the front axle in such a way as to be tiltable in the forward and backward direction with respect to the vehicle body 281 and is tilted by the protraction and retraction action of a tilt cylinder 286. The mast 283 is a two-level slide mast and has outer masts 287 supported on the vehicle body 281 in a tiltable manner and inner masts 288 supported on the outer masts 287 in a liftable manner. By causing the inner masts 288 to perform a lift-up/down action by the protraction and retraction actions of the unillustrated lift cylinders fixed to the outer masts 287, a lift bracket 289 and forks 290, which are supported on the inner masts 288 in a liftable manner, are lifted up and down.

A shift lever 291 for changing the forward and backward movements of the vehicle is provided on the driver's seat 282. The change position of the shift lever 291, i.e., the forward moving state or the backward moving state, is detected by a shift switch 292. The shift switch 292 is electrically connected to a display control unit 293 provided inside the vehicle body 281.

A forward movement camera 294 for picking up an image in front of the vehicle, which supports the forward driving of the vehicle, is provided on the outer surface of the left-hand side outer mast 287. The forward movement camera 294 is electrically connected to the display control unit 293.

The forward movement camera 294 picks up an image in front of the vehicle including a forward area of the vehicle from the left-hand side of the load 43 on the forks 290 that blocks the forward view field of the driver. The image in front of the vehicle, which is picked up by the forward movement camera 294, can supplement the forward view field of the driver, which is blocked by a load on the forks 290 at the time of driving the vehicle forward, and can support the forward driving of the vehicle.

A backward movement camera 295 for picking up an image at the back of the vehicle, which supports the backward driving of the vehicle, is provided on the outer surface of the rear portion of the vehicle body 281. The backward movement camera 295 is electrically connected to the display control unit 293.

The backward movement camera 295 picks up an image at the back of the vehicle including a rearward area of the vehicle, which is hard to see with eyes. The image at the back of the vehicle, which is picked up by the backward movement camera 295, can supplement the backward view field of the driver, which is blocked by the rear portion of the vehicle body 281 at the time of driving the vehicle backward, and can support the backward driving of the vehicle, without making the driver take an uncomfortable pose.

A display device 297 is provided on the bottom surface of a roof 296 above the driver's seat 282. The display device 297 is electrically connected to the display control unit 293 and presents the driver at the driver's seat 282 with an image in front of the vehicle, which is picked up by the forward movement camera 294, or an image at the back of the vehicle, which is picked up by the backward movement camera 295.

A back rest 298 of the forklift 280 is provided with the load handling camera unit 23 equipped with a load handling camera similar to the one in the twelfth embodiment. A height switch 299 for detecting if the height of the forks 290 is equal to or lower than a preset reference height position is provided on the outer masts 287. The reference height position is equivalent to the first height position in the twelfth embodiment.

In this embodiment, the display control unit 293 and the display device 297 constitute the work image display means, and the height switch 299 and the display control unit 293 constitute the display control means and work discrimination means. The display control unit 293 is the display switching means, and the height switch 299 is the height detection means. The load handling camera 24, the forward movement camera 294 and the backward movement camera 295 are work cameras, and the forward movement camera 294 and the backward movement camera 295 are drive cameras.

Figure 58:
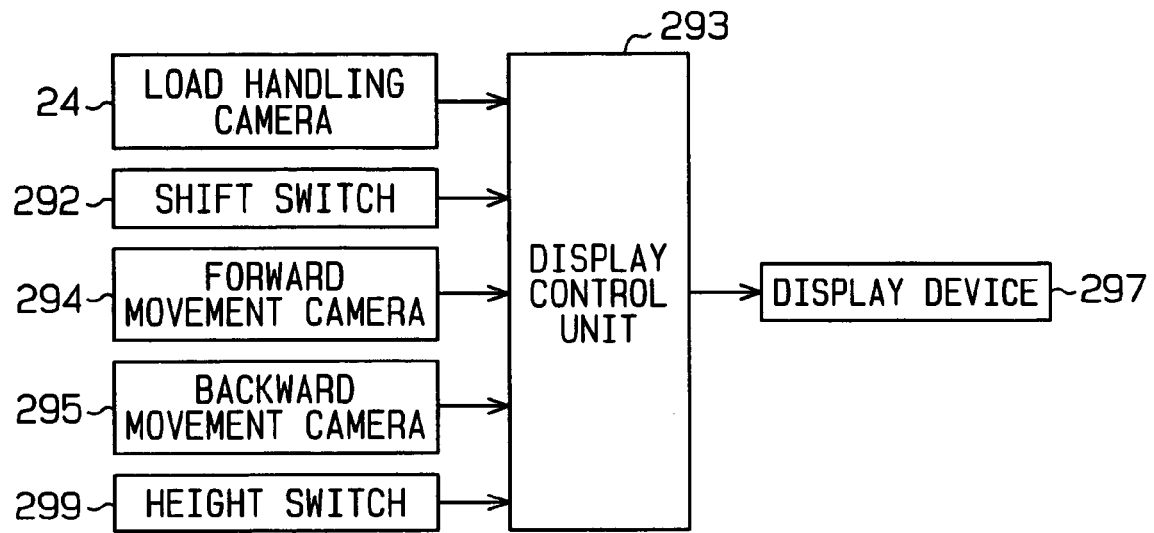
FIG. 58 is an electric block diagram of the work view field aiding apparatus.

As shown in FIG. 58, the load handling camera 24, the shift switch 292, the forward movement camera 294, the backward movement camera 295 and the height switch 299 are electrically connected to the input side of the display control unit 293, and the display device 297 is electrically connected to the output side thereof. The height switch 299 is electrically connected to the input side of the load handling control section 47.

When the height position of the forks 290 exceeds the reference height position based on a detection signal from the height switch 299, the display control unit 293 displays an image in front of the forks 290, which is picked up by the load handling camera 24, on the display device 297.

When the height position of the forks 290 is equal to or lower than the reference height position, the display control unit 293 displays an image in front of the vehicle, which is picked up by the forward movement camera 294, on the display device 297 when the shift lever 291 is in the forward drive position based on the switched state of the shift switch 292. When the shift lever 291 is in the backward drive position, an image at the back of the vehicle, which is picked up by the backward movement camera 295, is displayed on the display device 297.

In this embodiment, the display control unit 293 also identifies the image of the mark M1, M2 shown on the front side of the pallet 41 or the shelf plate 42 and acquires the barycentric coordinates and distance information of each mark M1, M2. Then, based on the barycentric coordinates and distance information acquired from the display control unit 293, the load handling control section 47 controls the unillustrated lift cylinders and side shift cylinder to perform automatic fork positioning control to automatically position the forks 290 in the load pickup target position or the load deposition target position.

When the forks 290 are lifted high above the reference height position, the image in front of the forks 290, which is picked up by the load handling camera 24, is displayed on the display device 297. Therefore, the driver can see, on the display device 297, the image in front of the forks 290 including the front side of the pallet 41 for the shelf plate 42 which is blocked by the load 43 on the forks 290 or the back rest 298 or the like and is hard to directly see with eyes. Then, it is possible to position the forks 290 easily in the load pickup target position or the load deposition target position by a manual operation or under automatic control.

When the shift lever 291 is switched to the forward drive position with the forks 290 lifted down to or below the reference height position, the image in front of the vehicle, which is picked up by the forward movement camera 294, is displayed on the display device 297. Therefore, the driver can easily drive the vehicle forward while viewing, on the display device 297, the image in front of the vehicle including the frontward area of the vehicle, which is blocked by the load 43 on the forks 290 and is hard to see directly with one's eyes.

When the shift lever 291 is likewise switched to the backward drive position at or below the reference height position, the image at the back of the vehicle, which is picked up by the backward movement camera 295, is displayed on the display device 297. Therefore, the driver can easily drive the vehicle backward while viewing, on the display device 297, the image at the back of the vehicle, which is blocked by the rear portion of the vehicle body and is hard to see directly with one's eyes, without taking an uncomfortable pose.

The present embodiment discussed in detail above has the following advantages.

The forward movement camera 294, which picks up an image in front of the vehicle, and the backward movement camera 295, which picks up an image at the back of the vehicle, are provided in addition to the load handling camera 24. The image in front of the vehicle is displayed at the time the vehicle is running forward, and the image at the back of the vehicle is displayed at the time the vehicle is running backward. It is therefore possible to carry out a load carrying work easily, the forward driving of the vehicle and the backward driving of the vehicle.

The drive camera 242 in the twelfth embodiment may be provided on the cross beam 271, not on the inner masts 13C, so that an image in front of the vehicle is picked up from above the load 43 on the forks 2 at the time of forward driving. Even this structure can provide the same advantages as those of the twelfth embodiment.

In the twelfth embodiment, a small load handling camera may be provided in a recess opening to the front face of the distal end portion of the forks instead of the load handling camera unit 23 to pick up an image in front of the forks 2 with a constant positional relation ship with the forks 2. Even this structure can provide the same advantages as those of the twelfth embodiment.

In the fourteenth embodiment, the forward movement camera 294 may be provided on the roof 296, not the outer masts 287. Even such a structure can provide the same advantages as those of the thirteenth embodiment.

In the fourteenth embodiment, the backward movement camera 295 may be provided on the head guard (roof 296), not the rear portion of the vehicle body 281. Even such a structure can provide the same advantages as those of the thirteenth embodiment.

In the twelfth embodiment, at the time the vehicle moves forward, an image in front of the forks 2 may be displayed small in a partial area of the image in front of the vehicle, which is displayed on the entire display screen of the display device 28. Likewise, at the time of a load carrying work, an image in front of the vehicle may be displayed small in a partial area of the image in front of the forks 2. In this case, the image pickup state of the camera can be monitored. The same is applied to the fourteenth embodiment.

The invention claimed is:

1. A load handling operation aiding apparatus in an industrial vehicle, which comprises:
   a load carrying apparatus movably provided on a vehicle body for doing a load carrying work;
   image pickup means for picking up an image of a load handling target of said load carrying apparatus;
   display means for displaying an image picked up by said image pickup means on a screen;
   calculation means for calculating a position of a moving target point of a reference mark, affixed to said load handling target, on the screen of said display means at the time of positioning of said load carrying apparatus with respect to the load handling target; and
   drawing control means for drawing a target mark for visual confirmation of said moving target point on the image on said screen.

2. The load handling operation aiding apparatus in an industrial vehicle according to claim 1,
   further comprising operation means to be manually operated to move said load carrying apparatus, and control means for controlling drive means for moving said load carrying apparatus in accordance with a manual operation of said operation means, and
   wherein said calculation means calculates a moving target point on the screen of said display means when said load carrying apparatus is moved in accordance with a manual operation of said operation means.

3. The load handling operation aiding apparatus in, an industrial vehicle according to claim 1, wherein said image pickup means is a camera which is provided liftable with respect to said load carrying apparatus, wherein said load handling operation aiding apparatus further comprises discrimination means for discriminating whether a load carrying work by said load carrying apparatus is a load pickup work or a load deposition work, and lifting means for lifting said camera up and down in such a way that said camera is moved and placed in a position according to the type of the load carrying work discriminated by that discrimination means, and wherein a placed position of said camera at the time of the load deposition work is set to a position that does not interfere with image pickup of a work area by a load picked up by said load carrying apparatus.

4. The load handling operation aiding apparatus in an industrial vehicle according to claim 1, wherein said industrial vehicle has a mast and a carriage provided on said mast in a liftable manner, said load carrying apparatus is provided on said carriage, said image pickup means is a camera which is fixed to said mast,
   wherein said load carrying apparatus is constructed in such a way that when said load carrying apparatus is lifted up and down in a range of a predetermined height or more, said carriage is moved on said mast while said load canying apparatus and said camera keep a constant positional relationship at least in a height direction,
   wherein said load handling operation aiding apparatus further comprises height detection means for detecting a height of said load carrying apparatus, and
   wherein said drawing control means draws a target mark for visual confirmation of said moving target point on the image on said screen based on positional data of the moving target point calculated by said calculation means when the height detected by said height detection means is equal to or higher than said predetermined height.

5. The load handling operation aiding apparatus in an industrial vehicle according to claim 1, wherein said detection means detects a position of a load handling target differently between a load pickup work and a load deposition work, and wherein said display means displays positional information according to the load handling target detected by said detection means.

6. An industrial vehicle equipped with a load handling operation aiding apparatus according to claim 1.

7. The load handling operation aiding apparatus in an industrial vehicle according to claim 4, wherein said mast is a telescopic type multi-level mast constructed to have multi-level constituting members including an inner mast, said mast is protracted and retracted by sliding of those constituting members including an inner mast, and said mast is protracted if said load carrying apparatus is moved and positioned at a topmost stage of the inner mast in said constituting members, and wherein said camera is fixed to said inner mast.

8. The load handling operation aiding apparatus in an industrial vehicle according to claim 7, wherein said camera is fixed to said inner mast in a center portion of the inner mast in the vehicle's widthwise direction.

9. The load handling operation aiding apparatus in an industrial vehicle according to claim 1, wherein said load handling target is affixed with a reference mark to be a reference for positioning, said calculation means calculates a moving target point of said reference mark on the screen of said display means, and said drawing control means draws a target mark indicating said moving target point of said reference mark on the image on said screen.

10. The load handling operation aiding apparatus in an industrial vehicle according to claim 1, wherein said target mark is constituted by a figure of a target point with respect to a center point and said target mark is drawn in such a way that said center point coincides with said moving target point.

11. The load handling operation aiding apparatus in an industrial vehicle according to claim 1, wherein said load handling target is a pallet or a shelf plate.

12. The load handling operation aiding apparatus in an industrial vehicle according to claim 1, further comprises:
   load detection means for detecting whether or not there is a load placed on or held by the load carrying apparatus and outputting a detection signal;
   decision means for determining whether the load carrying work is a load pickup work or a load deposition work based on the detection signal from said load detection means; and
   control means for causing said load carrying apparatus to do a load pickup work or a load deposition work based on decision by said decision means.

13. The load handling operation aiding apparatus in an industrial vehicle according to claim 1, further comprises:
   load detection means for detecting whether or not there is a load placed on or held by the load carrying apparatus and outputting a detection signal;
   at least one actuator to be driven to cause said load carrying apparatus to do the load carrying work;
   decision means for determining the type of said load carrying work based on the detection signal from said load detection means; and
   control means for driving said actuator in accordance with the type of the load carrying work determined by said decision means.

14. The load handling operation aiding apparatus in an industrial vehicle according to claim 13, wherein said load carrying apparatus is liftable up and down along a mast provided on the vehicle body,
   said actuator is driven to lift said load carrying apparatus up and down along the mast, and
   said load carrying apparatus is lifted up to a load pickup height by said actuator when said decision means determines that the type of the load carrying work is a load pickup work, and said load carrying apparatus is lifted up to a load deposition height by said actuator when said decision means determines that the type of the load carrying work is a load deposition work.

15. The load handling operation aiding apparatus in an industrial vehicle according to claim 13, wherein said decision means determines that the type of the load carrying work is a load deposition work when a load is detected on said load carrying apparatus, and said decision means determines that the type of the load carrying work is a load pickup work when no load is detected on said load carrying apparatus.

16. The load handling operation aiding apparatus in an industrial vehicle according to claim 13, further comprising start operation means for outputting an operation signal at the time of starting automatic load handling control of said load carrying apparatus, wherein said start operation means is used commonly in a plurality of different load carrying works, and
   said control means performs automatic load handling control of said load carrying apparatus by driving said actuator in accordance with the type of the load carrying work determined by said decision means when said operation signal is input from said start operation means.

17. The load handling operation aiding apparatus in an industrial vehicle according to claim 13, further comprising second detection means that detects if a start condition to start automatic load handling control of said load carrying apparatus is satisfied and outputs a second detection signal that indicates whether or not the start condition is satisfied, wherein said control means drives said actuator in accordance with the type of the load carrying work determined by said decision means only when the second detection signal indicates that the start condition is satisfied.

18. The load handling operation aiding apparatus in an industrial vehicle according to claim 16, wherein said automatic load handling control is control to position said load carrying apparatus with respect to a load handling target, and
   wherein said control means controls said actuator to place said load carrying apparatus in a work start position set in accordance with the type of the load carrying work determined by said decision means.

19. The load handling operation aiding apparatus in an industrial vehicle according to claim 1, further comprises:
   load detection means for detecting whether or not there is a load placed on or held by the load carrying apparatus and outputting a detection signal;
   an aiding apparatus provided to support an automatic load control of the handling work of said load carrying apparatus and equipped with at least one actuator;
   decision means for determining the type of said load carrying work based on the detection signal from said load detection means; and
   control means for controlling said actuator in accordance with the type of the load carrying work determined by said decision means.

20. The load handling operation aiding apparatus in an industrial vehicle according to claim 19, further comprising start operation means for outputting an operation signal at the time of starting automatic load handling control of said load carrying apparatus, wherein said start operation means is used commonly in a plurality of different load carrying works, and
   said control means supports said automatic load handling control by driving said actuator in accordance with the type of the load carrying work determined by said decision means.

21. The load handling operation aiding apparatus in an industrial vehicle according to claim 19, further comprising second detection means that detects if a start condition to start automatic load handling control of said load carrying apparatus is satisfied and outputs a second detection signal that indicates whether or not the start condition is satisfied, wherein said control means drives and controls said actuator in accordance with the type of the load carrying work determined by said decision means only when the second detection signal indicates that the start condition is satisfied.

22. The load handling operation aiding apparatus in an industrial vehicle according to claim 13, wherein said types of load carrying works include a load deposition work and a load pickup work.

23. The load handling operation aiding apparatus in an industrial vehicle according to claim 12, wherein the industrial vehicle further comprises start operation means for automatic elevation and wherein said control means is part of an automatic elevation unit for lifting the load carrying apparatus up to a predetermined height by an operation signal from said start operation means, said control means drives the actuator for automatic elevation control of the load carrying apparatus by said automatic elevation unit, and when elevation is designated by the operation signal from said start operation means, said control means positions said load carrying apparatus in either a load deposition position or a load pickup position, determined according to the type of the load carrying work determined by said decision means with respect to the height instructed by said operation signal.

24. An industrial vehicle equipped with a load handling operation aiding apparatus according to claim 12.

25. The load handling operation aiding apparatus in an industrial vehicle according to claim 12, wherein said control means performs positioning control to position the load carrying apparatus with respect to a load handling target according to the type of the load carrying work.

26. The load handling operation aiding apparatus in an industrial vehicle according to claim 12, wherein said control means starts control to automatically execute a load pickup work or a load deposition work, based on an operation signal from start operation means, and controls actuation of at least one actuator provided to operate said load carrying apparatus.

27. The load handling operation aiding apparatus in an industrial vehicle according to claim 12, wherein said control means controls actuation of at least one actuator provided to operate said load carrying apparatus and said control means starts said control to automatically execute a load pickup work or a load deposition work, based on an operation signal from a start operation means.

28. The load handling operation aiding apparatus in an industrial vehicle according to claim 12, wherein said decision means determines that the load carrying work is a load pickup work when a signal output from said load detection means is a signal indicating no load and determines that the load carrying work is a load deposition work when the signal indicates presence of a load.

* * * * *

UNITED STATES PATENT AND TRADEMARK OFFICE
CERTIFICATE OF CORRECTION

PATENT NO.         : 7,219,769 B2
APPLICATION NO. : 10/470491
DATED                  : May 22, 2007
INVENTOR(S)        : Torahiko Yamanouchi et al.

It is certified that error appears in the above-identified patent and that said Letters Patent is hereby corrected as shown below:

Column 5, line 57, please delete "the side lift cylinders 15B is" and insert therefore --the side lift cylinders 15B are--;

Column 5, line 58, please delete "outer mast 13A, and is" and insert therefore --outer mast 13A, and are--;

Column 6, lines 11-12, please delete "24A (lens section) 24A" and insert therefore --(lens section) 24A--;

Column 6, line 38, please delete "instrumental panel." and insert therefore --instrument panel.--;

Column 10, line 63, please delete "correspond to" and insert therefore --corresponds to--;

Column 11, line 62, please delete "for those known information" and insert therefore --for the known information--;

Column 11, line 67, please delete "equations." and insert therefore --equations:--;

Column 12, line 18, please delete "equations." and insert therefore --equations:--;

Column 12, line 50, please delete "equation." and insert therefore --equation:--;

Column 13, line 20, please delete "FP to "0" to" and insert therefore --FP "0" at--;

Column 13, line 29, please delete "FP to "0"" and insert therefore --FP "0"--;

Column 14, line 37, please delete "= Xp Xcf" and insert therefore --= Xp-Xcf--;

Column 15, line 19, please delete "Yr-Yef" and insert therefore --Yr-Ycf--;

Column 17, lines 2-3, please delete "at the time of the control" and insert therefore --at the time the control--;

Column 23, line 20, please delete "to reach type forklift." and insert therefore --to a reach type forklift.--;

UNITED STATES PATENT AND TRADEMARK OFFICE
CERTIFICATE OF CORRECTION

PATENT NO. : 7,219,769 B2
APPLICATION NO. : 10/470491
DATED : May 22, 2007
INVENTOR(S) : Torahiko Yamanouchi et al.

It is certified that error appears in the above-identified patent and that said Letters Patent is hereby corrected as shown below:

Column 23, line 34, please delete "described mainly on those that differ" and insert therefore --described mainly about those components that differ--.

Column 29, line 30, please delete "lad deposition" and insert therefore --load deposition--;

Column 29, line 43, please delete "load pickup height (load pickup height)" and insert therefore --load pickup height (load deposition height)--;

Column 29, line 60, please delete "(load weight W < threshold" and insert therefore --(load weight W ≤ threshold--;

Column 30, lines 18 and 46, please delete "In case" and insert therefore --In the case--;

Column 31, line 36, please delete "detects the height H being" and insert therefore --detects that the height H has--;

Column 32, line 64, please delete "described mainly on those that differ" and insert therefore --described mainly about those components that differ--;

Column 33, line 9, please delete "some has an overall height" and insert therefore --some have an overall height--;

Column 34, line 64, please delete "In case" and insert therefore --In the case--;

Column 35, line 2, please delete "in case" and insert therefore --in the case--;

Column 35, line 13, please delete "In case" and insert therefore --In the case--;

Column 35, line 58, please delete "in case" and insert therefore --in a case--;

Column 35, line 59, please delete "of placing a pallet 41" and insert therefore --involves placing a pallet 41--;

Column 36, line 16, please delete "In case" and insert therefore --In the case--;

UNITED STATES PATENT AND TRADEMARK OFFICE
CERTIFICATE OF CORRECTION

| | | |
|---|---|---|
| PATENT NO. | : 7,219,769 B2 | |
| APPLICATION NO. | : 10/470491 | |
| DATED | : May 22, 2007 | |
| INVENTOR(S) | : Torahiko Yamanouchi et al. | |

It is certified that error appears in the above-identified patent and that said Letters Patent is hereby corrected as shown below:

Column 36, line 33, please delete "Even in case" and insert therefore --Even in the case--;

Column 37, line 53, please delete "In case" and insert therefore --In the case--;

Column 38, lines 14, 29 and 33, please delete "In case" and insert therefore --In the case--;

Column 38, line 35, please delete "or in case" and insert therefore --or in the case--;

Column 39, line 15, please delete "in case" and insert therefore --in the case--;

Column 39, lines 19-20, please delete "both of the function" and insert therefore --both of the functions--;

Column 40, line 13, please delete "described mainly on those that differ" and insert therefore --described mainly about those components that differ--;

Column 40, line 67, please delete "in the rightward)" and insert therefore --in the rightward position)--;

Column 41, line 2, please delete "leftward)" and insert therefore --leftward position)--;

Column 42, line 64, please delete "forklift 1 are moved" and insert therefore --forklift 1 is moved--;

Column 43, line 10, please delete "In case" and insert therefore --In the case--;

Column 46, line 52, please delete "Further, in case" and insert therefore --Further, in the case--;

Column 47, line 65, please delete "direction to steering" and insert therefore --direction to steer--;

Column 48, lines 24-25, please delete "mainly on differences" and insert therefore --mainly about the differences--;

UNITED STATES PATENT AND TRADEMARK OFFICE
CERTIFICATE OF CORRECTION

PATENT NO. : 7,219,769 B2
APPLICATION NO. : 10/470491
DATED : May 22, 2007
INVENTOR(S) : Torahiko Yamanouchi et al.

It is certified that error appears in the above-identified patent and that said Letters Patent is hereby corrected as shown below:

Column 49, line 27, please delete "in case" and insert therefore --in the case--;

Column 49, line 34, please delete "In case" and insert therefore --In the case--;

Column 49, line 61, please delete "in case" and insert therefore --in the case--;

Column 51, line 50, please delete "SA SD" and insert therefore --SA to SD--;

Column 52, line 49, please delete "mainly on differences" and insert therefore --mainly about the differences--;

Column 52, line 60, please delete "camera for front" and insert therefore --camera 204 for front--.

Column 53, line 2, please delete "is displayed on the monitor" and insert therefore --displayed on the monitor--;

Column 55, lines 5-6, please delete "forks 2 forks are lifted" and insert therefore --forks 2 are lifted--;

Column 56, lines 39-40, please delete "drive easily the vehicle forward" and insert therefore --easily drive the vehicle forward--;

Column 57, line 49, please delete "inner masts 13C is lifted" and insert therefore --inner masts 13C are lifted--;

Column 58, line 28, please delete "inner masts 13C is lifted" and insert therefore --inner masts 13C are lifted--;

Column 60, lines 32 and 36, please delete "inner masts 13C is" and insert therefore --inner masts 13C are--;

Column 62, line 37, please delete "pallet 41 for the shelf plate 42" and insert therefore --pallet 41 or the shelf plate 42--;

Column 62, line 39, please delete "or the like and is hard" and insert therefore --or the like, which is hard--;

UNITED STATES PATENT AND TRADEMARK OFFICE
CERTIFICATE OF CORRECTION

PATENT NO.       : 7,219,769 B2
APPLICATION NO.  : 10/470491
DATED            : May 22, 2007
INVENTOR(S)      : Torahiko Yamanouchi et al.

It is certified that error appears in the above-identified patent and that said Letters Patent is hereby corrected as shown below:

Column 63, line 6, please delete "the forward driving of the vehicle and the" and insert therefore --during either the forward driving of the vehicle or the--; and Column 63, line 18, please delete "positional relation ship" and insert therefore --positional relationship--.

In the Claims

In Claim 3, Column 64, line 1, please delete "apparatus in, an" and insert therefore --apparatus in an--.

Signed and Sealed this

Third Day of November, 2009

David J. Kappos
*Director of the United States Patent and Trademark Office*